United States Patent
Nango et al.

(10) Patent No.: US 9,803,818 B2
(45) Date of Patent: Oct. 31, 2017

(54) LIGHTING FILM, WINDOW GLASS, ROLL SCREEN, AND LIGHTING LOUVER

(71) Applicant: Sharp Kabushiki Kaisha, Osaka-shi, Osaka (JP)

(72) Inventors: Tomoko Nango, Osaka (JP); Shun Ueki, Osaka (JP); Tsuyoshi Kamada, Osaka (JP); Kazuyoshi Sakuragi, Osaka (JP); Masahiro Tsujimoto, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/896,071

(22) PCT Filed: Jun. 5, 2014

(86) PCT No.: PCT/JP2014/064952
§ 371 (c)(1),
(2) Date: Dec. 4, 2015

(87) PCT Pub. No.: WO2014/196596
PCT Pub. Date: Dec. 11, 2014

(65) Prior Publication Data
US 2016/0223154 A1  Aug. 4, 2016

(30) Foreign Application Priority Data
Jun. 7, 2013  (JP) ................. 2013-121277

(51) Int. Cl.
*F21S 11/00* (2006.01)
*E06B 5/00* (2006.01)
(Continued)

(52) U.S. Cl.
CPC .............. *F21S 11/007* (2013.01); *E06B 5/00* (2013.01); *E06B 9/24* (2013.01); *G02B 5/00* (2013.01);
(Continued)

(58) Field of Classification Search
CPC ......... F21S 11/002; F21S 11/007; E06B 5/00; E06B 2009/2417; E06B 9/24; F06B 9/24; G02B 5/00; G02B 5/02
(Continued)

(56) References Cited

U.S. PATENT DOCUMENTS 1,922,932 A * 8/1933 Delano ................ F21V 5/00
359/592
5,461,496 A * 10/1995 Kanada ................ E06B 9/24
359/592
(Continued)

FOREIGN PATENT DOCUMENTS

EP   0 800 035 A1   10/1997
JP   50-98514 U    8/1975
(Continued)

OTHER PUBLICATIONS

Official Communication issued in International Patent Application No. PCT/JP2014/064952, dated Sep. 16, 2014.

*Primary Examiner* — Christopher Mahoney
(74) *Attorney, Agent, or Firm* — Keating & Bennett, LLP

(57) ABSTRACT

A lighting film which includes a base member having optical transparency, a plurality of protrusions having optical transparency, which are formed to be adjacent to each other on one surface of the base member, and a gap portion formed between the protrusions, in which an area of an end surface of the protrusion on a base member side is greater than an area of an end surface of the protrusion on a side opposite to the base member, and a ratio s/w of an interval s of two adjacent protrusions among the plurality of protrusions to a width w of the protrusion is equal to or less than 0.1.

20 Claims, 27 Drawing Sheets

(51) Int. Cl.
    *E06B 9/24*    (2006.01)
    *G02B 5/00*    (2006.01)
    *G02B 5/02*    (2006.01)
    *G02B 17/00*   (2006.01)

(52) U.S. Cl.
    CPC ............. *G02B 5/02* (2013.01); *G02B 17/006*
       (2013.01); *E06B 2009/2417* (2013.01); *G02B*
       *2207/123* (2013.01)

(58) Field of Classification Search
    USPC ........................................ 359/592, 596, 598
    See application file for complete search history.

(56)         References Cited

U.S. PATENT DOCUMENTS 5,521,726 A      5/1996  Zimmerman et al.
    5,880,886 A *    3/1999  Milner ..................... E06B 9/24
                                                     359/592
    6,456,437 B1     9/2002  Lea et al.
    2009/0009870 A1  1/2009  Usami
    2011/0310473 A1  12/2011 Yoshida et al.
    2013/0038928 A1  2/2013  Padiyath et al.
    2014/0133030 A1* 5/2014  Gardiner ................ G02B 5/045
                                                     359/592
    2015/0226394 A1* 8/2015  Ueki ....................... E06B 9/386
                                                     359/595
    2015/0354272 A1* 12/2015 Vasylyev .................. E06B 9/42
                                                     160/133

FOREIGN PATENT DOCUMENTS

JP       2002-535690 A         10/2002
    JP       2008-040021 A         2/2008
    JP       4129991 B2             8/2008
    JP       2011-123478 A         6/2011
    JP       2012-003025 A         1/2012
    JP       2012255951 A     *    12/2012
    JP       2013-514549 A         4/2013
    WO       97/31276 A1           8/1997

* cited by examiner

LIGHTING FILM, WINDOW GLASS, ROLL SCREEN, AND LIGHTING LOUVER

TECHNICAL FIELD

The present invention relates to a lighting film, a window glass, a roll screen, and a lighting louver.

This application is based on and claims priority from Japanese Patent Application No. 2013-121277 filed Jun. 7, 2013, the entire contents of which are incorporated herein by reference.

BACKGROUND ART

As a technology in which light incident to a window glass is efficiently guided to the inside a room, a technology disclosed in PTL 1 is known. In the technology in PTL 1, a lighting film, in which a plurality of unit prisms are formed on one-side surface of a light-transmitting support, is attached to an outer surface (surface on the outside of the room) of the window glass with the unit prisms facing the outer side. Light incident from the unit prism side is refracted from a surface of the unit prism, transmits through the unit prisms, the support, and the window glass, and is incident to the inside of the room.

CITATION LIST

Patent Literature

PTL 1: Japanese Unexamined Patent Application Publication No. 2008-40021

SUMMARY OF INVENTION

Technical Problem

However, in the lighting film disclosed in PTL1, it is not possible to cause the entire light incident to the window glass to travel toward the ceiling inside the room, but light may be refracted from the lighting film or may transmit through the lighting film and then may travel toward a direction except for the ceiling inside the room. Then, the light traveling toward the direction except for the ceiling inside the room may pass through a position of an eye of a person inside the room. In this case, the person inside the room feels glare.

An aspect of the present invention is provided to solve the above problem and an object thereof is to provide a lighting film, a window glass, a roll screen, and a lighting louver, with which it is possible to regulate the glare which a person inside a room feels.

Solution to Problem

In order to achieve the above object, an aspect of the present invention employs the following means.

(1) A lighting film according to a first aspect of the present invention includes: a base member having optical transparency; a plurality of protrusions having optical transparency, which are formed to be adjacent to each other on one surface of the base member; and a gap portion formed between the protrusions. An area of an end surface of the protrusion on a base member side is greater than an area of an end surface of the protrusion on a side opposite to the base member. A ratio s/w of an interval s of two adjacent protrusions among the plurality of protrusions to a width w of the protrusion is equal to or less than 0.1.

(2) A lighting film according to a second aspect of the present invention includes: a base member having optical transparency; a plurality of protrusions having optical transparency, which are formed to be adjacent to each other on one surface of the base member; a gap portion formed between the protrusions; and a light absorbing body provided in a region between the protrusions on the one surface of the base member.

(3) A lighting film according to a third aspect of the present invention includes: a base member having optical transparency; a plurality of protrusions having optical transparency, which are formed to be adjacent to each other on one surface of the base member; a gap portion formed between the protrusions; and a second protrusion provided in a region between the protrusions on the one surface of the base member. The second protrusion has an inclined surface inclined with respect to the one surface of the base member and a height of the second protrusion is smaller than a height of the protrusion.

(4) In the lighting film according to any one of (1) to (3) described above, an area of an end surface of the protrusion on the base member side may be greater than an area of an end surface of the protrusion on the side opposite to the base member.

(5) In the lighting film according to (4) described above, the plurality of protrusions may include a plurality of protrusions having a side surface with an inclination angle that is changed in a continuous or stepwise manner from the base member side to the side opposite to the base member.

(6) In the lighting film according to (4) or (5) described above, the plurality of protrusions may include a plurality of protrusions having side surfaces with inclination angles different from each other.

(7) In the lighting film according to any one of (4) to (6) described above, the protrusion may extend in a straight line shape or in a curved line shape and two side surfaces of the protrusion in a cross section orthogonal to an extending direction of the protrusion may have an inclination angle that is changed in a continuous or stepwise manner from the base member side to the side opposite to the base member.

(8) A lighting film according to a fourth aspect of the present invention includes: a base member having optical transparency; a plurality of protrusions having optical transparency, which are formed to be adjacent to each other on one surface of the base member; and a gap portion formed between the protrusions. The plurality of protrusions include a plurality of protrusions having a side surface with an inclination angle that is changed in a continuous or stepwise manner from a base member side to a side opposite to the base member.

(9) A lighting film according to a fifth aspect of the present invention includes: a base member having optical transparency; a plurality of protrusions having optical transparency, which are formed to be adjacent to each other on one surface of the base member; and a gap portion formed between the protrusions. The plurality of protrusions include a plurality of protrusions having side surfaces with inclination angles different from each other.

(10) In the lighting film according to any one of (4) to (7) described above, among the plurality of protrusions, a part of two adjacent protrusions may be in contact with each other.

(11) A window glass according to a first aspect of the present invention includes: a glass substrate; a plurality of protrusions having optical transparency, which are formed to be adjacent to each other on one surface of the glass substrate; and a gap portion formed between the protrusions. An area of an end surface of the protrusion on the glass substrate side is greater than an area of an end surface of the protrusion on a side opposite to the glass substrate. A ratio s/w of an interval s of two adjacent protrusions among the plurality of protrusions to a width w of the protrusion is equal to or less than 0.1.

(12) A window glass according to a second aspect of the present invention includes: a glass substrate; a plurality of protrusions having optical transparency, which are formed to be adjacent to each other on one surface of the glass substrate; a gap portion formed between the protrusions; and a light absorbing body provided in a region between the protrusions on the one surface of the glass substrate.

(13) A window glass according to a third aspect of the present invention includes: a glass substrate; a plurality of protrusions having optical transparency, which are formed to be adjacent to each other on one surface of the glass substrate; a gap portion formed between the protrusions; and a second protrusion provided in a region between the protrusions on the one surface of the glass substrate. The second protrusion has an inclined surface inclined with respect to the one surface of the glass substrate and a height of the second protrusion is smaller than a height of the protrusion.

(14) In the window glass according to any one of (11) to (13) described above, an area of an end surface of the protrusion on the glass substrate side may be greater than an area of an end surface of the protrusion on a side opposite to the glass substrate.

(15) In the window glass according to (14) described above, the plurality of protrusions may include a plurality of protrusions having a side surface with an inclination angle that is changed in a continuous or stepwise manner from the glass substrate side to the side opposite to the glass substrate.

(16) In the window glass according to (14) or (15) described above, the plurality of protrusions may include a plurality of protrusions having side surfaces with inclination angles different from each other.

(17) In the window glass according to any one of (14) to (16) described above, the protrusion may extend in a straight line shape or in a curved line shape and two side surfaces of the protrusion in a cross section orthogonal to an extending direction of the protrusion may have an inclination angle that is changed in a continuous or stepwise manner from the glass substrate side to the side opposite to the glass substrate.

(18) A window glass according to a fourth aspect of the present invention includes: a glass substrate; a plurality of protrusions having optical transparency, which are formed to be adjacent to each other on one surface of the glass substrate; and a gap portion formed between the protrusions. The plurality of protrusions include a plurality of protrusions having a side surface with an inclination angle that is changed in a continuous or stepwise manner from a glass substrate side to a side opposite to the glass substrate.

(19) A window glass according to a fifth aspect of the present invention includes: a glass substrate; a plurality of protrusions having optical transparency, which are formed to be adjacent to each other on one surface of the glass substrate; and a gap portion formed between the protrusions. The plurality of protrusions include a plurality of protrusions having side surfaces with inclination angles different from each other.

(20) In the window glass according to any one of (14) to (17) described above, among the plurality of protrusions, a part of two adjacent protrusions may be in contact with each other.

(21) A roll screen according to a first aspect of the present invention includes: a lighting film; a winding mechanism that winds the lighting film around a shaft center; and an accommodation section that accommodates the shaft center and the winding mechanism. The lighting film includes a base member having optical transparency, a plurality of protrusions having optical transparency, which are formed to be adjacent to each other on one surface of the base member, and a gap portion formed between the protrusions. An area of an end surface of the protrusion on a base member side is greater than an area of an end surface of the protrusion on a side opposite to the base member, and a ratio s/w of an interval s of two adjacent protrusions among the plurality of protrusions to a width w of the protrusion is equal to or less than 0.1.

(22) A roll screen according to a second aspect of the present invention includes: a lighting film; a winding mechanism that winds the lighting film around a shaft center; and an accommodation section that accommodates the shaft center and the winding mechanism. The lighting film includes a base member having optical transparency, a plurality of protrusions having optical transparency, which are formed to be adjacent to each other on one surface of the base member, a gap portion formed between the protrusions, and a light absorbing body provided in a region between the protrusions on the one surface of the base member.

(23) A roll screen according to a third aspect of the present invention includes: a lighting film; a winding mechanism that winds the lighting film around a shaft center; and an accommodation section that accommodates the shaft center and the winding mechanism. The lighting film includes a base member having optical transparency, a plurality of protrusions having optical transparency, which are formed to be adjacent to each other on one surface of the base member, a gap portion formed between the protrusions, and a second protrusion provided in a region between the protrusions on the one surface of the base member. The second protrusion has an inclined surface inclined with respect to the one surface of the base member and a height of the second protrusion is smaller than a height of the protrusion.

(24) In the roll screen according to any one of (21) to (23) described above, an area of an end surface of the protrusion on the base member side may be greater than an area of an end surface of the protrusion on the side opposite to the base member.

(25) In the roll screen according to (24) described above, the plurality of protrusions may include a plurality of protrusions having a side surface with an inclination angle that is changed in a continuous or stepwise manner from the base member side to the side opposite to the base member.

(26) In the roll screen according to (24) or (25) described above, the plurality of protrusions may include a plurality of protrusions having side surfaces with inclination angles different from each other.

(27) In the roll screen according to any one of (24) to (26) described above, the protrusion may extend in a straight line shape or in a curved line shape and two side surfaces of the protrusion in a cross section orthogonal to an extending direction of the protrusion may have an inclination angle that is changed in a continuous or stepwise manner from the base member side to the side opposite to the base member.

(28) A roll screen according to a fourth aspect of the present invention includes: a lighting film; a winding mechanism that winds the lighting film around a shaft center; and an accommodation section that accommodates the shaft center and the winding mechanism. The lighting film includes a base member having optical transparency, a plurality of protrusions having optical transparency, which are formed to be adjacent to each other on one surface of the base member, and a gap portion formed between the protrusions. The plurality of protrusions include a plurality of protrusions having a side surface with an inclination angle that is changed in a continuous or stepwise manner from a base member side to a side opposite to the base member.

(29) A roll screen according to a fifth aspect of the present invention includes: a lighting film; a winding mechanism that winds the lighting film around a shaft center; and an accommodation section that accommodates the shaft center and the winding mechanism. The lighting film includes a base member having optical transparency, a plurality of protrusions having optical transparency, which are formed to be adjacent to each other on one surface of the base member, and a gap portion formed between the protrusions. The plurality of protrusions include a plurality of protrusions having side surfaces with inclination angles different from each other.

(30) In the roll screen according to any one of (24) to (27) described above, among the plurality of protrusions, a part of two adjacent protrusions may be in contact with each other.

(31) A lighting louver according to a first aspect of the present invention includes: a plurality of lighting films which are tiltably supported with a predetermined interval therebetween. The lighting film includes a base member having optical transparency, a plurality of protrusions having optical transparency, which are formed to be adjacent to each other on one surface of the base member, and a gap portion formed between the protrusions. An area of an end surface of the protrusion on a base member side is greater than an area of an end surface of the protrusion on a side opposite to the base member, and a ratio s/w of an interval s of two adjacent protrusions among the plurality of protrusions to a width w of the protrusion is equal to or less than 0.1.

(32) A lighting louver according to a second aspect of the present invention includes: a plurality of lighting films which are tiltably supported with a predetermined interval therebetween. The lighting film includes a base member having optical transparency, a plurality of protrusions having optical transparency, which are formed to be adjacent to each other on one surface of the base member, a gap portion formed between the protrusions, and a light absorbing body provided in a region between the protrusions on the one surface of the base member.

(33) A lighting louver according to a third aspect of the present invention includes: a plurality of lighting films which are tiltably supported with a predetermined interval therebetween. The lighting film includes a base member having optical transparency, a plurality of protrusions having optical transparency, which are formed to be adjacent to each other on one surface of the base member, a gap portion formed between the protrusions, and a second protrusion provided in a region between the protrusions on the one surface of the base member. The second protrusion has an inclined surface inclined with respect to the one surface of the base member and a height of the second protrusion is smaller than a height of the protrusion.

(34) In the lighting louver according to any one of (31) to (33) described above, an area of an end surface of the protrusion on the base member side may be greater than an area of an end surface of the protrusion on the side opposite to the base member.

(35) In the lighting louver according to (34), the plurality of protrusions may include a plurality of protrusions having a side surface with an inclination angle that is changed in a continuous or stepwise manner from the base member side to the side opposite to the base member.

(36) In the lighting louver according to (34) or (35) described above, the plurality of protrusions may include a plurality of protrusions having side surfaces with inclination angles different from each other.

(37) In the lighting louver according to any one of (34) to (36) described above, the protrusion may extend in a straight line shape or in a curved line shape and two side surfaces of the protrusion in a cross section orthogonal to an extending direction of the protrusion may have an inclination angle that is changed in a continuous or stepwise manner from the base member side to the side opposite to the base member.

(38) A lighting louver according to a fourth aspect of the present invention includes: a plurality of lighting films which are tiltably supported with a predetermined interval therebetween. The lighting film includes a base member having optical transparency, a plurality of protrusions having optical transparency, which are formed to be adjacent to each other on one surface of the base member, and a gap portion formed between the protrusions. The plurality of protrusions include a plurality of protrusions having a side surface with an inclination angle that is changed in a continuous or stepwise manner from a base member side to a side opposite to the base member.

(39) A lighting louver according to a fifth aspect of the present invention includes: a plurality of lighting films which are tiltably supported with a predetermined interval therebetween. The lighting film includes a base member having optical transparency, a plurality of protrusions having optical transparency, which are formed to be adjacent to each other on one surface of the base member, and a gap portion formed between the protrusions. The plurality of protrusions include a plurality of protrusions having side surfaces with inclination angles different from each other.

(40) In the lighting louver according to any one of (34) to (37) described above, among the plurality of protrusions, a part of two adjacent protrusions may be in contact with each other.

Advantageous Effects of Invention

According to an aspect of the present invention, it is possible to provide a lighting film, a window glass, a roll screen, and a lighting louver, with which it is possible to regulate the glare which a person inside a room feels.

DESCRIPTION OF EMBODIMENTS

Hereinafter, embodiments of the present invention will be described with reference to the drawings. In the following description of the drawings, an X direction means a normal direction of a base member of a lighting film, a Y direction means a direction orthogonal to the X direction, and a Z direction means a direction orthogonal to the X direction and the Y direction.

First Embodiment

Figure 1:
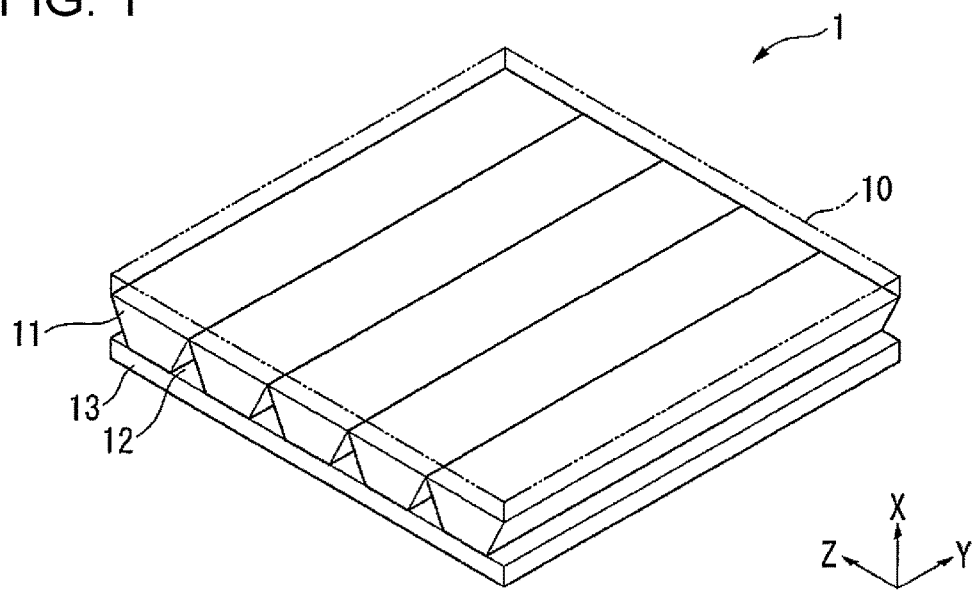
FIG. 1 is a perspective view showing a schematic configuration of a lighting film according to a first embodiment.
Figure 2:
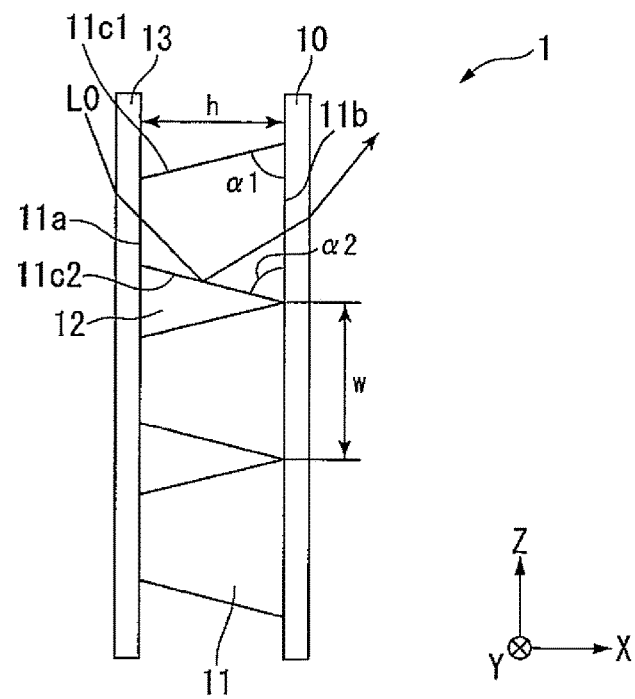
FIG. 2 is a sectional view showing the schematic configuration of the lighting film according to the first embodiment.

FIG. 1 is a perspective view showing a schematic configuration of a lighting film 1 according to a first embodiment. FIG. 2 is a sectional view showing the schematic configuration of the lighting film 1 according to the first embodiment.

As shown in FIG. 1 and FIG. 2, the lighting film 1 includes a base member 10 having optical transparency, a plurality of protrusions 11 having optical transparency, which are formed to be adjacent to each other on one surface of the base member 10, a gap portion 12 formed between the protrusions 11, and a protective member 13 having optical transparency, which is provided on a side opposite to the base member 10 with the plurality of protrusions 11 interposed therebetween.

Further, in the present embodiment, the protective member 13 having optical transparency is provided on the side opposite to the base member 10 with the plurality of protrusions 11 interposed therebetween, but the protective member 13 may not be provided. In other words, at least the base member 10 having optical transparency may only be provided.

In general, the base member 10 is formed of types of resins such as a thermoplastic polymer, a thermosetting resin, or a photopolymerizable resin. It is possible to use a base member having optical transparency, which is made of an acrylic polymer, an olefin-based polymer, a vinyl-based polymer, a cellulose-based polymer, an amide-based polymer, a fluorine-based polymer, an urethane-based polymer, a silicone-based polymer, an imide-based polymer, or the like. For example, it is preferable that, a base member having optical transparency such as a triacetyl cellulose (TAC) film, a polyethylene terephthalate (PET) film, a cyclo olefin polymer (COP) film, a polycarbonate (PC) film, a polyethylene naphthalate (PEN) film, a polyether sulfone (PES) film, a polyimide (PI) film, or the like, is used. In the present embodiment, as an example, a PET film having a thickness of 100 µm is used. It is preferable that, total optical transparency of the base member 10 is equal to or greater than 90% in accordance with JIS K7361-1.

It is possible to hereby achieve sufficient transparency.

The protrusion 11 is formed of an organic material having optical transparency and photosensitivity, such as an acrylic resin, an epoxy resin, or a silicone resin. It is possible to use a transparent resin mixture obtained by mixing a polymerization initiator, a coupling agent, a monomer, an organic solvent, or the like, to these resins. Further, the polymerization initiator may contain various types of additional components such as a stabilizer, an inhibitor, a plasticizer, a fluorescent whitening agent, a release agent, a chain transfer agent, or another photopolymerizable monomer. Otherwise, it is possible to use a material disclosed in Japanese Patent No. 4129991. It is preferable that total light transmittance of the protrusion 11 is equal to or greater than 90 in accordance with the regulations in JIS K7361-1. It is possible to hereby obtain sufficient transparency.

Each of the plurality of protrusions 11 has a longitudinal direction substantially in one direction (Y direction) and is disposed to have the one direction in a direction parallel to one side of the base member 10 having a rectangular shape. In a case of the present embodiment, each of the plurality of protrusions 11 is formed to have a stripe shape with a certain width in the Y direction. Each of the plurality of protrusions 11 is disposed to have the longitudinal direction thereof in the direction parallel to the one side of the base member 10 having the rectangular shape. A cross section (XZ cross section) parallel to a width direction of the protrusion 11 in each of the plurality of protrusions 11 has a trapezoidal shape or a triangular shape.

When w represents a width of the protrusion 11 in a widthwise direction and h represents a height of the base member 10 of the protrusion 11 in the normal direction (X direction), the widths w and the heights h of the plurality of protrusions 11 are all equal. For example, the width w of the protrusion 11 is, for example, from 10 µm to 50 µm and the height h of the protrusion 11 is, for example, from 10 µm to 100 µm.

When an angle between an end surface 11b of the protrusion 11 on the base member 10 side and a side surface 11c1 of the protrusion 11 is an angle $\alpha 1$ and an angle between the end surface 11b of the protrusion 11 on the base member 10 side and a side surface 11c2 of the protrusion 11 is an angle $\alpha 2$, the angles $\alpha 1$ and the angles $\alpha 2$ of the plurality of protrusions 11 are all equal. For example, the angle $\alpha 1$ is, for example, from 70° to 80° and the angle $\alpha 2$ is, for example, from 70° to 80°.

The gap portion 12 is filled with a gas such as air and has a refractive index of approximately 1. The gap portion 12 is formed to have the refractive index of 1 and to have the minimum critical angle on an interface (side surface 11c2 of the protrusion 11) between the gap portion 12 and the protrusion 11. In the case of the present embodiment, the gap portion 12 is formed of an air layer which is formed of the air; however, the gap portion 12 may be an inert gas layer which is formed of an inert gas such as nitrogen, or may be an pressure reduction layer having a pressure reduction state.

The lighting film 1 is attached to a glass substrate of a window glass such that an arrangement direction of the protrusions 11 becomes a perpendicular direction. Of light entering from the upper side of the lighting film 1, light L0 incident to the inside of the protrusion 11 from one end of the protrusion 11 is totally reflected from the side surface 11c2 of the protrusion 11 and is again emitted toward the upper side of the lighting film 1. The light reflected from the protrusion 11 is guided to a ceiling inside a room or deep inside the room and illuminates the inside of the room.

In the present embodiment, an end surface 11a of the protrusion 11 on a side (protective member 13 side) opposite to the base member 10 is formed as a light incident end surface and an end surface 11b of the protrusion 11 on the base member 10 is formed as a light emission end surface.

An area of the end surface 11b of the protrusion 11 on the base member 10 side is greater than an area of the end surface 11a of the protrusion 11 on the protective member 13 side. In the present embodiment, among the plurality of protrusions 11, edges of two adjacent protrusions 11 on the base member 10 side are in contact with each other.

Further, in the present embodiment, among the plurality of protrusions 11, the edges of two adjacent protrusions 11 on the base member 10 side are in contact with each other; however, the configuration is not limited thereto. For example, the edges of two adjacent protrusions 11 on the base member 10 side may be continuous to each other such that the edges of two adjacent protrusions 11 on the base member 10 side overlap each other. In addition, among all of the plurality of protrusions 11, the contact is not limited to a part of two adjacent protrusions 11. For example, of a part of the protrusions 11 among the plurality of protrusions 11, a part of the two adjacent protrusions 11 may be in contact. In other words, the plurality of protrusions 11 may have a configuration in which a part of the two adjacent protrusions 11 are in contact.

As a manufacturing method of the lighting film 1 according to the present embodiment, it is possible to employ a method using a photo process. Further, it is possible to manufacture the lighting film 1 using a method such as a melt-extrusion method or a mold-extrusion method, in addition to the method using the photo process. Using the method such as the melt-extrusion method or the mold-extrusion method, the base member 10 and the protrusions 11 are integrally formed of the same resin.

Hereinafter, an example of a room model will be described with reference to FIG. 3.

Figure 3:
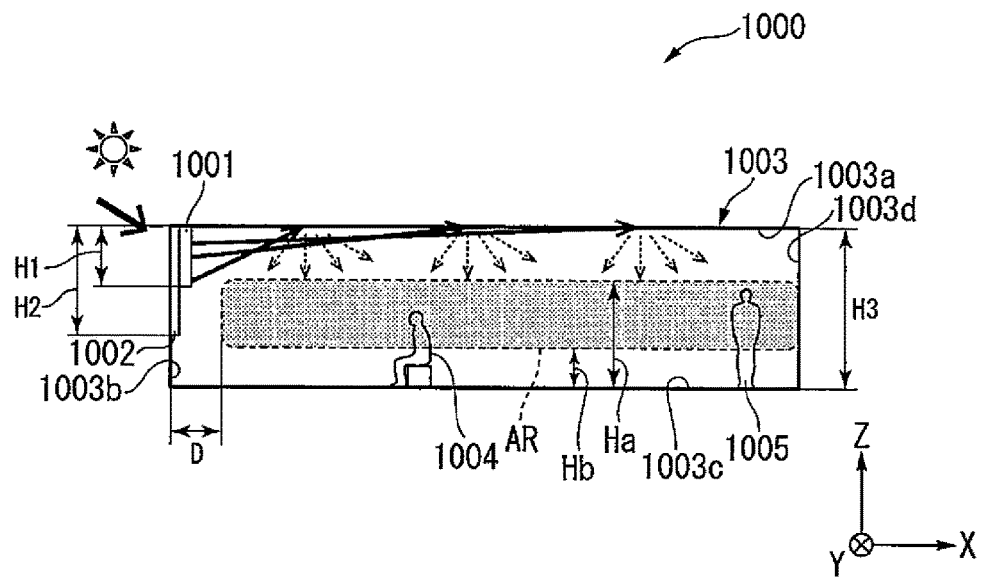
FIG. 3 is a view showing an example of a room model.

FIG. 3 is a view showing an example of a room model 1000. In FIG. 3, reference sign 1001 represents a lighting film according to a comparative example, reference sign 1002 represents a window, reference sign 1003 represents a room, reference sign 1003a represents a ceiling, reference sign 1003b represents a wall on a side to which sunlight is incident, reference sign 1003c represents a floor, reference sign 1003d represents a wall facing the wall 1003b, reference sign 1004 represents a person sitting on a chair, and reference sign 1005 represents a person standing on the floor 1003c.

As shown in FIG. 3, the room 1003 is an example of an office and the room 1003 has a rectangular shape in a cross section (XZ cross section). A height H3 (height from the floor 1003c to the ceiling 1003a) of the room 1003 is, for example, 2.7 m. The window 1002 is provided in a portion of the wall 1003b, for example, which is 1.8 m from the ceiling 1003a. A height H2 of the window 1002 is, for example, 1.8 m. The lighting film 1001 is provided in a portion (for example, a portion which is 0.6 m from the ceiling 1003*a*) in which a human field of view is not blocked on the inner surface of the window 1002. A height H1 of the lighting film 1001 is 0.6 m.

In the room model 1000, it is assumed that a person moves in a place which is 1 m apart from the wall 1003*b*. In a portion D in the vicinity of the window, no one is present. The portion D in the vicinity of the window is, for example, 1 m from the window. A region, in which a person moves, is assumed on the basis of the portion D in the vicinity of the window.

In addition, it is assumed that a position of an eye of a person is, for example, 0.8 m to 1.8 m from the floor 1003*c*.

A height Ha of the eye of the person 1005 standing on the floor 1003*c* is, for example, 1.8 m. A height Hb of the eye of the person 1004 sitting on the chair is, for example, 0.8 m. A range of a position of the eye of the person is assumed on the basis of the heights Ha and Hb of the eyes.

The lighting film 1001 has a function of causing external light to travel toward the ceiling 1003*a*. The light traveling toward the ceiling 1003*a* reflects from the ceiling 1003*a* and illuminates the inside of the room so as to work instead of lighting. However, actually, the light passing through the lighting film 1001 travels not only toward the ceiling 1003*a*, but also toward the wall 1003*d* or the floor 1003*c*. At this time, the light passing through the lighting film 1001 includes light traveling toward the position of an eye of a person present inside the room. Such light causes the person present inside the room to feel glare. In the room model 1000, a region in which the person inside the room is caused to feel glare is referred to as a glare region AR. A range of the glare region AR is defined on the basis of the region in which the person moves and the position of the eye.

The glare region AR is a region which is, for example, 0.8 m to 1.8 m from the floor 1003*c* in a position which is 1 m apart from the wall 1003*b*.

Next, definitions of an incident angle of light incident to the lighting film 1001 and an emission angle of light emitted from the lighting film 1001 will be described with reference to FIG. 4.

Figure 4:
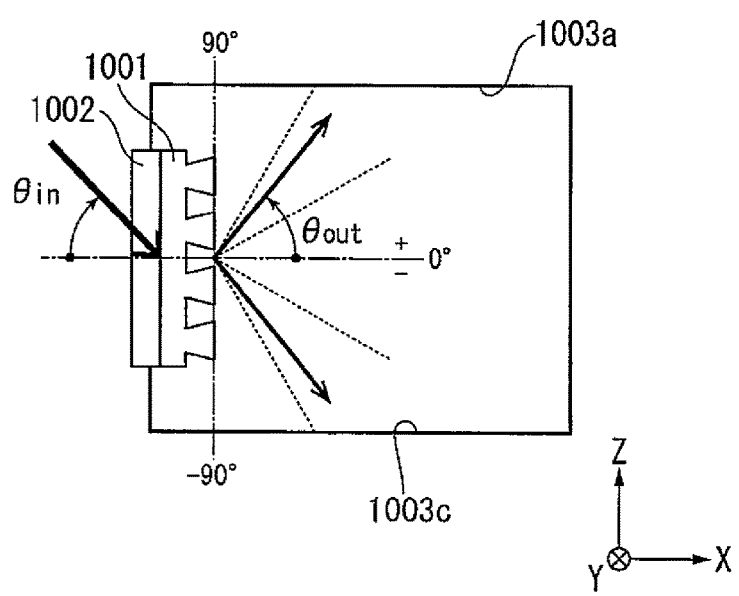
FIG. 4 is a diagram showing an incident angle and an emission angle.

FIG. 4 is a diagram showing the incident angle and the emission angle. The base member of the lighting film 1001 is not shown in FIG. 4, for the convenience. In FIG. 4, an angle between a horizontal direction (X direction) and light incident to the lighting film 1001 is an incident angle θin and an angle between the horizontal direction and light emitted from the lighting film 1001 is an emission angle θout. The emission angle θout is 0° in a normal direction through the center (center of an interface between the protrusion and the base member) of the lighting film 1001, an angle toward the ceiling 1003*a* from the horizontal direction is a positive (+) angle and an angle toward the floor 1003*c* from the horizontal direction is a negative (−) angle. In other words, the emission angle θout is positive when a counterclockwise angle is formed and is negative when a clockwise angle is formed.

Next, as a comparative example, a room model having luminous flux of light passing through the glare region AR, which is greater than a threshold value E to be described below, will be described with reference to FIG. 5 and FIG. 6.

Figure 5:
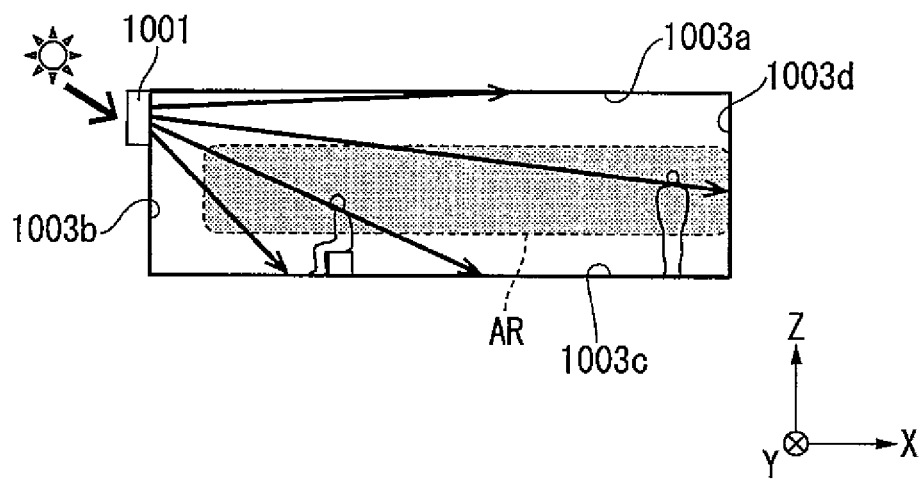
FIG. 5 is a view showing a comparative example of a room model.

FIG. 5 is a view showing a comparative example of the room model. The window is not shown in FIG. 5, for the convenience, and the lighting film 1001 according to the comparative example is provided on the outer surface of the window.

As shown in FIG. 5, the light passing through the lighting film 1001 travels not only toward the ceiling 1003*a*, but also toward the wall 1003*d* or the floor 1003*c*. The light passing through the lighting film 1001 includes light traveling toward the glare region AR.

Figure 6:
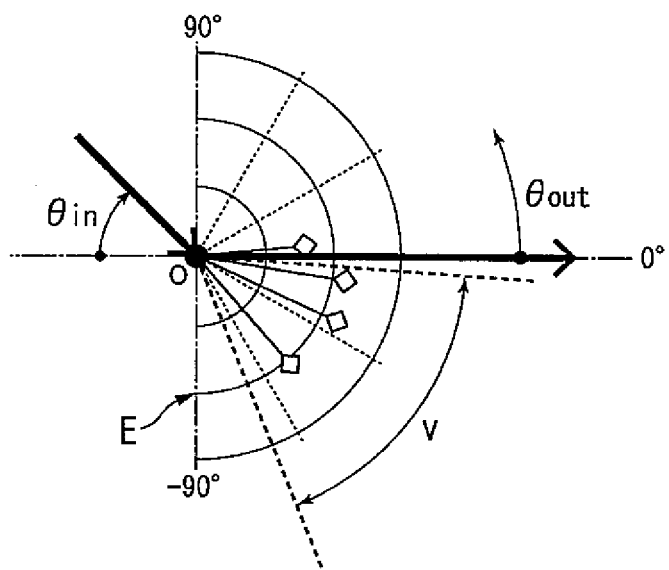
FIG. 6 is a diagram showing a direction of emission light and distribution of emission light in the comparative example.

FIG. 6 is a diagram showing a direction of emission light and distribution of the emission light. The lighting film is not shown in FIG. 6, for the convenience, and an origin point O represents the center of the lighting film. In FIG. 6, a range V represents a range of directions of light traveling toward the glare region AR of the emission light from the lighting film. In addition, a threshold value E represents the lower limit value of light intensity with which a person feels the glare.

As an index of the glare, a unified glare rating (UGR) is used. For example, in office surroundings, the reference upper limit UGR of the glare is 21. Therefore, as the threshold value E, it is possible to use a value indicating luminance having "the UGR of 21" at a position of an observer inside a room.

As shown in FIG. 6, in the comparative example, most of the light passing through the lighting film 1001 (refer to FIG. 5) is present in the range V and the intensity of the light within the range V exceeds the threshold value E.

Therefore, in the comparative example, when the light passing through the lighting film 1001 enters an eye of a person, the person feels the glare.

Next, as Improvement Example 1, a room model in which the intensity of the light passing through the glare region AR is less than the threshold value E will be described with reference to FIG. 7 and FIG. 8.

Figure 7:
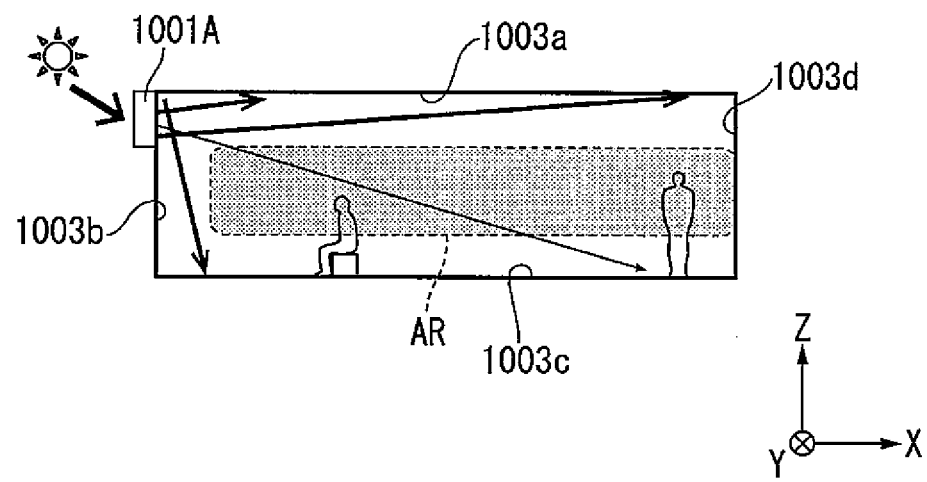
FIG. 7 is a view showing Improvement Example 1 of a room model.

FIG. 7 is a view showing Improvement Example 1 of the room model. The window is not shown in FIG. 7, for the convenience, and a lighting film 1001A according to Improvement Example 1 is provided on the outer surface of the window.

As shown in FIG. 7, the light passing through the lighting film 1001A travels not only toward the ceiling 1003*a*, but also toward the wall 1003*d* or the floor 1003*c*. The light passing through the lighting film 1001A includes light traveling toward the glare region AR. However, in Improvement Example 1, a small amount of light travels toward the glare region AR.

Figure 8:
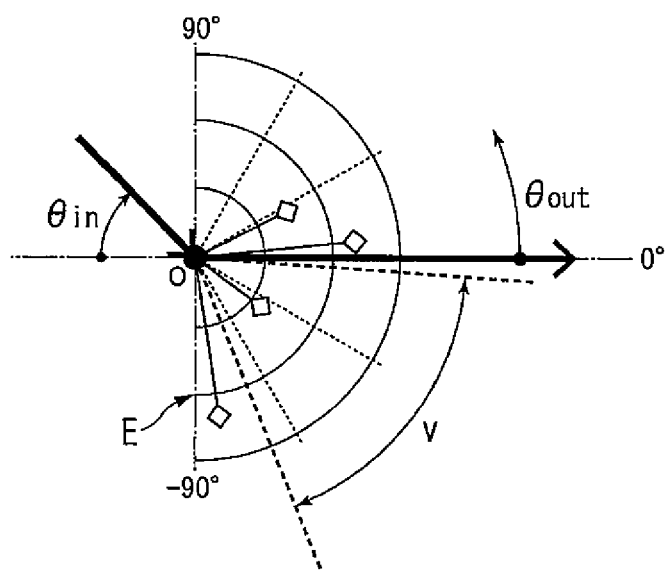
FIG. 8 is a diagram showing a direction of emission light and distribution of emission light in Improvement Example 1.

FIG. 8 is a diagram showing a direction of emission light and distribution of the emission light in Improvement Example 1. The lighting film is not shown in FIG. 8, for the convenience, and the origin point O represents the center of the lighting film. In FIG. 8, the range V represents a range of light traveling toward the glare region AR of the emission light from the lighting film. In addition, the threshold value E represents the lower limit value of the light intensity with which a person feels the glare.

As shown in FIG. 8, in Improvement Example 1, only a small amount of the light passing through the lighting film 1001A (refer to FIG. 7) is present in the range V and the intensity of the light within the range V is less than the threshold value E. Therefore, in Improvement Example 1, although the light passing through the lighting film 1001A enters an eye of a person, the person does not feel the glare. In other words, if it is possible to regulate the intensity of the light traveling toward the glare region AR to the extent that a person does not feel the glare, the intensity of the light traveling toward the glare region AR may not be zero.

Next, as Improvement Example 2, a room model in which the intensity of the light passing through the glare region AR is less than the threshold value E will be described with reference to FIG. 9 and FIG. 10.

Figure 9:
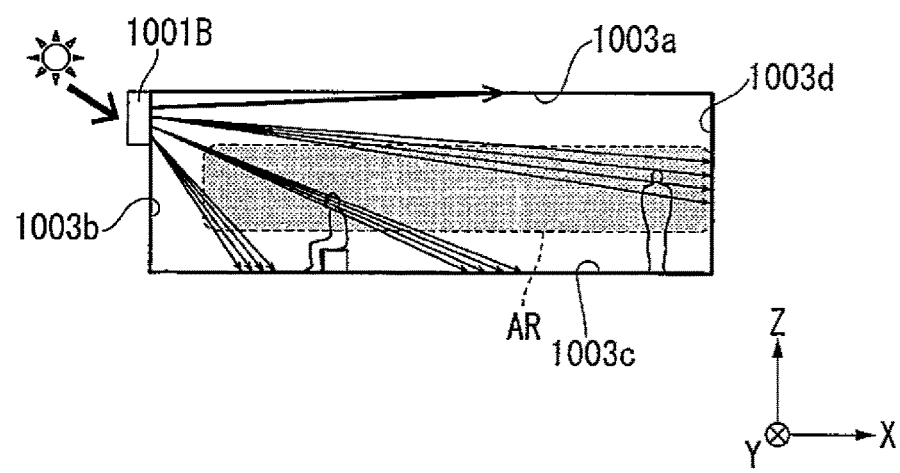
FIG. 9 is a view showing Improvement Example 2 of a room model.

FIG. 9 is a view showing Improvement Example 2 of the room model. The window is not shown in FIG. 9, for the convenience, and a lighting film 1001B according to Improvement Example 2 is provided on the outer surface of the window.

As shown in FIG. 9, the light passing through the lighting film 1001B travels not only toward the ceiling 1003a, but also toward the wall 1003d or the floor 1003c. The light passing through the lighting film 1001B includes the light traveling toward the glare region AR. However, in Improvement Example 2, the light traveling toward the glare region AR is dispersed.

Figure 10:
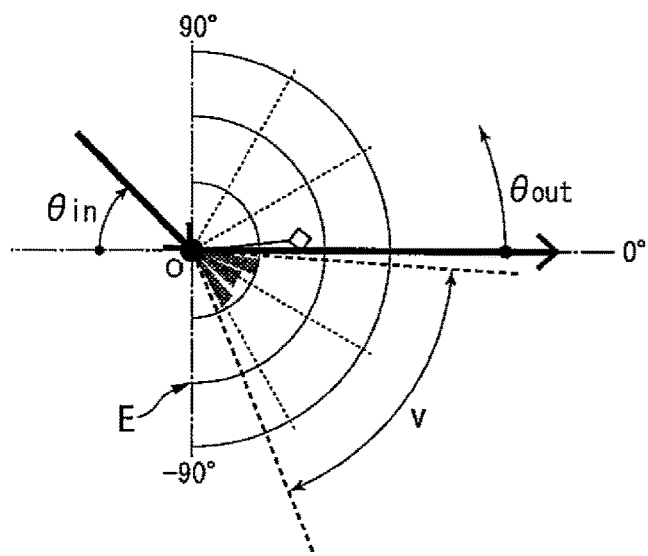
FIG. 10 is a diagram showing a direction of emission light and distribution of emission light in Improvement Example 2.

FIG. 10 is a diagram showing a direction of the emission light and distribution of the emission light in Improvement Example 2. The lighting film is not shown in FIG. 10, for the convenience, and the origin point O represents the center of the lighting film. In FIG. 10, the range V represents a range of light traveling toward the glare region AR of the emission light from the lighting film. In addition, the threshold value E represents the lower limit value of the light intensity with which a person feels the glare.

As shown in FIG. 10, in Improvement Example 2, although most of the light passing through the lighting film 1001B (refer to FIG. 9) is present in the range V, the light in the range V is dispersed. Hence, the intensity of the light in the range V is less than the threshold value E. Therefore, in Improvement Example 2, although the light passing through the lighting film 1001B enters an eye of a person, the person does not feel the glare. In other words, if it is possible to disperse the light traveling toward the glare region AR to the extent that a person does not feel the glare, the light traveling toward the glare region AR may be present.

Next, a configuration of the lighting film 1001 according to the comparative example will be described with reference to FIG. 11 and FIG. 12.

Figure 11:
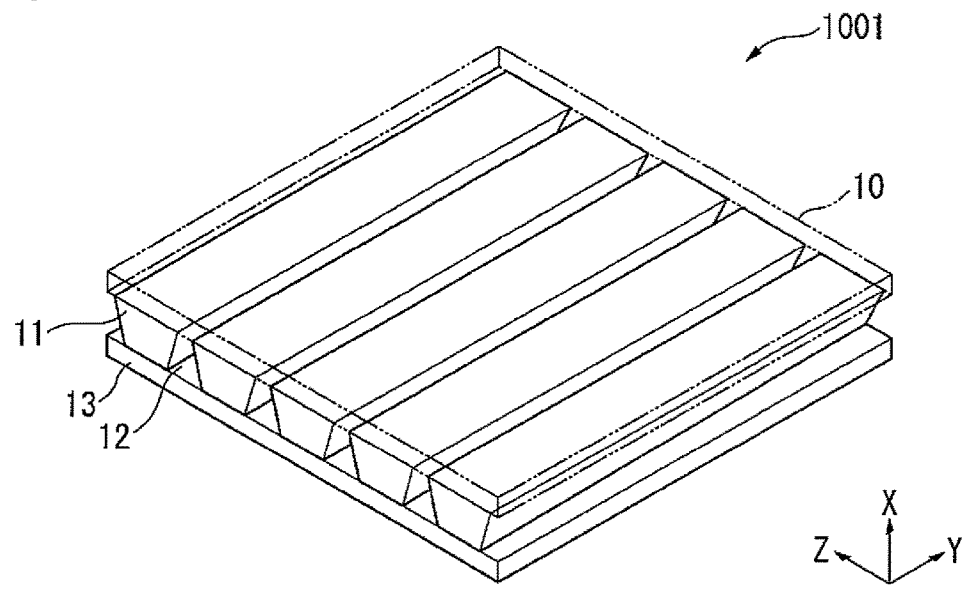
FIG. 11 is a perspective view showing a schematic configuration of the lighting film according to the comparative example.

FIG. 11 is a perspective view showing a schematic configuration of the lighting film 1001 according to the comparative example. FIG. 12 is a sectional view showing a schematic configuration of the lighting film 1001 according to the comparative example.

Figure 12:
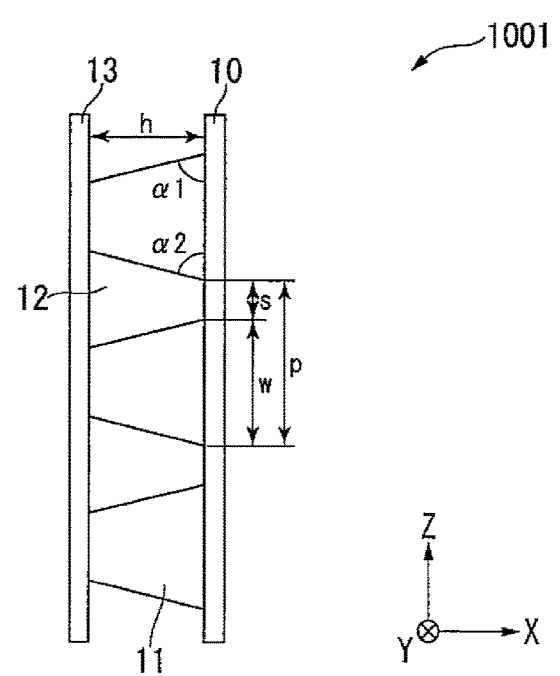
FIG. 12 is a sectional view showing a schematic configuration of the lighting film according to the comparative example.

As shown in FIG. 11 and FIG. 12, the configuration of the lighting film 1001 according to the comparative example is fundamentally the same as the configuration of the lighting film 1 according to the first embodiment. However, in the comparative example, of the plurality of protrusions 11, the edges of the two adjacent protrusions 11 on the base member 10 are separated from each other. In other words, the base member 10 is exposed in a region (non-forming region of the protrusion 11) except the forming region of the protrusions 11 on one surface of the base member 10.

When s represents an interval between the edges of the two adjacent protrusions 11 on the base member 10 side and p represents a pitch of the protrusions 11 in the arrangement direction (Z direction), the intervals s and the pitches p of the plurality of protrusions 11 are all equal. For example, the interval s is from 5 μm to 10 μm. In addition, in the plurality of protrusions 11, a ratio s/w of the interval s to the width w of the protrusion 11 is, for example, about 0.125 (s/w>0.1).

Incidentally, an emission direction of light emitted from the lighting film is determined depending on an incident position of the light incident to the lighting film and an incident angle θin.

Next, in a case where light enters the lighting film from the upper side, a relationship between the incident position of the light incident to the lighting film and the emission direction of the light emitted from the lighting film will be described with reference to FIG. 13.

Figure 13:
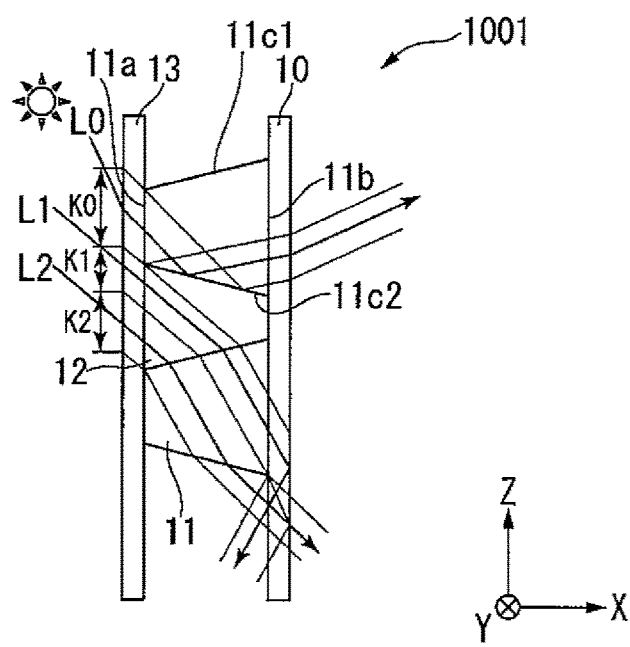
FIG. 13 is a view showing a traveling direction of light passing through the lighting film according to the comparative example.

FIG. 13 is a view showing the traveling direction of the light passing through the lighting film 1001 according to the comparative example.

As shown in FIG. 13, of the light entering the lighting film 1001 from the upper side, light L0 incident to the inside of the protrusion 11 from the end surface 11a of the protrusion 11 at an incident position K0 is totally reflected from the side surface 11c2 (interface between the protrusion 11 and the gap portion 12) of the protrusion 11 and is again emitted toward the upper side of the lighting film 1001. The light L0 reflected from the side surface 11c2 of the protrusion 11 is guided to a ceiling inside a room or deep inside the room and illuminates the inside of the room.

Of the light entering the lighting film 1001 from the upper side, light L1 incident to the non-forming region of the protrusion 11 at an incident position K1 is incident to the side surface 11c1 of the protrusion 11. The light L1 incident to the side surface 11c1 of the protrusion 11 transmits through the protrusion 11 without being reflected from the side surface 11c1, totally reflected from the other surface (interface between the base member 10 and air) of the base member 10, and is emitted from of the lighting film 1001 to the lower side. The light L1 reflected from the other surface of the base member 10 travels toward the outside of the room.

Of the light entering the lighting film 1001 from the upper side, light L2 incident to the non-forming region of the protrusion 11 at an incident position K2 is incident to the side surface 11c1 of the protrusion 11. The light L2 incident to the side surface 11c1 of the protrusion 11 transmits through the protrusion 11 without being reflected from the side surface 11c1 and is emitted from the lighting film 1001 to the lower side. The light L2 transmitting through the protrusion 11 may travel toward the glare region AR.

Next, in a case where light enters the lighting film from the upper side, a relationship between the incident angle θin of the light incident to the lighting film and the emission direction of the light emitted from the lighting film will be described with reference to FIG. 14.

Figure 14:
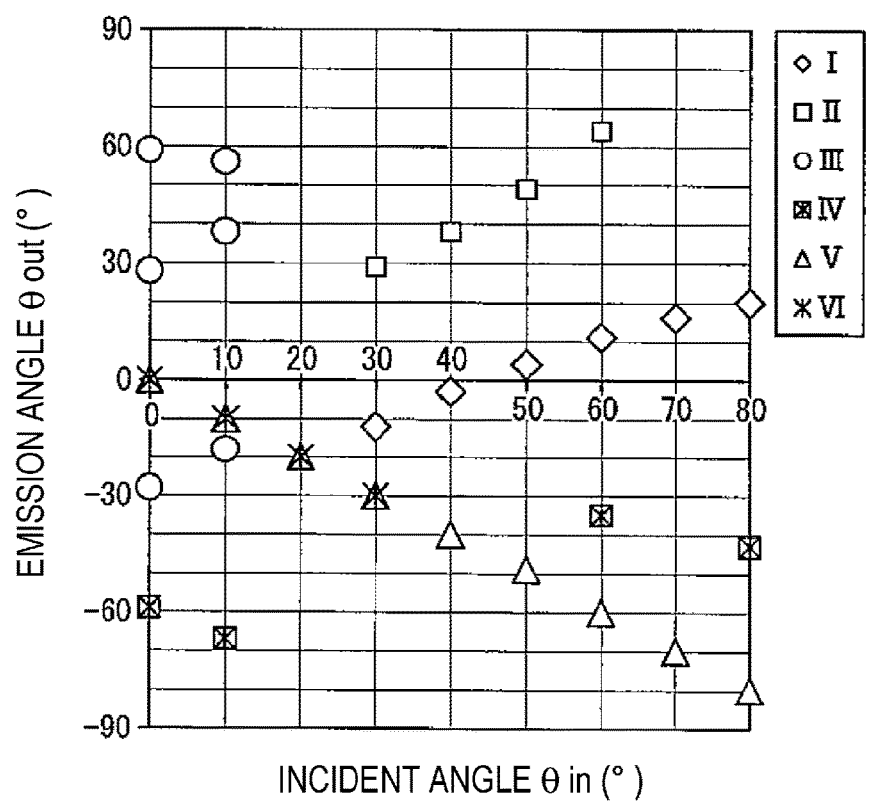
FIG. 14 is a diagram showing a relationship between an incident angle and an emission angle of light to and from the lighting film according to the comparative example.

FIG. 14 is a diagram showing a relationship between the incident angle θin and an emission angle θout of the light to and from the lighting film 1001 according to the comparative example. In FIG. 14, the horizontal axis represents the incident angle θin(°) and the vertical axis represents the emission angle θout(°). In addition, a plot I indicates a case where light incident to the protrusion 11 is totally reflected from the side surface 11c2 of the protrusion 11, a plot II indicates a case where light incident to the non-forming region of the protrusion 11 is totally reflected from the side surface 11c2 of the protrusion 11, a plot III indicates a case where light incident to the non-forming region of the protrusion 11 is totally reflected from the side surface 11c1 of the protrusion 11, a plot IV indicates a case where light incident to the non-forming region of the protrusion 11 is refracted from the side surfaces 11c1 and 11c2 and the end surface 11b of the protrusion 11, a plot V indicates a case where light incident to the protrusion 11 transmits through without a change in angle, and a plot VI indicates a case where light incident to the non-forming region of the protrusion 11 transmits through without a change in angle, respectively. Further, FIG. 14 is generated on the basis of results of a simulation conducted under a condition in which the width w of the protrusion 11 is 23 μm, the interval s between the protrusions 11 is 7 μm, the height h of the protrusion 11 is 20 μm, the angles α1 and α2 of the protrusion 11 are 76°, respectively, and a refractive index of the protrusion 11 and a refractive index of the base member 10 are 1.49, respectively.

As illustrated in FIG. 14, it is understood that the emission angle θout of the light emitted from the lighting film 1001 is greater than the incident angle θin of the light incident to the lighting film 1001. In addition, the emission direction of the light incident to the protrusion 11 is different of the emission direction of the light incident to the non-forming region of the protrusion 11.

Next, in the case where light enters the lighting film from the upper side, a relationship between the incident angle θin of the light incident to the lighting film and luminous flux of the light emitted from the lighting film will be described with reference to FIG. 15.

Figure 15:
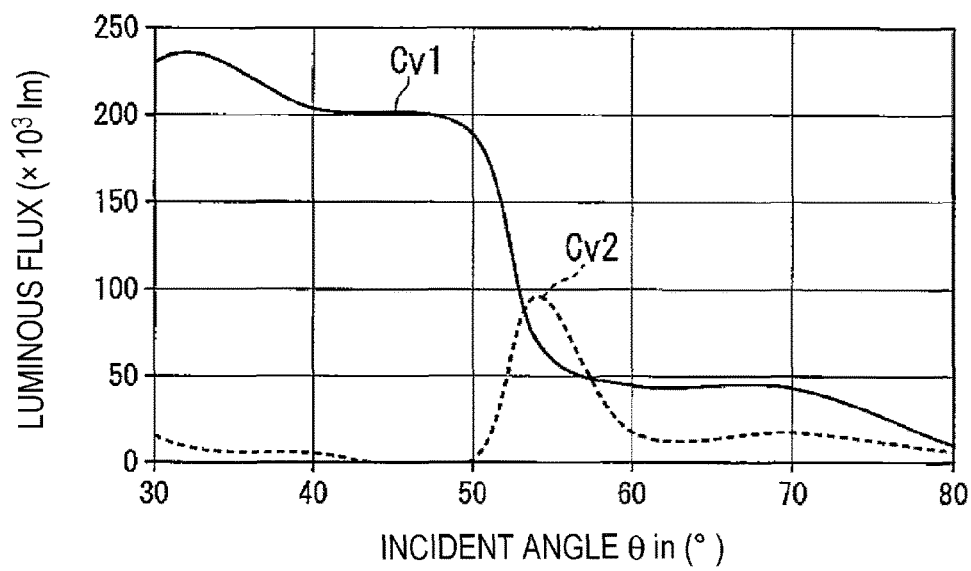
FIG. 15 is a graph showing a relationship between an incident angle and luminous flux of light to and from the lighting film according to the comparative example.

FIG. 15 is a graph showing the relationship between the incident angle θin of the light incident to the lighting film 1001 and the luminous flux, according to the comparative example. In FIG. 15, the horizontal axis represents the incident angle θin(°) and the vertical axis represents luminous flux ($\times 10^3$ lm). In addition, a curve Cv1 indicates luminous flux of light traveling toward the ceiling 1003a of the light entering the lighting film 1001 from the upper side and a curve Cv2 indicates luminous flux of the light traveling toward the glare region AR of the light entering the lighting film 1001 from the upper side. Further, FIG. 15 is generated on the basis of results of a simulation conducted under a condition in which the width w of the protrusion 11 is 30 μm, the interval s between the protrusions 11 is 5 μm, the height h of the protrusion 11 is 40 μm, the angles α1 of the protrusion 11 is 70°, the angle α2 of the protrusion 11 is 80°, and a refractive index of the protrusion 11 and a refractive index of the base member 10 are 1.49, respectively.

As shown in FIG. 15, the luminous flux of the light traveling toward the ceiling 1003a is maintained to have a value equal to or greater than $200\times 10^3$ lm until the incident angle θin becomes 46°. However, the luminous flux is rapidly decreased when the incident angle θin exceeds 46° and the luminous flux is less than $50\times 10^3$ lm when the incident angle θin exceeds 56°.

Meanwhile, the luminous flux of the light traveling toward the glare region AR is maintained to have a value equal to or less than $20\times 10^3$ lm until the incident angle θin becomes 50°. However, the luminous flux is rapidly increased when the incident angle θin exceeds 50° and the luminous flux has the maximum value when the incident angle θin is 54°. Also, the luminous flux is rapidly decreased when the incident angle θin exceeds 54° and the luminous flux is less than $20\times 10^3$ lm when the incident angle θin exceeds 60°.

Next, a relationship between the incident angle θin of the light incident to the lighting film and the emission direction of the light emitted from the lighting film, at an incident angle, which is approximately the incident angle and at which the luminous flux in the glare region AR becomes the maximum value, in the non-forming region of the protrusion 11 will be described with reference to FIG. 16.

Figure 16:
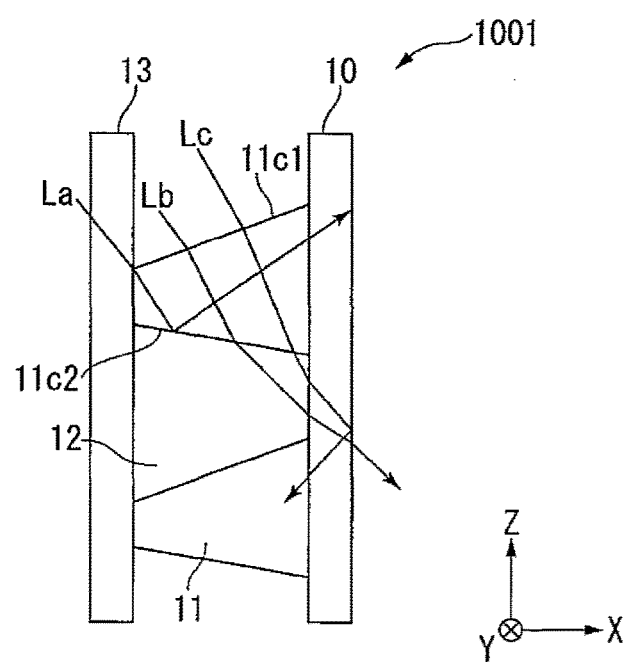
FIG. 16 is a diagram showing a traveling direction of light incident to the lighting film approximately at the incident angle at which the luminous flux in a glare region becomes the maximum value, in a non-forming region of the protrusion.

FIG. 16 is a diagram showing a traveling direction of the light incident to the lighting film 1001, in the non-forming region of the protrusion 11 at an incident angle (50° to 60°), which is approximately the incident angle θin and at which the luminous flux in the glare region AR becomes the maximum value. In FIG. 16, La represents light incident to the lighting film 1001 at the incident angle θin of 50°, Lb represents light incident to the lighting film at the incident angle θin of 54°, and Lc represents light incident to the lighting film at the incident angle θin of 60°.

As shown in FIG. 16, the light La incident to the lighting film 1001 at the incident angle θin of 50° in the non-forming region of the protrusion 11 is incident to the side surface 11c1 of the protrusion 11. The light La incident to the side surface 11c1 of the protrusion 11 transmits through the protrusion 11 without being reflected from the side surface 11c1, is totally reflected from the side surface 11c2 (interface between the protrusion 11 and the gap portion 12) of the protrusion 11, and is again emitted from the lighting film 1001 toward the upper side. The light La reflected from the side surface 11c2 of the protrusion 11 is guided to a ceiling inside a room or deep inside the room and illuminates the inside of the room.

Light Lb incident to the lighting film 1001 at the incident angle θin of 54° in the non-forming region of the protrusion 11 is incident to the side surface 11c1 of the protrusion 11. The light Lb incident to the side surface 11c1 of the protrusion 11 transmits through the protrusion 11 without being reflected from the side surface 11c1, is refracted from the side surface 11c2 of the protrusion 11, escapes through a space between the two adjacent protrusions 11, and is emitted from the lighting film 1001 to the lower side. The light Lb transmitting through the protrusion 11 may travel toward the glare region AR.

Light Lc incident to the lighting film 1001 at the incident angle θin of 60° in the non-forming region of the protrusion 11 is incident to the side surface 11c1 of the protrusion 11. The light Lc incident to the side surface 11c1 of the protrusion 11 transmits through the protrusion 11 without being reflected from the side surface 11c1, is refracted from the side surface 11c2 of the protrusion 11, escapes through the space between the two adjacent protrusions 11, is totally reflected from the other surface (interface between the base member 10 and the air) of the base member 10, and is emitted from the lighting film 1001 to the lower side. The light Lc reflected from the other surface of the base member 10 travels toward the outside of the room.

The present inventors finds, through a profound study, that, decrease of the luminous flux of the light traveling toward the glare region AR may be achieved through decreasing the luminous flux of the light escaping through the space between the two adjacent protrusions 11 in the lighting film 1001, of the light incident to the non-forming region of the protrusion 11 approximately at the incident angle θin of 54°. Therefore, the lighting film 1 according to present embodiment has a configuration in which the edges of the two adjacent protrusions 11 on the base member 10 side of the plurality of protrusions 11 are in contact with each other (refer to FIG. 1 and FIG. 2).

Hereinafter, effects of the lighting film 1 according to the present embodiment will be described with reference to FIG. 17.

Figure 17:
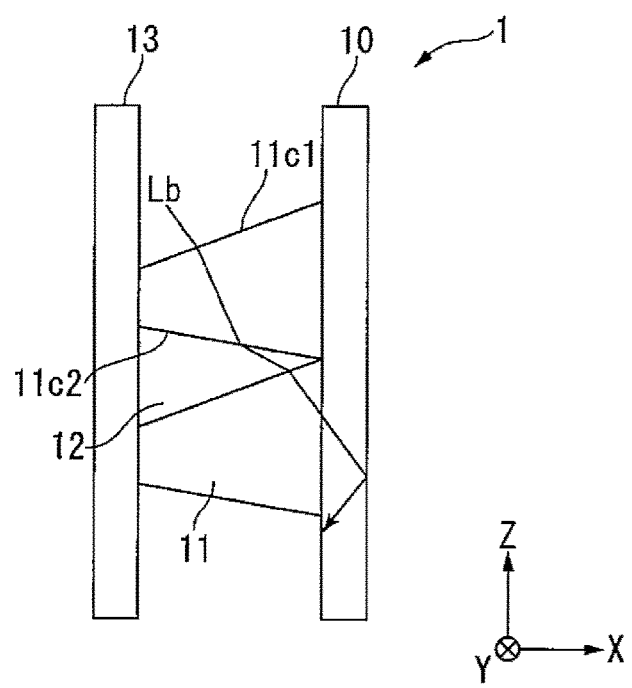
FIG. 17 is a diagram showing an effect of the lighting film according to the first embodiment.

FIG. 17 is a diagram showing an effect of the lighting film 1 according to the present embodiment.

As shown in FIG. 17, the light Lb incident to the lighting film 1 at the incident angle θin of 54° in the non-forming region of the protrusion 11 is incident to the side surface 11c1 of the protrusion 11. The light Lb incident to the side surface 11c1 of the protrusion 11 transmits through the protrusion 11 without being reflected from the side surface 11c1 and is refracted from the side surface 11c2 of the protrusion 11. In the present embodiment, since the edges of the two adjacent protrusions 11 on the base member 10 in the plurality of protrusions 11 are in contact with each other, the light Lb refracted from the side surface 11c2 of the protrusion 11 is incident to the side surface 11c1 of the protrusion 11 adjacent to the protrusion 11 through which the light has transmitted without escaping through a space between the two adjacent protrusions 11. The light Lb incident to the side surface 11c1 of the corresponding protrusion 11 transmits through the corresponding protrusion 11, is totally reflected from the other surface (interface between the base member 10 and the air) of the base member 10, and is emitted from the lighting film 1 to the lower side. The light Lb reflected from the other surface of the base member 10 travels toward the outside of the room.

In this manner, in the lighting film 1 according to the present embodiment, since the edges of the two adjacent protrusions 11 on the base member 10 in the plurality of protrusions 11 are in contact with each other, it is possible to regulate the light incident to the lighting film 1 from the upper side not to escape though the space between the two adjacent protrusions 11 and not to travel toward the glare region AR. It is possible to hereby regulate the glare which a person inside the room feels.

In addition, in this configuration, the top of the protrusion 11 is covered with the protective member 13. Therefore, performance of the lighting film 1 is regulated not to deteriorate due to dirt which is attached to the gap portion 12.

Further, in the present embodiment, a colorless and transparent member is used as the base member 10 and the protrusion 11; however, the color of the base member 10 or the protrusion 11 is not limited thereto. For example, in order to adjust a color temperature of light entering the inside of the room, the base member 10 or the protrusion 11 may be colored to light yellow, light orange, light blue, or the like. In addition, in view of design, a part of or all of the base member 10 or the protrusions 11 may be colored to red, blue, or the like. It is possible for the base member 10 and the protrusion 11 to be hereby applied to stained glass, or the like. However also in the case, in order to satisfy the usage as the window, the lighting film needs to have visible optical transparency to the extent that facing side is viewed therethrough. The base member 10 and the protrusion 11 are configured as a member having the optical transparency; however, "to have optical transparency" in the present specification means to have visible optical transparency to the extent that at least the facing side is seen therethrough.

In addition, in the present embodiment, the protrusion 11 is formed to have a stripe shape with a certain width; the shape of the protrusion 11 is not limited thereto. When each of the plurality of protrusions 11 has a longitudinal direction substantially in one direction and is disposed to have the one direction in a direction parallel to one side of the base member 10 having a rectangular shape, the same function effects as those in the present embodiment are obtained. Here, "each of the plurality of protrusions 11 has a longitudinal direction substantially in one direction" which means, for example, the following description. In other words, isotropically dispersing light such as fluorescent light is caused to be incident to the inside of the base member 10 from the protective member 13 side (side of the base member 10 on which the protrusions 11 are formed) and polar angle luminance distribution of light emitted to the outside of the plurality of protrusions 11 is measured. At this time, in a case where there are a direction in which luminance of the light emitted from the plurality of protrusions 11 is strong and a direction in which the luminance is relatively weak, it is described that the protrusions have a longitudinal direction substantially in one direction". A direction orthogonal to the direction in which the luminance is relatively strong is defined as the one direction".

In addition, in the present embodiment, an example, in which the edges of the two adjacent protrusions 11 on the base member 10 side among the plurality of protrusions 11 are in contact with each other, is described; however, the disposition is not limited thereto. In the plurality of protrusions 11, a ratio s/w of the interval s between the two adjacent protrusions 11 to the width w of the protrusion 11 may be equal to or less than 0.1. Hereinafter, description is provided with reference to FIG. 43.

Figure 43:
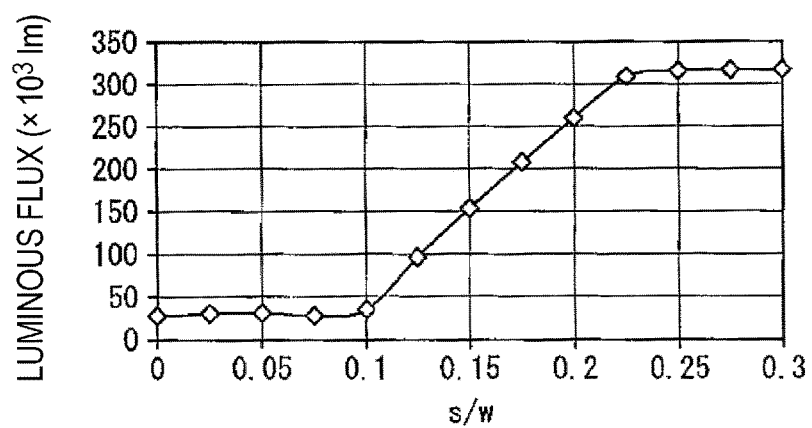
FIG. 43 is a graph showing a relationship between s/w and luminous flux in the lighting film according to the first embodiment.

FIG. 43 is a graph showing a relationship between s/w and the luminous flux in the lighting film 1 according to the first embodiment. In FIG. 43, the horizontal axis represents the ratio s/w of the interval s between the two adjacent protrusions 11 to the width w of the protrusion 11 in the plurality of protrusions 11 and the vertical axis represents luminous flux ($\times 10^3$ lm).

Further, the vertical axis represents the luminous flux of the light traveling toward the glare region AR of the light incident to the lighting film 1, at the incident angle θin of 54°. FIG. 43 shows calculation results obtained when intensity of the sunlight is 110,000 lux.

As shown in FIG. 43, the luminous flux of the light traveling toward the glare region AR is gradually increased when the ratio s/w exceeds 0.1 and the luminous flux is less than $300 \times 10^3$ lm when the ratio s/w is 0.225.

In comparison, the luminous flux of the light traveling toward the glare region AR is uniform when the ratio s/w is equal to or less than 0.1 and the luminous flux is less than $30 \times 10^3$ lm. Accordingly, the ratio s/w becomes equal to or less than 0.1 and it is possible to decrease the luminous flux of the light traveling toward the glare region AR.

Second Embodiment

Figure 18:
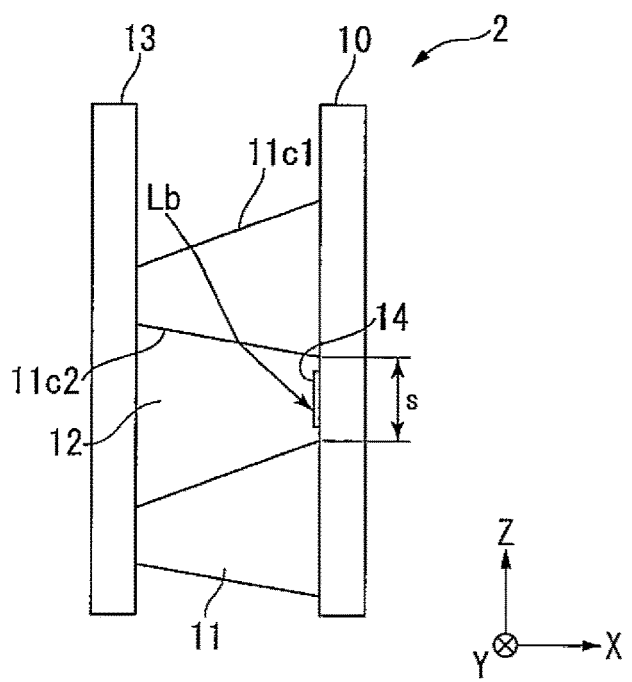
FIG. 18 is a sectional view showing a schematic configuration of a lighting film according to a second embodiment.

FIG. 18 is a sectional view showing a schematic configuration of a lighting film 2 according to a second embodiment.

Further, the same reference signs are assigned to the components according to the present embodiment, which are common to the first embodiment, and detailed description thereof is omitted.

The present embodiment is different from the first embodiment in that the edges of the two adjacent protrusions 11 on the base member 10 side are separated from each other in the plurality of protrusions 11, that is, the base member 10 is exposed in a region (non-forming region of the protrusion 11) except the forming region of the protrusion 11 on one surface of the base member 10. Further, the present embodiment is different in that a light absorbing body 14 is provided in a region between the protrusions 11 on the one surface of the base member 10.

In the present embodiment, the intervals s between the plurality of protrusions 11 may be uniform or may be irregular. Here, the plurality of protrusions 11 are disposed to be adjacent to each other with irregular intervals therebetween, and thereby it is possible to regulate an occurrence of an interference fringe, which occurs in a case where the plurality of protrusions 11 are regularly formed.

As the light absorbing body 14, an organic material such as a black resin (resin material), such as a black resist, which has light absorbing properties and photosensitivity, or black ink, a material such as a pigment or a color material of which light transmittance is 2% to 3% can be used. Further, various materials can be used in addition to these materials, if the material can absorb visible light. In addition, the light transmittance can be regulated through adjusting concentration of the absorbing material of the light absorbing body 14 or through adjusting a thickness of an area of the light absorbing body 14.

Hereinafter, effects of the lighting film 2 according to the present embodiment will be described with reference to FIG. 18.

As shown in FIG. 18, the light Lb incident to the lighting film 2 at the incident angle θin of 54° in the non-forming region of the protrusion 11 is incident to the side surface 11c1 of the protrusion 11. The light Lb incident to the side surface 11c1 of the protrusion 11 transmits through the protrusion 11 without being reflected from the side surface 11c1 and is refracted from the side surface 11c2 of the protrusion 11. In the present embodiment, since the light absorbing body 14 is provided in the region between the protrusions 11 on the one surface of the base member 10, the light Lb refracted from the side surface 11c2 of the protrusion 11 is absorbed by the light absorbing body 14 without escaping through the space between the two adjacent protrusions 11.

In this manner, in the lighting film 2 according to the present embodiment, since the light absorbing body 14 is provided in the region between the protrusions 11 on the one surface of the base member 10, it is possible to regulate the light incident to the lighting film 2 from the upper side not to escape though the space between the two adjacent protrusions 11 and not to travel toward the glare region AR. It is possible to hereby regulate the glare which a person inside the room feels.

Third Embodiment

Figure 19:
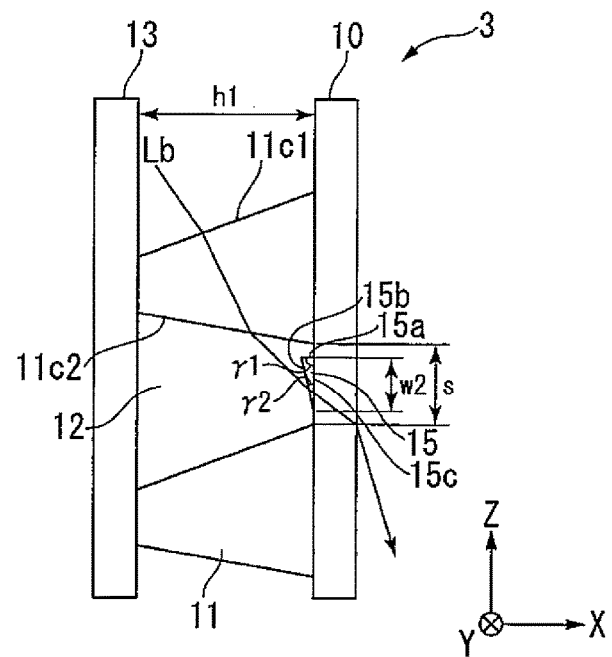
FIG. 19 is a sectional view showing a schematic configuration of a lighting film according to a third embodiment.

FIG. 19 is a sectional view showing a schematic configuration of a lighting film 3 according to a third embodiment.

Further, the same reference signs are assigned to the components according to the present embodiment, which are common to the second embodiment, and detailed description thereof is omitted.

The present embodiment is different from the second embodiment in that a second protrusion 15 is provided in a region between the protrusions 11 on the one surface of the base member 10, instead of the light absorbing body 14.

The second protrusion 15 has a longitudinal direction substantially in one direction (Y direction) and is disposed to have the one direction in a direction parallel to one side of the base member 10 having a rectangular shape. In a case of the present embodiment, the second protrusion 15 is formed to have a stripe shape with a certain width in the Y direction.

The second protrusion 15 is disposed to have the longitudinal direction thereof in the direction parallel to the one side of the base member 10 having the rectangular shape. The second protrusion 15 has a triangular shape in a cross section (XZ cross section). The second protrusion 15 has an inclined surface 15b which is inclined with respect to the one surface of the base member 10.

When w2 represents a width of the second protrusion 15 in a widthwise direction (Z direction) and h2 represents a height of the base member 10 of the second protrusion 15 in the normal direction (X direction), the width w2 of the second protrusion 15 is smaller than the intervals s of the plurality of protrusions 11 and the height h2 of the second protrusion 15 is smaller than the heights h of the plurality of protrusions 11.

When an angle between an end surface 15c of the second protrusion 15 on the base member 10 side and a side surface 15a of the second protrusion 15 is an angle γ1 and an angle between the end surface 15c of the second protrusion 15 on the base member 10 side and a side surface 15b (inclined surface) of the second protrusion 15 is an angle γ2, the angle γ1 of the second protrusion 15 is greater than the angle γ2 of the second protrusion 15. For example, the angle γ1 is, for example, from 70° to 100° and the angle γ2 is, for example, from 10° to 30°.

The same material as the protrusion 11 can be used for the second protrusion 15. The refractive index of the second protrusion 15 is equal to or greater than the refractive index of the protrusion 11 or the base member 10. For example, the refractive index of the second protrusion 15 is about 1.5.

Hereinafter, effects of a lighting film 3 according to the present embodiment will be described with reference to FIG. 19 and FIG. 20.

As shown in FIG. 19, the light Lb incident to the lighting film 3 at the incident angle θin of 54° in the non-forming region of the protrusion 11 is incident to the side surface 11c1 of the protrusion 11. The light Lb incident to the side surface 11c1 of the protrusion 11 transmits through the protrusion 11 without being reflected from the side surface 11c1 and is refracted from the side surface 11c2 of the protrusion 11. In the present embodiment, since the second protrusion 15 is provided in the region between the protrusions 11 on the one surface of the base member 10, the light Lb refracted from the side surface 11c2 of the protrusion 11 is incident to the second protrusion 15. The light Lb incident to the second protrusion 15 is refracted from the inclined surface 15b of the second protrusion 15, is refracted from the other surface (interface between the base member 10 and the air) of the base member 10, and is emitted from the lighting film 3 to the lower side.

Figure 20:
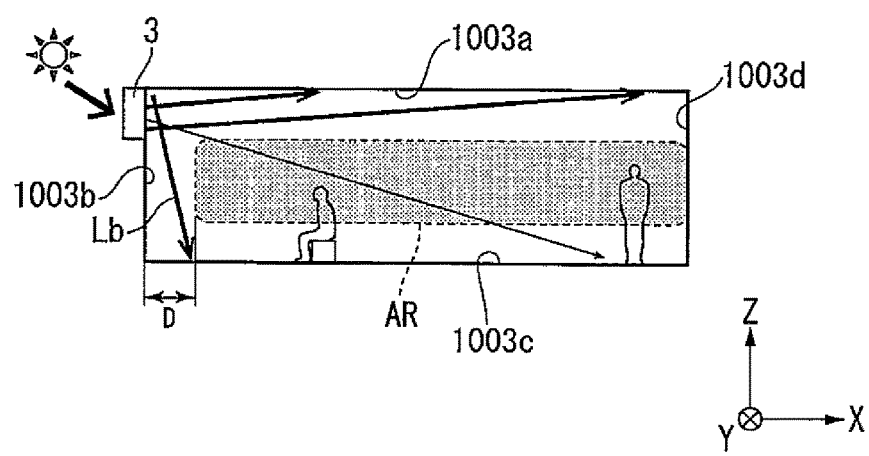
FIG. 20 is a view showing a room model to which the lighting film according to the third embodiment is applied.

FIG. 20 is a view showing a room model to which the lighting film 3 according to the third embodiment is applied.

The window is not shown in FIG. 20, for the convenience, and the lighting film 3 according to the third embodiment is provided on the outer surface of the window.

As shown in FIG. 20, the light Lb refracted from the inclined surface 15b (refer to FIG. 19) of the second protrusion 15 travels toward the portion D in the vicinity of the window.

In this manner, in the lighting film 3 according to the present embodiment, since the second protrusion 15 is provided in the region between the protrusions 11 on the one surface of the base member 10, it is possible to regulate the light incident to the lighting film 3 from the upper side not to escape though the space between the two adjacent protrusions 11 and not to travel toward the glare region AR. It is possible to hereby regulate the glare which a person inside the room feels.

Fourth Embodiment

Figure 21:
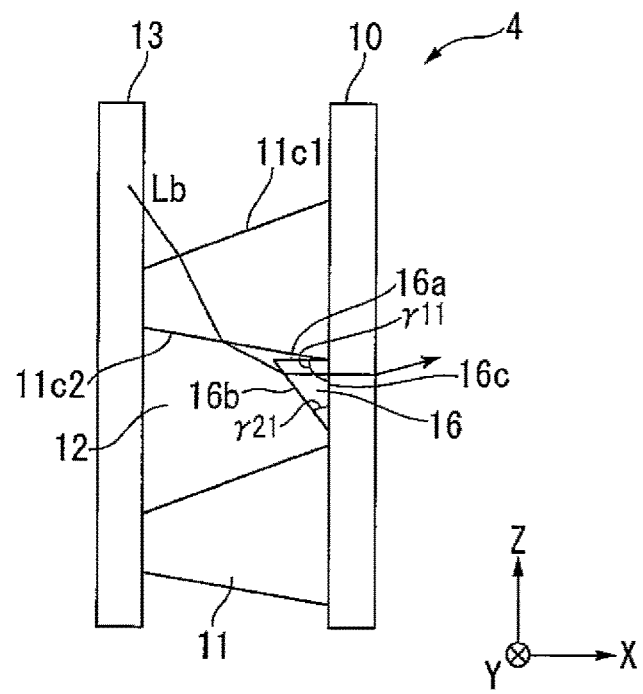
FIG. 21 is a sectional view showing a schematic configuration of a lighting film according to a fourth embodiment.

FIG. 21 is a sectional view showing a schematic configuration of a lighting film 4 according to a fourth embodiment.

Further, the same reference signs are assigned to the components according to the present embodiment, which are common to the third embodiment, and detailed description thereof is omitted.

The present embodiment is different from the third embodiment in that a second protrusion 16 is provided in a region between the protrusions 11 on the one surface of the base member 10, instead of the second protrusion 15. The second protrusion 15 according to the third embodiment has a function of causing the light incident to the lighting film 3 from the upper side to travel toward the portion D in the vicinity of the window and the second protrusion 16 according to the present embodiment has a function of causing the light incident to the lighting film 4 from the upper side to travel toward the ceiling.

When an angle between an end surface 16c of the second protrusion 16 on the base member 10 side and a side surface 16a of the second protrusion 16 is an angle γ11 and an angle between the end surface 16c of the second protrusion 16 on the base member 10 side and a side surface 16b (inclined surface) of the second protrusion 16 is an angle γ21, the angle γ11 of the second protrusion 16 is greater than the angle γ21 of the second protrusion 16. In addition, the angle γ11 of the second protrusion 16 is smaller than the angle γ1 of the second protrusion 15 and the angle γ21 of the second protrusion 16 is greater than the angle γ2 of the second protrusion 15. For example, the angle γ11 is, for example, from 70° to 90° and the angle γ21 is, for example, from 30° to 50°.

Hereinafter, effects of the lighting film 4 according to the present embodiment will be described with reference to FIG. 21 and FIG. 22.

As shown in FIG. 21, the light Lb incident to the lighting film 4 at the incident angle θin of 54° in the non-forming region of the protrusion 11 is incident to the side surface 11c1 of the protrusion 11. The light Lb incident to the side surface 11c1 of the protrusion 11 transmits through the protrusion 11 without being reflected from the side surface 11c1 and is refracted from the side surface 11c2 of the protrusion 11. In the present embodiment, since the second protrusion 16 is provided in the region between the protrusions 11 on the one surface of the base member 10, the light Lb refracted from the side surface 11c2 of the protrusion 11 is incident to the second protrusion 16. The light Lb incident to the second protrusion 15 is refracted from the inclined surface 16b of the second protrusion 16, is refracted from the other surface (interface between the base member 10 and the air) of the base member 10, and is emitted from the lighting film 4 to the lower side.

Figure 22:
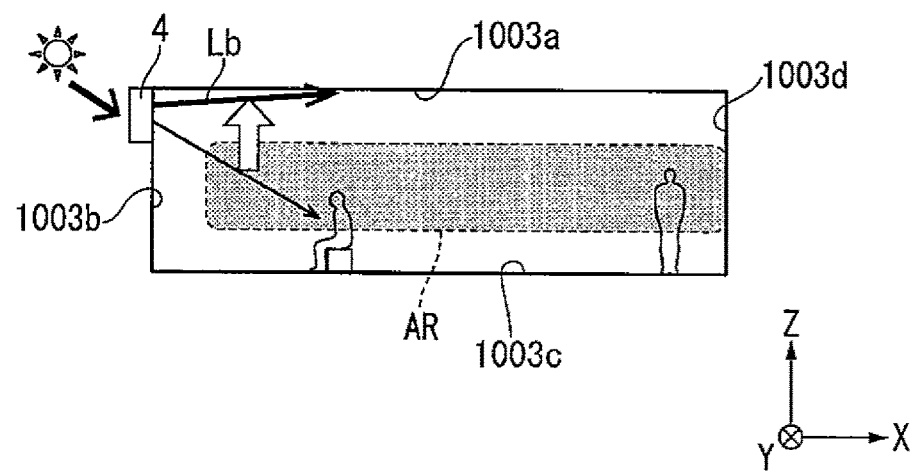
FIG. 22 is a view showing a room model to which the lighting film according to the fourth embodiment is applied.

FIG. 22 is a view showing a room model to which the lighting film 4 according to the fourth embodiment is applied.

The window is not shown in FIG. 22, for the convenience, and the lighting film 4 according to the fourth embodiment is provided on the outer surface of the window.

As shown in FIG. 22, the light Lb refracted from the inclined surface 16b (refer to FIG. 21) of the second protrusion 16 does not travel toward the portion D in the vicinity of the window, but travels toward the ceiling 1003a.

In this manner, in the lighting film 4 according to the present embodiment, since the second protrusion 16 is provided in the region between the protrusions 11 on the one surface of the base member 10, it is possible to regulate the light incident to the lighting film 4 from the upper side not to escape though the space between the two adjacent protrusions 11 and not to travel toward the glare region AR. It is possible to hereby regulate the glare which a person inside the room feels.

Fifth Embodiment

Figure 23:
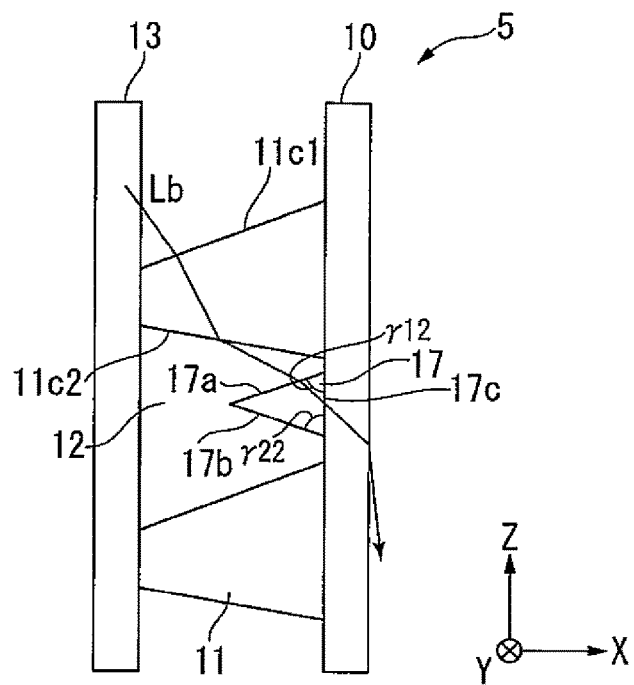
FIG. 23 is a sectional view showing a schematic configuration of a lighting film according to a fifth embodiment.

FIG. 23 is a sectional view showing a schematic configuration of a lighting film 5 according to a fifth embodiment.

Further, the same reference signs are assigned to the components according to the present embodiment, which are common to the third embodiment, and detailed description thereof is omitted.

The present embodiment is different from the third embodiment in that a second protrusion 17 is provided in the region between the protrusions 11 on the one surface of the base member 10, instead of the second protrusion 15. The second protrusion 15 according to the third embodiment is configured to cause the light incident to the lighting film 3 from the upper side to be refracted from the inclined surface 15b and the second protrusion 17 according to the present embodiment is configured to cause the light incident to the lighting film 5 from the upper side to be refracted from an inclined surface 17a.

When an angle between an end surface 17c of the second protrusion 17 on the base member 10 side and a side surface 17a (inclined surface) of the second protrusion 17 is an angle γ12 and an angle between the end surface 17c of the second protrusion 17 on the base member 10 side and a side surface 17b of the second protrusion 17 is an angle γ22, the angle γ12 of the second protrusion 17 is equal to the angle γ22 of the second protrusion 17. In addition, the angle γ12 of the second protrusion 17 is smaller than the angle γ1 of the second protrusion 15 and the angle γ22 of the second protrusion 17 is greater than the angle γ2 of the second protrusion 15. For example, the angle γ12 and the angle γ22 are, for example, from 50° to 80°.

Hereinafter, effects of the lighting film 5 according to the present embodiment will be described with reference to FIG. 23 and FIG. 24.

As shown in FIG. 23, the light Lb incident to the lighting film 5 at the incident angle θin of 54° in the non-forming region of the protrusion 11 is incident to the side surface 11c1 of the protrusion 11. The light Lb incident to the side surface 11c1 of the protrusion 11 transmits through the protrusion 11 without being reflected from the side surface 11c1 and is refracted from the side surface 11c2 of the protrusion 11. In the present embodiment, since the second protrusion 17 is provided in the region between the protrusions 11 on the one surface of the base member 10, the light Lb refracted from the side surface 11c2 of the protrusion 11 is incident to the second protrusion 17. The light Lb incident to the second protrusion 17 is refracted from the inclined surface 17a of the second protrusion 17, is refracted from the other surface (interface between the base member 10 and the air) of the base member 10, and is emitted from the lighting film 5 to the lower side.

Figure 24:
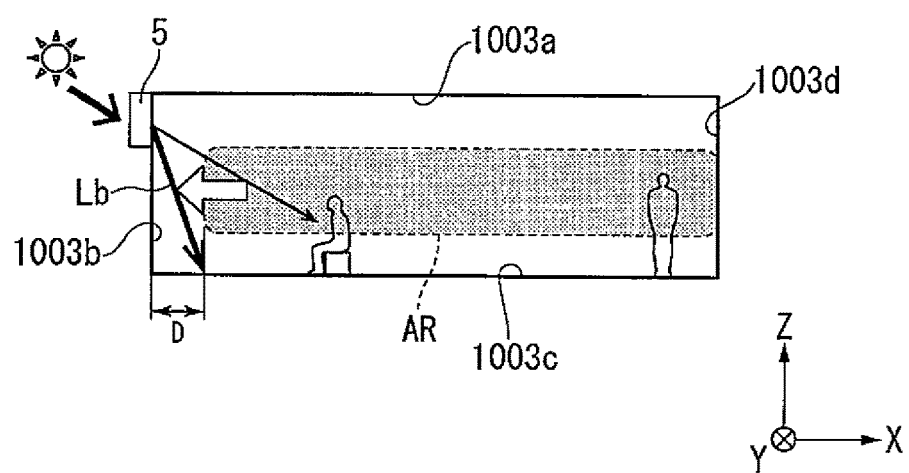
FIG. 24 is a view showing a room model to which the lighting film according to the fifth embodiment is applied.

FIG. 24 is a view showing a room model to which the lighting film 5 according to the fifth embodiment is applied.

The window is not shown in FIG. 24, for the convenience, and the lighting film 5 according to the fifth embodiment is provided on the outer surface of the window.

As shown in FIG. 24, the light Lb refracted from the inclined surface 17a (refer to FIG. 23) of the second protrusion 17 travels toward the portion D in the vicinity of the window.

In this manner, in the lighting film 5 according to the present embodiment, since the second protrusion 17 is provided in the region between the protrusions 11 on the one surface of the base member 10, it is possible to regulate the light incident to the lighting film 5 from the upper side not to escape though the space between the two adjacent protrusions 11 and not to travel toward the glare region AR. It is possible to hereby regulate the glare which a person inside the room feels.

Further, in the third embodiment to the fifth embodiment described above, an example, in which the second protrusion has a triangular shape in the cross section, is described; however, the shape is not limited thereto. The second protrusion may not have an inclined surface which is inclined with respect to the one surface of the base member 10 and, for example, the second protrusion may have a polygonal shape having four or more sides or an indeterminate shape in the cross section. There is no limitation to the shape of the second protrusion, as long as the second protrusion has a function of causing the light incident to the lighting film from the upper side to travel toward the ceiling 1003a or a region except for the glare region AR such as the portion D in the vicinity of the window.

Sixth Embodiment

Figure 25:
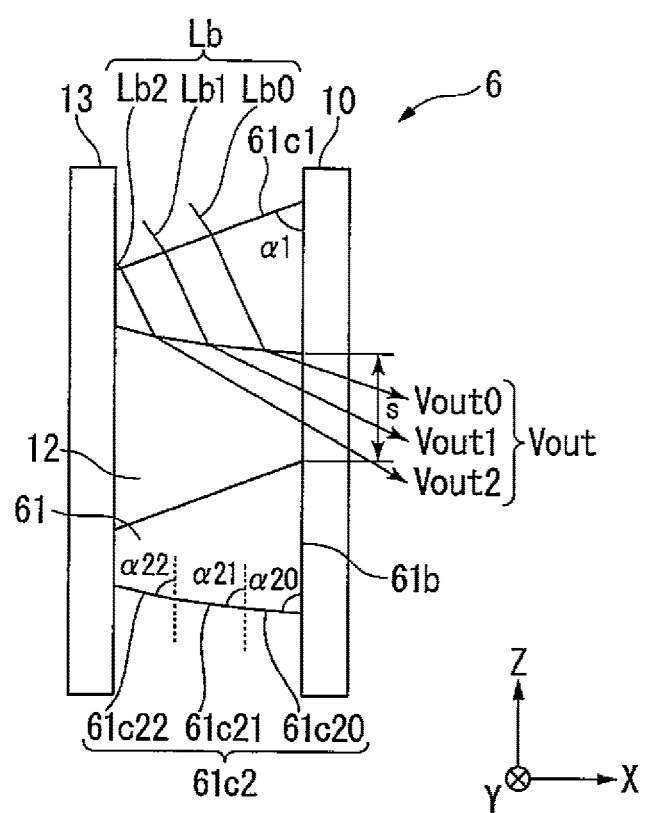
FIG. 25 is a sectional view showing a schematic configuration of a lighting film according to a sixth embodiment.

FIG. 25 is a sectional view showing a schematic configuration of a lighting film according to a sixth embodiment.

Further, the same reference signs are assigned to the components according to the present embodiment, which are common to the first embodiment, and detailed description thereof is omitted.

The present embodiment is different from the first embodiment in that the edges of two adjacent protrusions 61 on the base member 10 side are separated from each other in a plurality of protrusions 61, that is, the base member 10 is exposed in a region (non-forming region of the protrusion 61) except for the forming region of the protrusion 61 on one surface of the base member 10. Further, the present embodiment is different in that, the plurality of protrusions 61 have the side surface 61c2 with an inclination angle that is changed in a stepwise manner from the base member 10 side to the side opposite to the base member 10.

In the present embodiment, the intervals s between the plurality of protrusions 61 may be uniform or may be irregular. Here, the plurality of protrusions 61 are disposed to be adjacent to each other with irregular intervals therebetween, and thereby it is possible to regulate an occurrence of an interference fringe, which occurs in a case where the plurality of protrusions 61 are regularly formed.

The side surface 61c2 of the protrusion 61 has a plurality of (for example, three in the present embodiment) different inclination angles. The cross section of the side surface 61c2 of the protrusion 61 is formed of an inclined surface with a polygonal line shape. The side surface 61c2 of the protrusion 61 according to the present embodiment has three inclined surfaces 61c20, 61c21, and 61c22 having different inclination angles, respectively.

When an angle between an end surface 61b of the protrusion 61 on the base member 10 side and the inclined surface 61c20 of the protrusion 61 is an angle α20, an angle between the end surface 61b of the protrusion 61 on the base member 10 side and the inclined surface 61c21 of the protrusion 61 is an angle α21, and an angle between the end surface 61b of the protrusion 61 on the base member 10 side and the inclined surface 61c22 of the protrusion 61 is an angle α22, the angle α21 of the protrusion 61 is smaller than the angle α20 of the protrusion 61 and the angle α22 of the protrusion 61 is smaller than the angle α21 of the protrusion 61 (α20>α21>α22). For example, the angle α20 is, for example, from 80° to 85°, the angle α21 is, for example, from 75° to 80°, and the angle α22 is, for example, from 70° to 75°.

Hereinafter, effects of the lighting film 6 according to the present embodiment will be described with reference to FIG. 25.

As shown in FIG. 25, the light Lb incident to the lighting film 6 at the incident angle θin of 54° in the non-forming region of the protrusion 61 is incident to the side surface 61c1 of the protrusion 61. The light Lb incident to the side surface 61c1 of the protrusion 61 transmits through the protrusion 61 without being reflected from the side surface 61c1 and is refracted from the side surface 61c2 of the protrusion 61. Light Lb0 refracted from the inclined surface 61c20 of the side surface 61c2 of the protrusion 61 escapes through a space between the two adjacent protrusions 61 and is emitted from the lighting film 6 to the lower side. The light Lb0 transmitting through the protrusion 61 travels in a direction Vout0 of directions Vout of the glare region AR.

Similarly, light Lb1 refracted from the inclined surface 61c21 of the side surface 61c2 of the protrusion 61 escapes through a space between the two adjacent protrusions 61 and is emitted from the lighting film 6 to the lower side. The Light Lb1 transmitting through the protrusion 61 travels in a direction Vout1 of the directions Vout of the glare region AR. In addition, light Lb2 refracted from the inclined surface 61c22 of the side surface 61c2 of the protrusion 61 escapes through a space between the two adjacent protrusions 61 and is emitted from the lighting film 6 to the lower side. The Light Lb2 transmitting through the protrusion 61 travels in a direction Vout2 of the directions Vout of the glare region AR.

The entire light refracted from the side surface 61c2 of the protrusion 61 travels in the directions Vout in the glare region AR. However, the light refracted from the three inclined surfaces 61c20, 61c21, and 61c22 having different angles, respectively, travels in the different directions Vout0, Vout1, and Vout2, respectively. In other words, the light refracted from the side surface 61c2 of the protrusion 61 does not focus and travel in a specific direction in the glare region AR, but is dispersed and travels in directions different from each other.

In this manner, in the lighting film 6 according to the present embodiment, since the side surface 61c2 of the protrusion 61 has the three inclined surfaces 61c20, 61c21, and 61c22 with different inclination angles, respectively, it is possible to disperse the light which is incident to the lighting film 6 from the upper side and which travels toward the glare region AR. Accordingly, the light traveling toward the glare region AR is dispersed to the extent that a person does not feel the glare, and thereby it is possible to regulate the glare which a person inside the room feels.

Further, in the present embodiment, an example, in which the inclination angle of the side surface 61c2 of the protrusion 61 is changed in a stepwise manner from the base member 10 side to the side opposite to the base member 10 and the cross section of the side surface 61c2 of the protrusion 61 is formed of an inclined surface with a polygonal line shape, is described; however, the change is not limited thereto. For example, the inclination angle of the side surface of the protrusion may be changed in a continuous manner from the base member 10 side to the side opposite to the base member 10 and the cross section of the side surface of the protrusion may be formed of an inclined surface with a curved line.

In addition, in the present embodiment, an example, in which the side surface 61c2 of the protrusion 61 has three inclined surfaces 61c20, 61c21, and 61c22 having different inclination angles, respectively, is described; however, the change is not limited thereto. For example, the side surface of the protrusion may have two inclined surfaces having different inclination angles, respectively, or four or more of a plurality of inclined surfaces.

In addition, in the present embodiment, an example, in which the inclination angle of the side surface 61c2 of the protrusion 61 is changed in a stepwise manner from the base member 10 side to the side opposite to the base member 10, is described; however, the change is not limited thereto. For example, the inclination angle of the side surface 61c1 of the protrusion 61 may be changed in the stepwise or continuous manner from the base member 10 side to the side opposite to the base member 10. In addition, the inclination angle of both side surfaces of the side surface 61c1 and the side surface 61c2 of the protrusion 61 may be changed in the stepwise or continuous manner from the base member 10 side to the side opposite to the base member 10.

In addition, in the present embodiment, the inclination angle of the side surfaces of all the plurality of protrusions 61 is changed in the stepwise or continuous manner from the base member 10 side to the side opposite to the base member 10; however, the range is not limited to the all the protrusions 61. For example, in a part of the protrusions 61 of the plurality of protrusions 61, the inclination angle of the side surfaces may be changed in the stepwise or continuous manner from the base member 10 side to the side opposite to the base member 10. In other words, the plurality of protrusions 61 include a plurality of protrusions 61 of which the inclination angle of the side surface is changed in the stepwise or continuous manner from the base member 10 side to the side opposite to the base member 10.

In addition, in the present embodiment, the protrusion may extend in a straight line shape or in a curved line shape and two side surfaces of the protrusion in the cross section orthogonal to the extending direction of the protrusion may both have an inclination angle which is changed in the stepwise or continuous manner from the base member 10 side to the side opposite to the base member 10.

Seventh Embodiment

Figure 26:
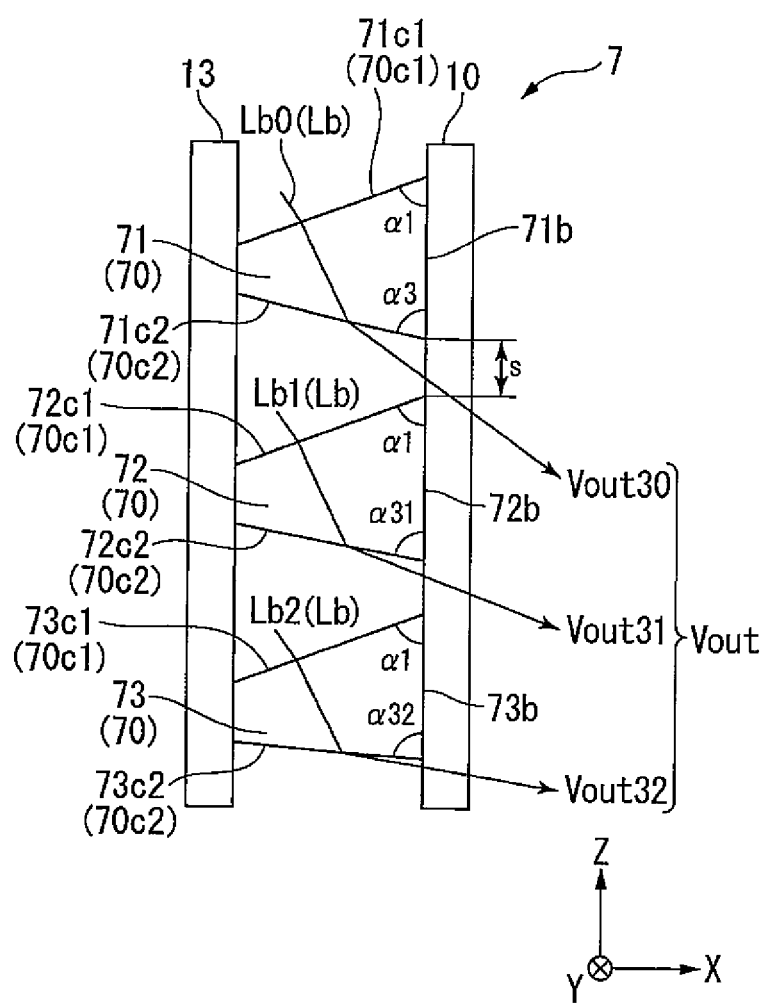
FIG. 26 is a sectional view showing a schematic configuration of a lighting film according to a seventh embodiment.

FIG. 26 is a sectional view showing a schematic configuration of a lighting film 7 according to a seventh embodiment.

Further, the same reference signs are assigned to the components according to the present embodiment, which are common to the first embodiment, and detailed description thereof is omitted.

The present embodiment is different from the first embodiment in that the edges of two adjacent protrusions 70 on the base member 10 side are separated from each other in a plurality of protrusions 70, that is, the base member 10 is exposed in a region (non-forming region of the protrusion 70) except the forming region of the protrusion 70 on the one surface of the base member 10. Further, the present embodiment is different in that, in the plurality of protrusions 70, inclination angles of the side surfaces are different from each other.

In the present embodiment, the intervals s between the plurality of protrusions 70 may be uniform or may be irregular. Here, the plurality of protrusions 70 are disposed to be adjacent to each other with irregular intervals therebetween, and thereby it is possible to regulate an occurrence of an interference fringe, which occurs in a case where the plurality of protrusions 70 are regularly formed.

The plurality of protrusions 70 (for example, in the present embodiment, three protrusions 71, 72, and 73) have side surfaces 70c2 (for example, in the present embodiment, three side surfaces 71c2, 72c2, and 73c2) having inclination angles different from each other.

When an angle between an end surface 71b of the protrusion 71 on the base member 10 side and a side surface 71c2 of the protrusion 71 is an angle α3, an angle between an end surface 72b of the protrusion 72 on the base member 10 side and the side surface 72c2 of the protrusion 72 is an angle α31, and an angle between an end surface 73b of the protrusion 73 on the base member 10 side and the side surface 73c2 of the protrusion 73 is an angle θ2, the angle α31 of the protrusion 72 is greater than the angle α3 of the protrusion 71 and the angle α32 of the protrusion 73 is greater than the angle α31 of the protrusion 72 (α3>α31>α32). For example, the angle α3 is, for example, from 70° to 75°, the angle α31 is, for example, from 75° to 80°, and the angle α32 is, for example, from 80° to 85°.

Hereinafter, effects of the lighting film 7 according to the present embodiment will be described with reference to FIG. 26.

As shown in FIG. 26, the light Lb incident to the lighting film 7 at the incident angle θin of 54° in the non-forming region of the protrusion 70 is incident to the side surface 70c1 of the protrusion 70. The light Lb incident to the side surface 70c1 of the protrusion 70 transmits through the protrusion 70 without being reflected from the side surface 70c1 and is refracted from the side surface 70c2 of the protrusion 70. Light Lb0 refracted from the side surface 71c2 of the protrusion 71 of the side surface 70c2 of the protrusion 70 escapes through a space between the two adjacent protrusions 71 and 72 and is emitted from the lighting film 7 to the lower side. The light Lb0 transmitting through the protrusion 71 travels in a direction Vout30 of the directions Vout of the glare region AR.

Similarly, light Lb1 refracted from the side surface 72c2 of the protrusion 72 of the side surface 70c2 of the protrusion 70 escapes through a space between the two adjacent protrusions 72 and 73 and is emitted from the lighting film 7 to the lower side. The light Lb1 transmitting through the protrusion 72 travels in a direction Vout31 of the directions Vout of the glare region AR. In addition, light Lb2 refracted from the side surface 73c2 of the protrusion 73 of the side surface 70c2 of the protrusion 70 escapes through a space between the two adjacent protrusions 70 (between the protrusion 73 and an adjacent protrusion on the lower side from the corresponding protrusion 73) and is emitted from the lighting film 7 to the lower side. The light Lb2 transmitting through the protrusion 73 travels in a direction Vout32 of the directions Vout of the glare region AR.

The entire light refracted from the side surface 70c2 of the protrusion 70 travels in the directions Vout in the glare region AR. However, the light refracted from the three side surfaces 71c2, 72c2, and 73c2 having different angles, respectively, travels in the different directions Vout30, Vout31, and Vout32, respectively. In other words, the light refracted from the side surface 70c2 of the protrusion 70 does not focus and travel in a specific direction in the glare region AR, but is dispersed and travels in directions different from each other.

In this manner, in the lighting film 7 according to the present embodiment, since the inclination angles of the side surfaces 71c2, 72c2, and 73c2 of the three protrusions 71, 72, and 73 are different from each other, it is possible to disperse the light which is incident to the lighting film 7 from the upper side and which travels toward the glare region AR. Accordingly, the light traveling toward the glare region AR is dispersed to the extent that a person does not feel the glare, and thereby it is possible to regulate the glare which a person inside the room feels.

Further, in the present embodiment, an example, in which the inclination angles of the side surfaces 70c2 of the plurality of protrusions 70 are different from each other, is described; however, the configuration is not limited thereto. For example, the inclination angles of the side surfaces 70c1 of the plurality of protrusions 70 may be different from each other or the inclination angles of both side surfaces of the side surfaces 70c1 and the side surfaces 70c2 of the plurality of protrusions 70 may be different from each other.

In addition, in the present embodiment, the inclination angles of the side surfaces of all the plurality of protrusions 70 are different from each other; however, the range is not limited to all the protrusions 70. For example, the inclination angles of the side surfaces of a part of the protrusions of the plurality of protrusions 70 may be different. In other words, the plurality of protrusions 70 may include a plurality of protrusions 70 of which the side surfaces have inclination angles different from each other.

Further, in the sixth embodiment and the seventh embodiment described above, the base member 10 is exposed in the non-forming region of the protrusion; however, a member having optical transparency may be formed to overlap the one surface of the base member 10 in the region. In other words, the member having optical transparency which is formed on the one surface of the base member 10 may be exposed in the region except the forming region of the protrusion on the one surface of the base member 10. An example of such a member includes a member which blocks ultraviolet or infrared but transmits visible light. Even in this case, the visible light incident to the non-forming region of the protrusion can be caused to be emitted from the lighting film to the lower side.

In addition, in the second embodiment to the seventh embodiment described above, an example, in which the edges of the two adjacent protrusions of the plurality of protrusions on the base member 10 side are separated from each other, is described; however, the range is not limited to all the plurality of protrusions, of which the edges of the two adjacent protrusions of the plurality of protrusions on the base member 10 side are separated from each other. For example, among the plurality of protrusions, a part of the protrusions may have the edges of the two adjacent protrusions on the base member 10 side, which are separated from each other. In other words, a configuration (for example, configuration of the first embodiment), in which, among the plurality of protrusions, a part of two adjacent protrusions are contact with each other, may be employed.

Eighth Embodiment

Figure 27:
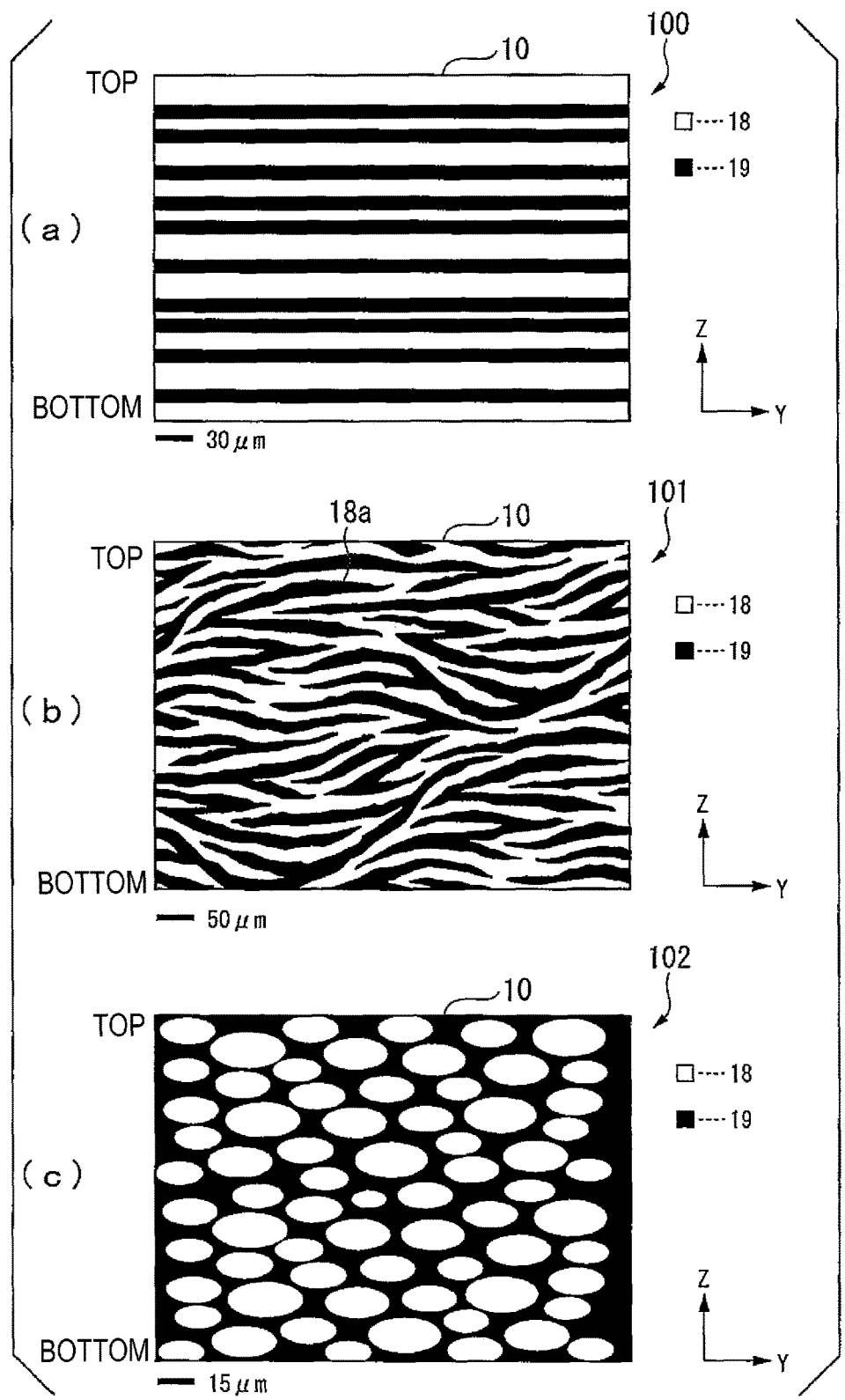
FIGS. 27(a) to 27(c) are plan views showing variations in plane shape of a protrusion and a void portion of a lighting film according to an eighth embodiment.

FIGS. 27(a) to 27(c) are plan views showing variations in plan shape of the protrusion and the void portion of a lighting film according to an eighth embodiment.

The variations can be applied to the configurations of the lighting films according to the first embodiment to the seventh embodiment described above. Here, the variations can be applied to a part of the protrusions (void portions) of the plurality of protrusions (void portions) in the lighting film according to the first embodiment.

In FIGS. 27(a) to 27(c), reference sign 18 represents a protrusion and reference sign 19 represents a void portion.

Here, the reference sign 18 may represent the void portion and the reference sign 19 may represent the protrusion.

Further, the same reference signs are assigned to the components according to the present embodiment, which are common to the first embodiment, and detailed description thereof is omitted.

FIG. 27(a) shows an example in which the protrusion 18 and the void portion 19 are formed in a stripe shape having the longitudinal direction thereof in the Y direction. In FIG. 27(a), widths of the void portions 19 between the protrusions 18 are uniform and widths of the protrusions 18 are random. The same effects as described in the first embodiment are also achieved in the lighting film 100.

FIG. 27(b) shows an example in which a plurality of void portions 19 are formed in a state of being irregularly curved or diverged as branches of a tree. In this example, for example, a transparent resist layer which is a material of the protrusion 18 is formed on the entire surface of the base member 10, a plurality of openings are formed in the resist layer, the opening is filled with a gas such as the air, and thereby the protrusion 18 an the void portion 19 are formed.

Each of the plurality of openings 18a (void portion 19) has the longitudinal direction thereof substantially in one direction and are disposed to have the one direction in a direction parallel to one side of the base member 10 having a rectangular shape. The lighting film 101 is attached to a glass substrate of a window glass such that a direction orthogonal to the one direction becomes a perpendicular direction. The same effects as described in the first embodiment are also achieved in the lighting film 101.

Here, "each of the plurality of openings has a longitudinal direction substantially in one direction" which means, for example, the following description. In other words, isotropically dispersing light such as fluorescent light is caused to be incident to the inside of the base member 10 from the side of the base member 10 on which the protrusions 18 are formed and polar angle luminance distribution of light emitted to the outside of the plurality of protrusions 18 is measured. At this time, in a case where there are a direction in which luminance of the light emitted from the plurality of protrusions 18 is strong and a direction in which the luminance is relatively weak, it is described that the openings have a longitudinal direction substantially in one direction". A direction orthogonal to the direction in which the luminance is relatively strong is defined as the one direction".

FIG. 27(c) shows an example in which the shape of the protrusion 18 has a longitudinal axis in one direction. In FIG. 27(c), the protrusion 18 has an ellipsoidal shape, the shape of the protrusion 18 is not limited thereto.

The protrusion 18 may have another shape such as an oblong shape or a diamond shape. The lighting film 102 is attached to the glass substrate of the window glass such that a direction orthogonal to the longitudinal axis direction of the protrusion 18 becomes a perpendicular direction. The same effects as described in the first embodiment are also achieved in this example.

Ninth Embodiment

Figure 28:
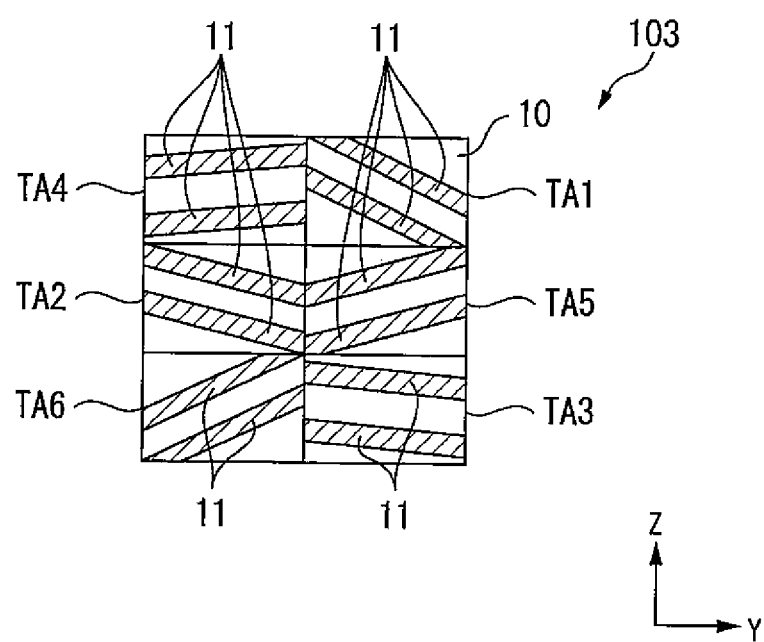
FIG. 28 is a plan view showing a part of a lighting film according to a ninth embodiment.

FIG. 28 is a plan view showing a part of a lighting film 103 according to a ninth embodiment.

The lighting film 103 can be applied to the configurations of the lighting films according to the first embodiment to the eighth embodiment described above. Here, the lighting film 103 can be applied to a part of the protrusions (void portions) of the plurality of protrusions (void portions) in the lighting film according to the first embodiment.

Further, the same reference signs are assigned to the components according to the present embodiment, which are common to the first embodiment, and detailed description thereof is omitted.

In the lighting film of the first embodiment, the plurality of stripe-shaped protrusions having the same extending direction as each other are formed on the one surface of the base member. In comparison, in the lighting film 103 of the present embodiment, the plurality of stripe-shaped protrusions 11 having extending directions different from each other are formed on the one surface of the base member 10.

A plurality of tiling regions (in a case of the present embodiment, six tiling regions TA1 to TA6) are provided on the one surface of the base member 10. The plurality of stripe-shaped protrusions 11 disposed to be parallel to each other are formed on each of the plurality of tiling regions. The protrusions 11 have extending directions different from each other in the two adjacent tiling regions.

In the case of the present embodiment, in the lighting film 103, six types of tiling regions (a first tiling region TA1, a second tiling region TA2, a third tiling region TA3, a fourth tiling region TA4, a fifth tiling region TA5, and a sixth tiling region TA6) are provided. The six tiling regions form one unit region by being arranged in a matrix shape having three rows and two columns in the Y direction and the Z direction. Such unit regions are arranged on the one surface of the base member 10 in the Y direction and the Z direction without an interval.

The extending direction of the plurality of protrusions 11 disposed in the first tiling region TA1 is a direction inclined with respect to the Y direction by 25° in a clockwise direction. The extending direction of the plurality of protrusions 11 disposed in the second tiling region TA2 is a direction inclined with respect to the Y direction by 15° in a clockwise direction. The extending direction of the plurality of protrusions 11 disposed in the third tiling region TA3 is a direction inclined with respect to the Y direction by 5° in a clockwise direction. The extending direction of the plurality of protrusions 11 disposed in the fourth tiling region TA4 is a direction inclined with respect to the Y direction by 5° in a counterclockwise direction. The extending direction of the plurality of protrusions 11 disposed in the fifth tiling region TA5 is a direction inclined with respect to the Y direction by 15° in a counterclockwise direction. The extending direction of the plurality of protrusions 11 disposed in the sixth tiling region TA6 is a direction inclined with respect to the Y direction by 25° in a counterclockwise direction.

In a case where the lighting films are not divided into the plurality of tiling regions, a region of the ceiling to which light is incident is limited to a relatively narrow region of the ceiling. Since the protrusions are disposed to have the extending direction thereof parallel to the one side of a window, the traveling direction of the light incident to the lighting film and the traveling direction of the light emitted from the lighting film are the same direction when viewed from the ceiling side. Therefore, the region of the ceiling to which light is incident becomes a region which has a narrow width in the same size as the window and the position of the ceiling to which the light is incident also is more likely to vary due to an orientation in which the light is incident to the window.

In comparison, in the lighting film 103 according to the present embodiment, since a reflection direction of the protrusion varies for each tiling region, the traveling directions of the light emitted from the lighting film are dispersed in right-left direction. Therefore, the region of the ceiling to which light is incident becomes a region having a width wider than the window and the position of the ceiling to which the light is incident is unlikely to vary due to the orientation in which the light is incident to the window. Hence, in a case where such a lighting film is used, it is possible to illuminate a wide range of the room and the change in the orientation of the sun due to the time zone can be unlikely to influence on the illumination.

Tenth Embodiment

Figure 29:
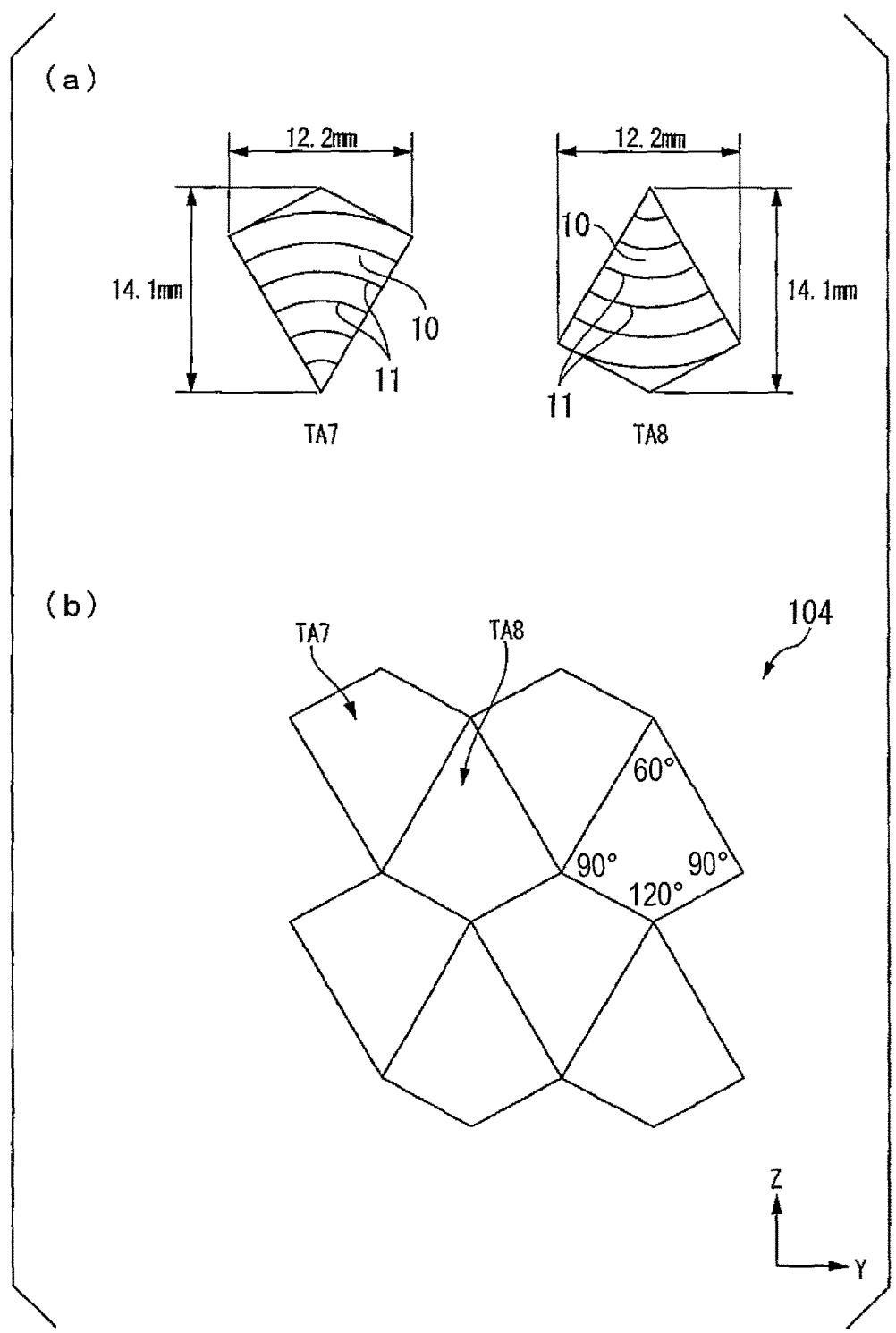
FIG. 29 is a plan view showing a part of a lighting film according to a tenth embodiment.

FIG. 29 is a plan view showing a part of a lighting film 104 according to a tenth embodiment. FIG. 29(a) is a plan view showing the plurality of tiling regions provided in the lighting film 104 and FIG. 29(b) is a plan view showing disposition of the plurality of tiling regions.

The lighting film 104 can be applied to the configurations of the lighting films according to the first embodiment to the ninth embodiment described above. Here, the lighting film can be applied to a part of the protrusions (void portions) of the plurality of protrusions (void portions) in the lighting film according to the first embodiment.

Further, the same reference signs are assigned to the components according to the present embodiment, which are common to the ninth embodiment, and detailed description thereof is omitted.

In the lighting film of the ninth embodiment, the plurality of stripe-shaped protrusions extending in straight lines are formed on the one surface of the base member, when viewed in a normal direction of the base member. The extending direction of the protrusion is not changed and invariably directs the same direction. In comparison, in the lighting film 104 of the present embodiment, protrusions 11 of which the extending direction is changed are formed on the one surface of the base member 10, when viewed in a normal direction of the base member 10.

The plurality of tiling regions (in a case of the present embodiment, two tiling regions TA7 and TA8) are provided on the one surface of the base member 10. The plurality of arc-shaped protrusions 11, which are concentrically disposed, are formed on each of the plurality of tiling regions, when viewed in the normal direction of the base member 10. Convex directions of the arcs are different from each other in the two adjacent tiling regions.

In the case of the present embodiment, in the lighting film 104, two types of tiling regions (a seventh tiling region TA7 and an eighth tiling region TA8) are provided. The seventh tiling region TA7 and the eighth tiling region TA8 have kite shapes, respectively. The kite shape is a type of quadrangle and means a figure having two sets of two adjacent sides which have the same length. In the case of the present embodiment, as the kite shape, a shape having four inner angles of 120°, 90°, 60°, and 90° is employed.

The plurality of (in the present embodiment, six) concentric protrusions 11 with an apex having an inner angle of 60° as the center are formed in the seventh tiling region TA7 and the eighth tiling region TA8. Similar to the protrusions shown in FIG. 27, the protrusion 11 has a trapezoidal shape in which an area of the light emission end surface is greater than an area of the light incident end surface. The plurality of protrusions 11 having the same cross section are concentrically disposed on the base member 10 with a certain interval.

The seventh tiling region TA7 and the eighth tiling region TA8 have the same shape except that the shapes are inverted such that the convex directions of the arcs are opposite to each other. The seventh tiling region TA7 and the eighth tiling region TA8 are arranged on the one surface of the base member 10 without an interval in the Y direction and in the Z direction.

In the lighting film 104 according to the present embodiment, since the extending direction of the protrusion 11 is changed within one protrusion, it is possible to disperse the traveling direction of the light emitted from the lighting film 104 into multiple directions. Therefore, it is possible to illuminate a wide range of the room and the change in the orientation of the sun due to the time zone can be unlikely to influence on the illumination.

Eleventh Embodiment

FIGS. 30(a) to 30(k) are sectional views showing variations in sectional shapes of a protrusion of a lighting film according to an eleventh embodiment.

The variations can be applied to the configurations of the lighting films according to the first embodiment to the tenth embodiment described above. Here, the variations can be applied to a part of the protrusions of the plurality of protrusions in the lighting film according to the first embodiment, except the variations having a cross sectional shape shown in FIG. 30(f).

Figure 30:
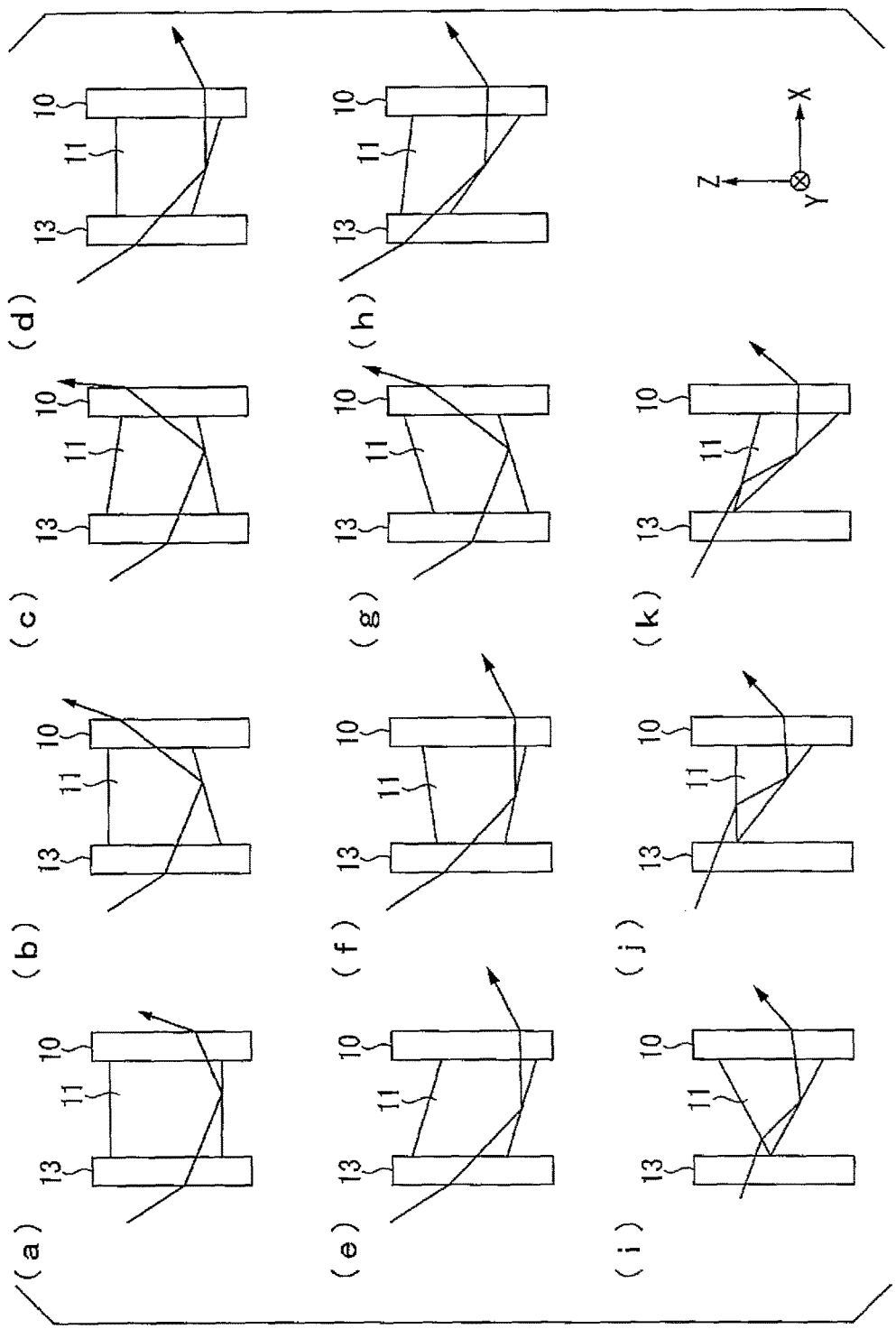
FIGS. 30(a) to 30(k) are sectional views showing variations in sectional shape of a protrusion of a lighting film according to an eleventh embodiment.

FIG. 30(a) shows an example in which the protrusion 11 has a rectangular shape in the cross section. In this example, since the side surface of the protrusion 11 is parallel to the normal direction of the base member 10, the transmittance of the light traveling to the base member 10 is increased most. Hence, when an external view is observed through the lighting film, the transparency is increased most.

FIG. 30(b) shows an example in which the protrusion 11 has a trapezoidal shape in the cross section. The side surface of the protrusion 11 on a +Z direction is a horizontal surface parallel to the normal direction of the base member 10 and the side surface of the protrusion 11 on a −Z direction side is a inclined surface inclined with respect to the normal direction of the base member 10. The light incident to the end surface of the protrusion 11 on the protective member 13 side is reflected from the inclined surface and guided to the ceiling inside the room or deep inside the room. Since the inclined surface, from which the external light is reflected, is inclined to the ceiling side, it is possible to increase the emission angle of the light emitted from the protrusion, compared to the example in FIG. 30(a).

FIG. 30(c) shows an example in which the protrusion 11 has a trapezoidal shape in the cross section but is different from the example in FIG. 30(b) in that the side surface of the protrusion 11 on the side in a +Z direction is inclined on the side opposite to the ceiling side. When the side surface of the protrusion 11 on the −Z direction side is inclined, the light reflected from the side surface of the protrusion 11 on the −Z direction side may not be reflected from the side surface of the protrusion 11 on the +Z direction side and may be emitted from the side surface on the +Z direction side to the outside in a case. In this case, since the side surface of the protrusion 11 on the +Z direction side is inclined on the side opposite to the ceiling, the traveling direction of the light is close to the horizontal direction. Hence, the proportion of the light which illuminates the ceiling is decreased and the proportion of the light traveling deep inside the room is increased.

FIG. 30(d) shows an example in which the protrusion 11 has a trapezoidal shape in the cross section but is different from the example in FIG. 30(b) in that the side surface of the protrusion 11 on the −Z direction side is inclined on the −Z direction side (side opposite to the ceiling side). In this example, since the inclined surface (reflective surface) is inclined on the side opposite to the ceiling side, the proportion of the light traveling toward the ceiling side is decreased and the proportion of the light traveling deep inside the room is increased, compared to the example in FIG. 30(a).

FIG. 30(e) shows an example in which the protrusion 11 has a parallelogrammic shape in the cross section. The two side surfaces of the protrusion 11 are inclined surfaces inclined with respect to the normal direction of the base member 10. The inclined surface (reflective surface) is inclined on the side opposite to the ceiling. Therefore, similar to the example in FIG. 30(d), the proportion of the light traveling toward the ceiling side is decreased and the proportion of the light traveling deep inside the room is increased.

FIG. 30(f) shows an example in which the protrusion has a trapezoidal shape. The two side surfaces of the protrusion 11 are inclined surfaces and the inclination direction thereof is opposite to the example in FIG. 30(c). In this example, similar to the example in FIG. 30(d), the proportion of the light traveling toward the ceiling side is decreased and the proportion of the light traveling deep inside the room is increased.

FIG. 30(g) shows an example in which the protrusion 11 has a parallelogrammic shape in the cross section. The inclination direction of the two side surfaces of the protrusion is opposite to that in the example in FIG. 30(e). In this example, since the side surface of the protrusion 11 on the lower side of the paper surface is inclined to the ceiling side, similar to the example in FIG. 30(b), it is possible to increase the emission angle of the light emitted from the protrusion.

FIG. 30(h) shows an example in which the protrusion 11 has a trapezoidal shape in the cross section and is different from the example in FIG. 30(d) in that the side surface of the protrusion 11 on the +Z direction side is inclined on the −Z direction side (side opposite to the ceiling). In this example, similar to the example in FIG. 30(d), the proportion of the light traveling toward the ceiling side is decreased and the proportion of the light traveling deep inside the room is increased.

FIG. 30(i) shows an example in which the protrusion 11 has a triangular shape in the cross section. The side surface of the protrusion 11 on the −Z direction side is inclined on the −Z direction side (side opposite to the ceiling side) and the side surface of the protrusion 11 on the +Z direction side is inclined on the +Z direction side (to the ceiling side). In this example, since the inclined surface (reflective surface) is inclined on the side opposite to the ceiling, the proportion of the light traveling toward the ceiling side is decreased and the proportion of the light traveling deep inside the room is increased.

FIG. 30(j) shows an example in which the protrusion 11 has a triangular shape in the cross section and is different from the example in FIG. 30(i) in that the side surface of the protrusion 11 on the +Z direction side is parallel to the normal direction of the base member 10. In this example, similar to the example in FIG. 30(i), the proportion of the light traveling toward the ceiling side is decreased and the proportion of the light traveling deep inside the room is increased.

FIG. 30(k) shows an example in which the protrusion 11 has a triangular shape in the cross section and is different from the example in FIG. 30(i) in that the side surface of the protrusion 11 on the +Z direction side is inclined on the −Z direction side (side opposite to the ceiling side). In this example, similar to the example of FIG. 30(i), the proportion of the light traveling toward the ceiling side is decreased and the proportion of the light traveling deep inside the room is increased.

Twelfth Embodiment

Figure 31:
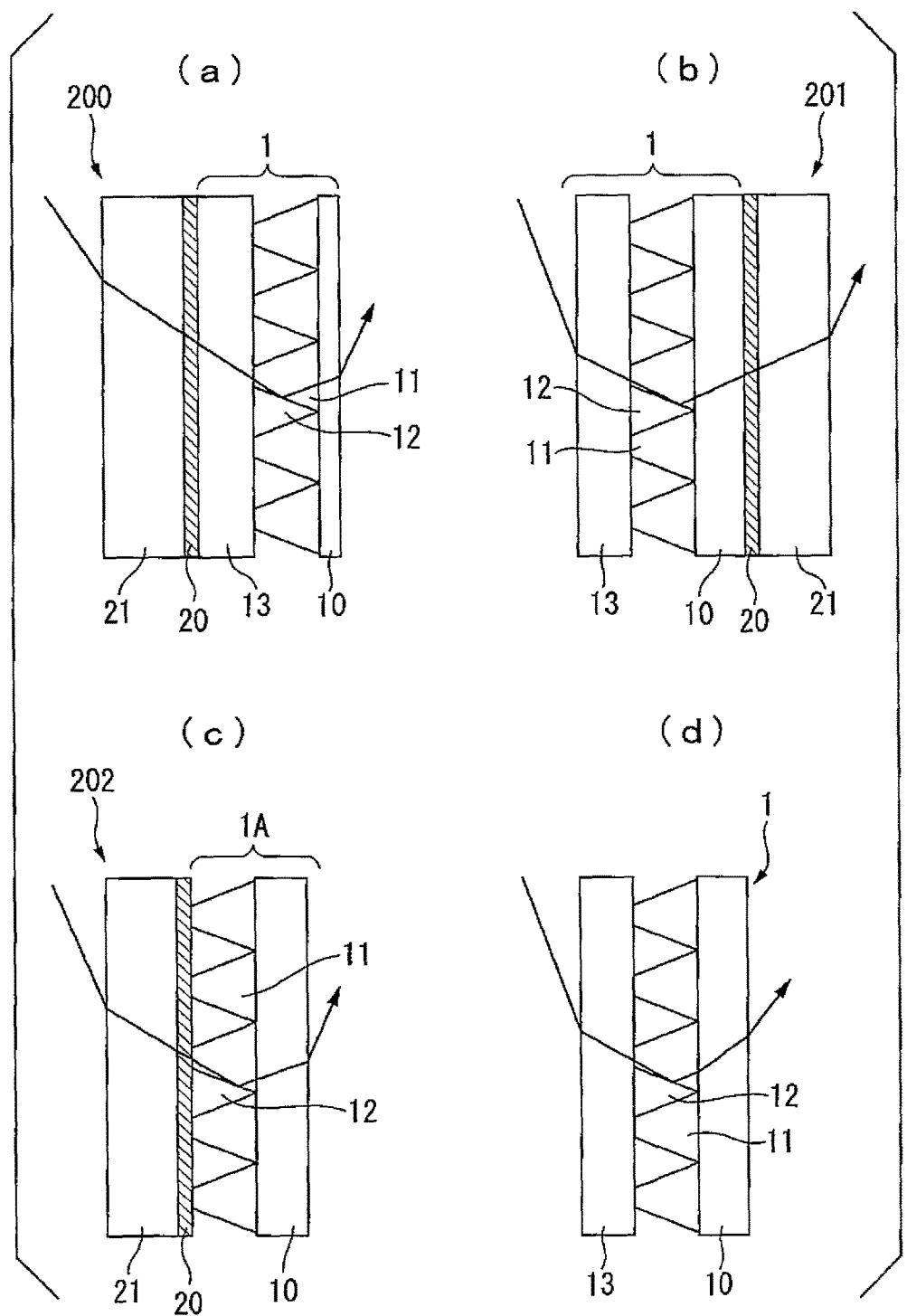
FIGS. 31(a) to 31(d) are sectional views showing variations in usage shapes of a lighting film according to a twelfth embodiment.

FIGS. 31(a) and (d) are sectional views showing variations in usage mode of a lighting film according to a twelfth embodiment.

The variations can be applied to the configurations of the lighting films according to the first embodiment to the eleventh embodiment described above.

In the present embodiment, a surface (surface on the side opposite to the protrusion with the base member 10 interposed therebetween) of both surfaces of the lighting film on the base member 10 side is a first surface and the surface thereof on the protective member 13 side (side on the protrusion side with the base member 10 interposed therebetween) is a second surface.

Further, the same reference signs are assigned to the components according to the present embodiment, which are common to the first embodiment, and detailed description thereof is omitted.

FIG. 31(a) shows an example in which the second surface of the lighting film 1 adheres bonded to the surface of a glass substrate 21 on the inside of the room through an adhesive layer 20. The lighting film 1 is attached to the one surface of the glass substrate 21 with the base member 10 facing the outside. A window glass 200 is formed by the lighting film 1 and the glass substrate 21.

FIG. 31(b) shows an example in which the first surface of the lighting film 1 adheres to the surface of the glass substrate 21 on the inside of the room through the adhesive layer 20. The lighting film 1 is attached to the one surface of the glass substrate 21 with the protective member 13 side facing the outside. A window glass 201 is formed by the lighting film 1 and the glass substrate 21.

FIG. 31(c) shows an example in which the second surface of the lighting film 1A which does not have the protective member 13 with respect to the lighting film 1 adheres to the surface of the glass substrate 21 on the inside of the room through the adhesive layer 20. A window glass 202 is formed by the lighting film 1A and the glass substrate 21. In this configuration, the protrusion 11 is interposed between the glass substrate 21 and the base member 10. Therefore, performance of the lighting film 1A is regulated not to deteriorate due to dirt which is attached to the gap portion 12.

FIG. 31(d) shows an example in which the lighting film 1 is not attached to the glass substrate but the lighting film is individually used. The lighting film 1 is used to hang over the window like a blind only when needed. When the lighting film is not needed, the lighting film is wound into a roll shape to be disposed on the upper side of the window so as not to cause interference.

Thirteenth Embodiment

Figure 32:
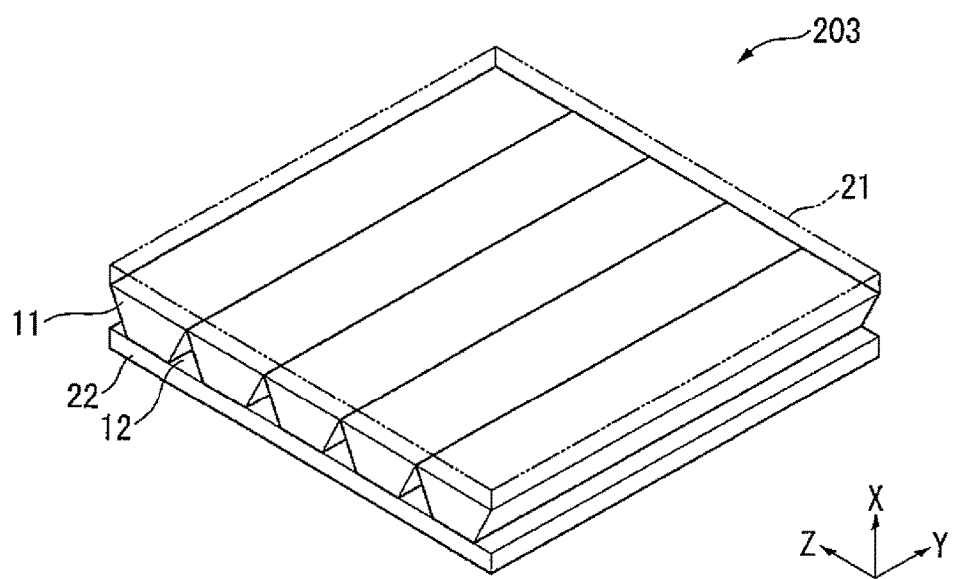
FIG. 32 is a perspective view showing a part of a window glass according to a thirteenth embodiment.

FIG. 32 is a perspective view showing a part of a window glass 203 according to a thirteenth embodiment.

Further, the same reference signs are assigned to the components according to the present embodiment, which are common to the first embodiment, and detailed description thereof is omitted.

In the window glass 203 of the present embodiment, the lighting film including the protrusion is not attached to the glass substrate 21 but the protrusion 11 is directly formed on the glass substrate 21. In other words, the window glass 203 of the present embodiment includes a glass substrate 21, the plurality of protrusions 11 having the optical transparency, which are formed to be adjacent on the one surface of the glass substrate 21, the gap portion 12 formed between the protrusions 11, and a protective substrate 22 having the optical transparency, which is provided on the side opposite to the glass substrate 21 with the plurality of protrusions 11 interposed therebetween.

Further, in the present embodiment, the protective substrate 22 having the optical transparency is provided on the surface opposite to the glass substrate 21 with the plurality of protrusions 11 interposed therebetween; however, the protective substrate 22 may not be provided.

In other words, at least the glass substrate 21 may only be provided. In addition, instead of the protective substrate 22, a protective film having flexibility may be provided.

In the present embodiment, the end surface of the protrusion 11 on the side (protective substrate 22 side) opposite to the glass substrate 21 is configured to be a light incident end surface and the end surface of the protrusion 11 on the glass substrate 21 side is configured to be a light emission end surface.

An area of the end surface of the protrusion 11 on the glass substrate 21 side is greater than an area of the end surface of the protrusion 11 on the protective substrate 22 side. In the present embodiment, among the plurality of protrusions 11, edges of the two adjacent protrusions 11 on the glass substrate 21 side are in contact with each other.

Each of the plurality of protrusions 11 has the longitudinal direction substantially in one direction and is disposed to have the one direction in a direction parallel to the one side of the glass substrate 21 having a rectangular shape. In a case of the present embodiment, each of the plurality of protrusions 11 is formed to have a stripe shape with a certain width in the Y direction; however, the configuration of the protrusion 11 is not limited thereto.

For example, in the present embodiment, the plurality of protrusions 11 are separately formed on the glass substrate 21; however, as shown in FIG. 27(b), the protrusion 11 may be continuously formed over the entire surface of the glass substrate 21. For example, a transparent resist layer which is a material of the protrusion 11 may be formed all over the entire surface of the glass substrate 21, a plurality of openings may be formed in the resist layer, the openings may be filled with a gas such as the air, and thereby the protrusion 11 and the gap portion 12 may be formed.

Such a window glass includes the glass substrate 21, the protrusion 11 having the optical transparency, which is formed on the one surface of the glass substrate 21, the plurality of openings which are formed in the protrusions 11 to be adjacent to each other, a gap portion 12 formed in the opening, and the protective substrate 22 having the optical transparency, which is provided on the side opposite to the glass substrate 21 with the protrusion 11 interposed therebetween.

In addition, it is possible to apply the configurations in the first embodiment to the eleventh embodiment described above to the configuration of the protrusion 11, in addition to that.

Since the window glass 203 of the present embodiment does not include a base member as a base of the protrusion 11, the transparency is high, compared to the window glasses 200 and 201 according to the twelfth embodiment. In addition, since the protrusion 11 is formed directly on the glass substrate 21, a process of attaching the lighting film is not needed and reduction of the number of components or simplification of the manufacturing processes is achieved.

In addition, in the configuration, the top of the protrusion 11 is covered with the protective substrate 22. Therefore, performance of the lighting of the window glass 203 regulated not to deteriorate due to dirt which is attached to the gap portion 12.

Fourteenth Embodiment

Figure 33:
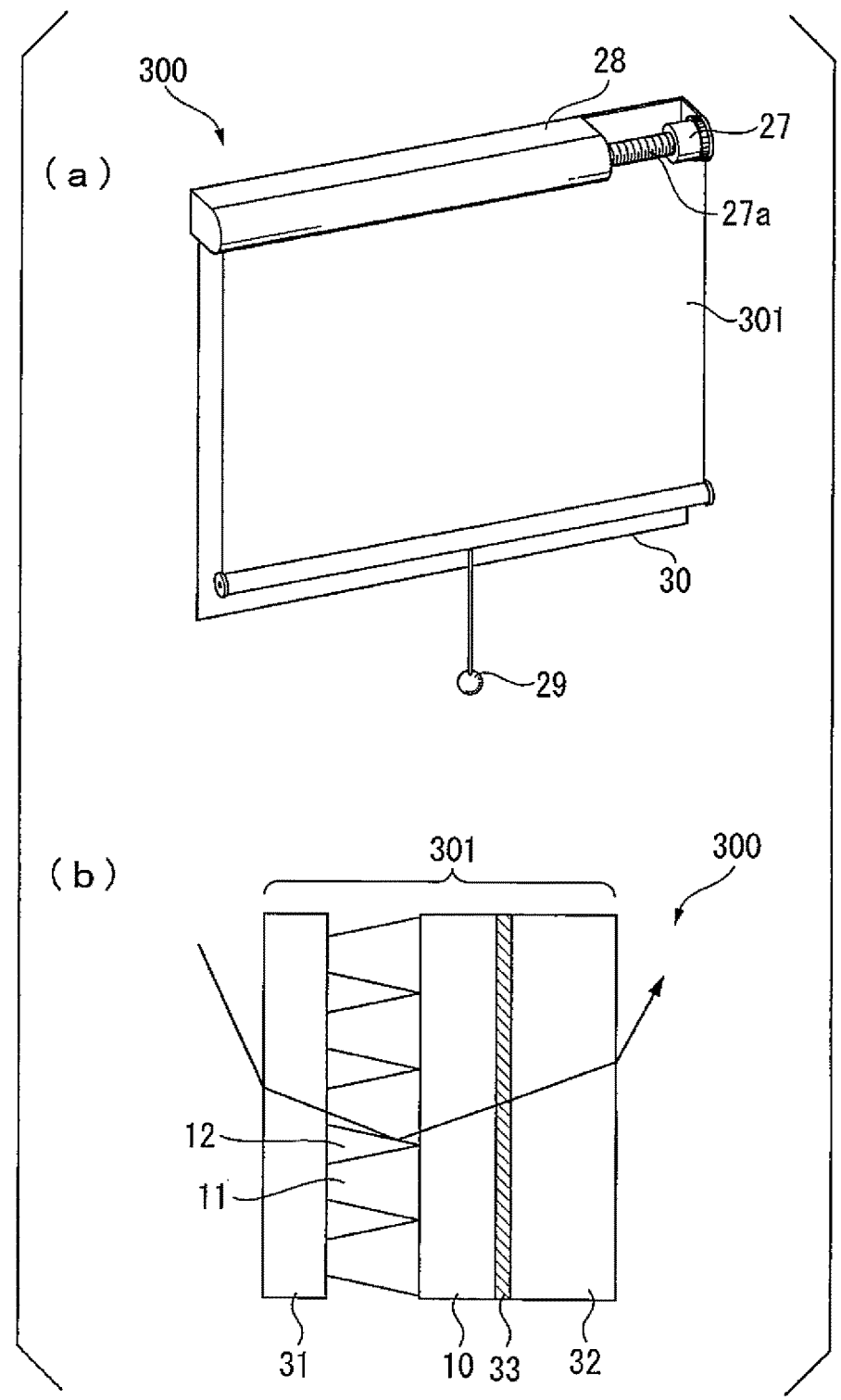
FIGS. 33(a) and 33(b) are views showing schematic configurations of a roll screen according to a fourteenth embodiment.

FIGS. 33(a) and 33(b) are views showing schematic configurations of a roll screen 300 according to a fourteenth embodiment. FIG. 33(a) is a perspective view showing the roll screen 300 according to the fourteenth embodiment. FIG. 33(b) is a sectional view showing a lighting film 301 used for the roll screen 300.

The same reference signs are assigned to the components according to the present embodiment, which are common to the first embodiment, and detailed description thereof is omitted.

As shown in FIG. 33(a), the roll screen 300 includes the lighting film 301, a winding mechanism 27 which winds the lighting film 301 around a shaft center 27a, and an accommodation section 28 that accommodates the shaft center 27a and the winding mechanism 27.

The accommodation section 28 is disposed on the top of a window 30. The lighting film 301 wound in the accommodation section 28 is unwound by pulling down a cord 29 provided to a lower end portion of the lighting film 301. In the case of the present embodiment, the winding mechanism 27 is a pull cord type winding mechanism; however the winding mechanism may be a chain cord type winding mechanism.

As shown in FIG. 33(b), the lighting film 301 includes the base member 10 having the optical transparency, the plurality of protrusions 11 having the optical transparency, which are formed to be adjacent to each other on the one surface of the base member 10, the gap portion 12 formed between the protrusions 11, a protective film 31 having the optical transparency, which is provided on the side opposite to the base member 10 with the plurality of protrusions 11 interposed therebetween, and an interior film 32 having the optical transparency, which is provided on the side opposite to the side on which the plurality of protrusions 11 are formed with the base member 10 interposed therebetween.

The interior film 32 is a film in which a design and decoration is performed. The base member 10, on which the protrusions 11 are formed, is stacked on such an interior film 32, and thereby the lighting film having a good design can be provided. Although the interior film 32 adheres to the base member 10 through the adhesive layer 33, the interior film 32 may be attached to the protective film 31.

Fifteenth Embodiment

Figure 34:
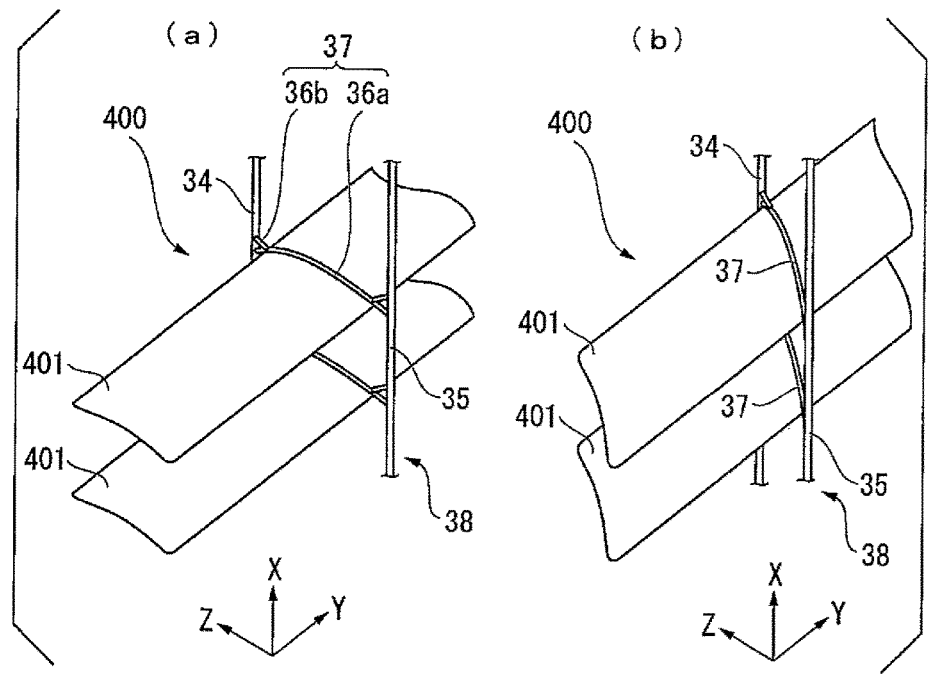
FIGS. 34(a) and 34(b) are perspective views showing a part of a lighting louver according to a fifteenth embodiment.

FIGS. 34(a) and 34(b) are perspective views showing a part of a lighting louver 400 according to a fifteenth embodiment. FIG. 34(a) shows a state in which the lighting film 401 is disposed in the horizontal direction and FIG. 34(b) shows a state in which the lighting film 401 is caused to be tilted.

The same reference signs are assigned to the components according to the present embodiment, which are common to the first embodiment, and detailed description thereof is omitted.

As shown in FIG. 34(a), the lighting louver 400 includes a ladder cord 38 formed to have a ladder shape and the plurality of bend-like lighting films 401 supported in an arrangement state of the ladder cord 38.

The ladder cord 38 is formed of two perpendicular cords 34 and 35 which hang downward on both sides of the lighting film 401 in the width direction and a plurality of horizontal cords 37 which horizontally pass between two perpendicular cords 34 and 35 at positions with a predetermined interval from each other in the perpendicular direction. The horizontal cord 37 is formed of a pair of cords 36a and 36b through which the top and under surfaces of the lighting film 401 is pinched.

As shown in FIG. 34(b), one cord of the two perpendicular cords 34 and 35 is pulled vertically upward and the other cord is pulled vertically downward, and thereby the horizontal cord 37 tilts. The lighting films 401 are supported by each of the plurality of horizontal cords 37, and thereby the plurality of lighting films 401 are tiltably supported with a predetermined interval in the perpendicular direction.

Figure 35:
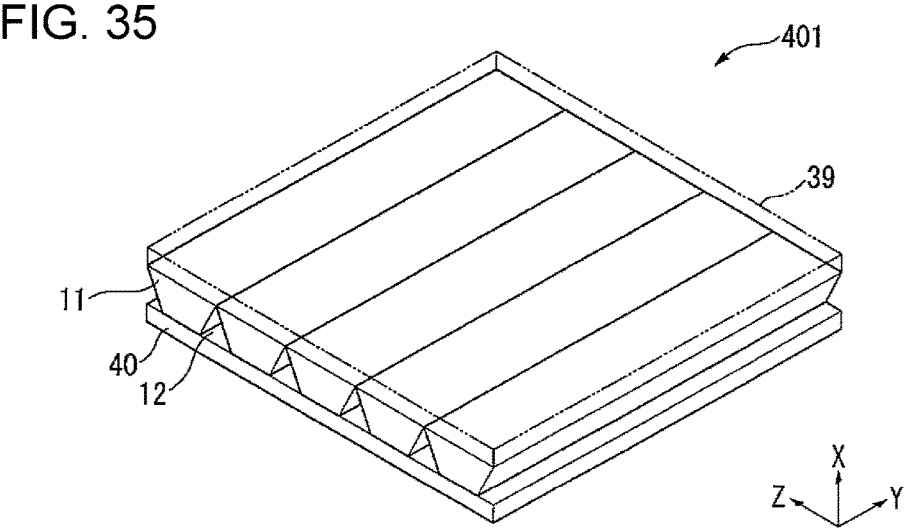
FIG. 35 is a perspective view showing a part of a lighting film used for the lighting louver.

FIG. 35 is a perspective view showing a part of the lighting film 401 used for the lighting louver 400.

The lighting film 401 includes a base member 39 having the optical transparency, the plurality of protrusions 11 having the optical transparency, which are formed to be adjacent to each other on the one surface of the base member 39, the gap portion 12 formed between the protrusions 11, and a protective substrate 40 having the optical transparency, which is provided on the side opposite to the base member 39 with the plurality of protrusions 11 interposed therebetween.

Further, in the present embodiment, the protective substrate 40 having the optical transparency is provided on the side opposite to the base member 39 with the plurality of protrusions 11 interposed therebetween; however, the protective substrate 40 may not be provided. In other words, at least the base member 39 may only be provided. In addition, instead of the protective substrate 40, a protective film having flexibility may be provided.

In the present embodiment, the end surface of the protrusion 11 on the side (protective substrate 40 side) opposite to the base member 39 is configured to be a light incident end surface and the end surface of the protrusion 11 on the base member 39 side is configured to be a light emission end surface.

An area of the end surface of the protrusion 11 on the base member 39 side is greater than an area of the end surface of the protrusion 11 on the protective substrate 40 side. In the present embodiment, among the plurality of protrusions 11, edges of the two adjacent protrusions 11 on the base member 39 side are in contact with each other.

As the base member 39, the same member as the base member 10 of the first embodiment can be used. Here, as the base member 39, a film having the optical transparency and rigidity to the extent that the shape thereof can be maintained such that the shape is not deformed when the base member is tilted with the ladder cord 38. The base member 39 is formed to be elongated with a certain width in the Y direction.

Each of the plurality of protrusions 11 has the longitudinal direction substantially in one direction and is disposed to have the one direction in a direction parallel to the one side of the base member 39 having a rectangular shape. In a case of the present embodiment, each of the plurality of protrusions 11 is formed to have a stripe shape with a certain width in the Y direction; however, the configuration of the protrusion 11 is not limited thereto.

For example, in the present embodiment, the plurality of protrusions 11 are separately formed on the base member 39; however, as shown in FIG. 27(b), the protrusion 11 may be continuously formed over the entire surface of the base member 39. For example, a transparent resist layer which is a material of the protrusion 11 may be formed all over the entire surface of the base member 39, a plurality of openings may be formed in the resist layer, the openings may be filled with a gas such as the air, and thereby the protrusion 11 and the gap portion 12 may be formed.

Such a lighting film 401 includes the base member 39, the protrusion 11 having the optical transparency, which is formed on the one surface of the base member 39, the plurality of openings which are formed in the protrusions 11 to be adjacent to each other, the gap portion 12 formed in the opening, and the protective substrate 40 having the optical transparency, which is provided on the side opposite to the base member 39 with the protrusion 11 interposed therebetween.

In addition, it is possible to apply the configurations in the first embodiment to the eleventh embodiment described above to the configuration of the protrusion 11, in addition to that.

Figure 36:
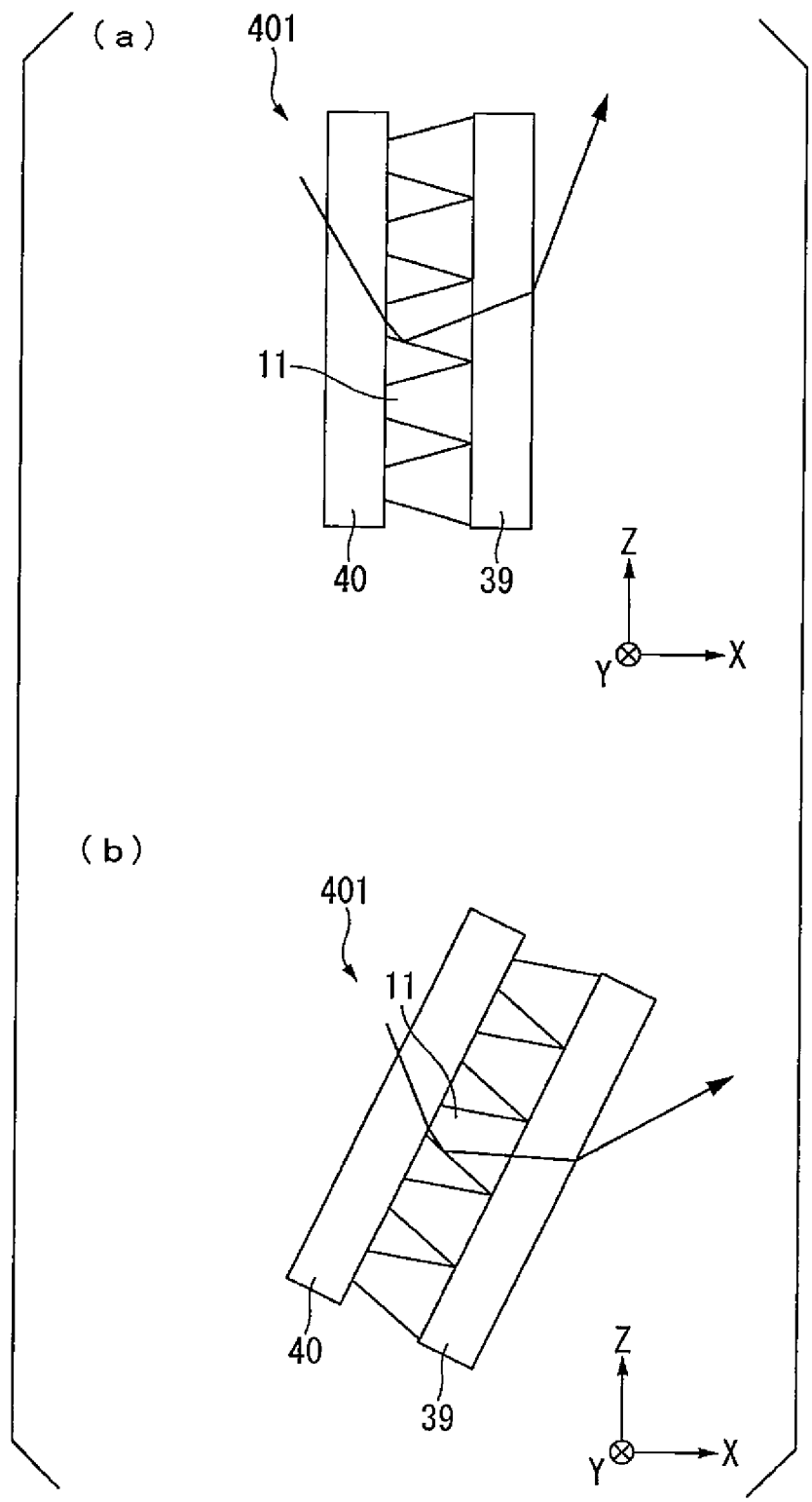
FIGS. 36(a) and 36(b) are views showing effects of the lighting louver.

FIGS. 36(a) and (b) are views showing effects of the lighting louver.

In FIGS. 36(a) and (b), +Z direction side means to be vertically upward and −Z direction side means to be vertically downward. The protrusions 11 are formed to have a stripe shape with a certain width in the Y direction which is the horizontal direction.

As shown in FIG. 36(a), in a state in which the lighting film 401 stands vertically, a height direction of the protrusion 11 is disposed in the height difference. Therefore, the light incident to the lighting film 401 is reflected in a direction of substantial specular reflection and is emitted from the lighting film 401. Hence, the ceiling side is illuminated.

Meanwhile, as shown in FIG. 36(b), in a state in which the lighting film 401 is tilted at an angle, a height direction of the protrusion 11 is inclined on the −Z direction side (side opposite to the ceiling side). Therefore, compared to the example in FIG. 36(a), the proportion of the light traveling toward the ceiling side is decreased and the proportion of the light traveling deep inside the room is increased.

In this manner, the tilting of the lighting film 401 is regulated, and thereby it is possible to regulate the direction of the light emitted from the lighting film 401. Hence, a dweller appropriately controls the direction depending on a size of a room, orientation of a window, time, or a season, and thereby an illumination state in a room can be maintained as a good condition in all times.

Sixteenth Embodiment

Figure 37:
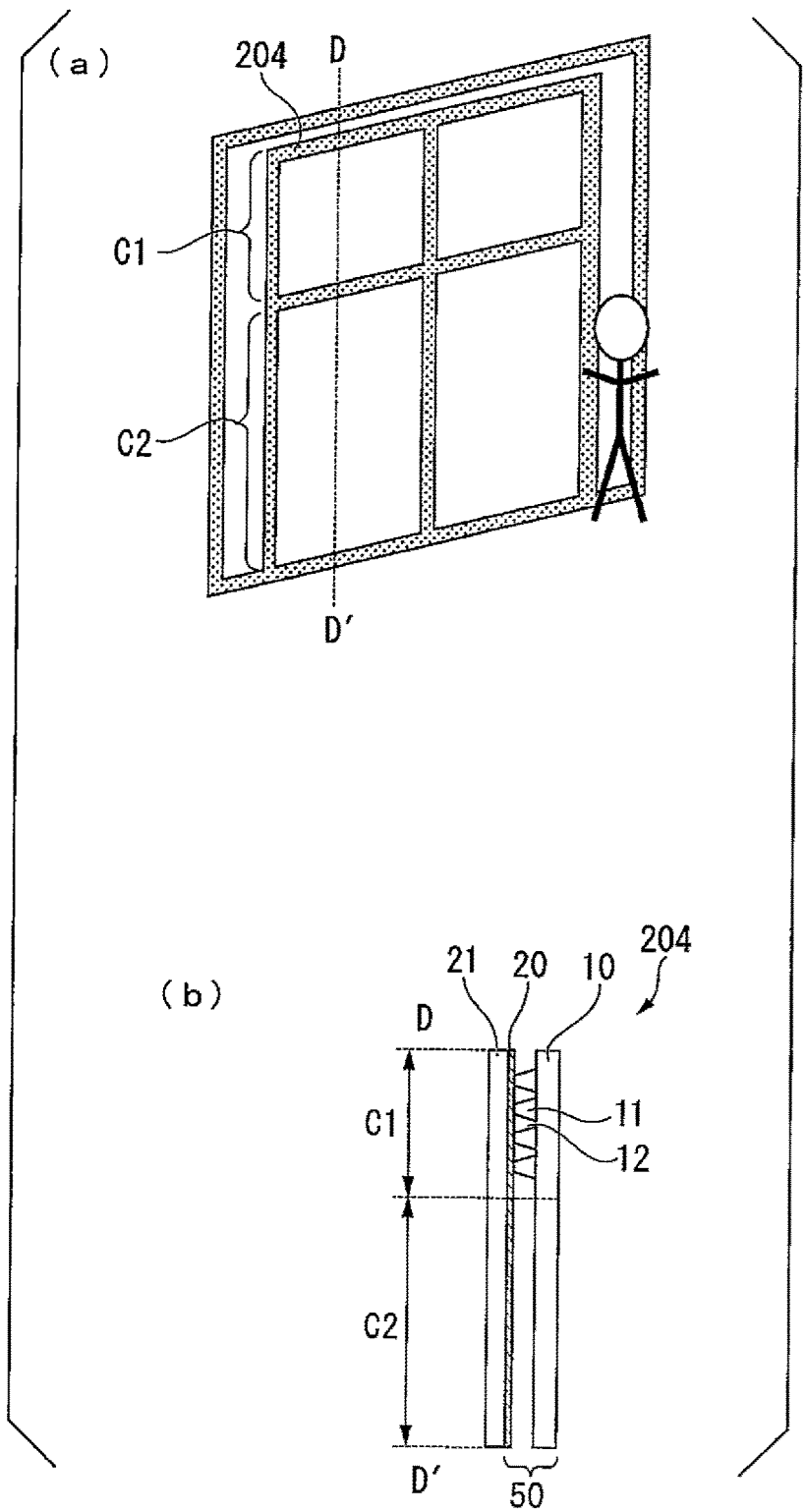
FIGS. 37(a) and 37(b) are views showing a schematic configuration of a window glass according to a sixteenth embodiment.

FIGS. 37(a) and 37(b) are views showing a schematic configuration of a window glass 204 according to a sixteenth embodiment.

FIG. 37(b) is a sectional view showing the window glass 204 taken along line D-D' in FIG. 37(a).

Further, the same reference signs are assigned to the components according to the present embodiment, which are common to the first embodiment, and detailed description thereof is omitted.

As shown in FIG. 37(a), the window glass 204 is a large window glass larger than a human's stature. An area used when a human normally looks out is C2 and an area C1 higher than the area C2 is usually used as a lighting area. Therefore, in the present embodiment, the protrusion of the lighting film is disposed only in the area C1 in which a human's field of view is not blocked.

As shown in FIG. 37(b), a basic configuration of a lighting film 50 is the same as the lighting film 1 of the first embodiment. The base member 10 of the lighting film 50 is attached to the entire surface of the glass substrate 21 but the protrusion 11 is disposed only in the area C1 and is not disposed in area C2. Hence, the window glass has high transparency when observing an external view is high and is good in lighting.

Seventeenth Embodiment

Figure 38:
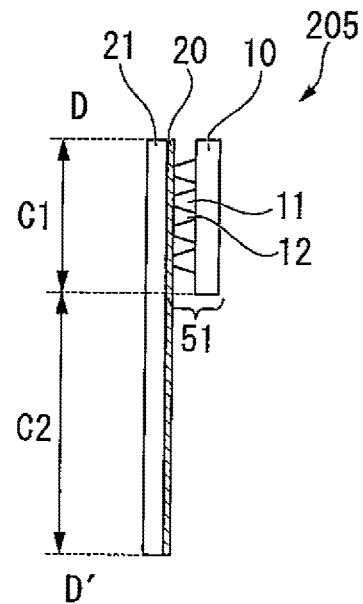
FIG. 38 is a sectional view of a window glass according to a seventeenth embodiment.

FIG. 38 is a sectional view of a window glass 205 according to a seventeenth embodiment.

Further, the same reference signs are assigned to the components according to the present embodiment, which are common to the sixteenth embodiment, and detailed description thereof is omitted.

The present embodiment is different from the sixteenth embodiment in that both the base member 10 and the protrusion 11 are disposed only in the area C1 in the present embodiment, compared to the sixteenth embodiment in which the base member 10 is disposed in both the area C1 and area C2 and the protrusion 11 is disposed only in the area C1. In other words, a lighting film 51 is disposed only in the area C1.

In the present embodiment, since the base member 10 is disposed only in the area C1, a cost of the members is reduced, compared to the sixteenth embodiment. In addition, the base member 10 is not disposed in the area C2, and thereby the transparency is further increased when observing the external view.

Eighteenth Embodiment

Figure 39:
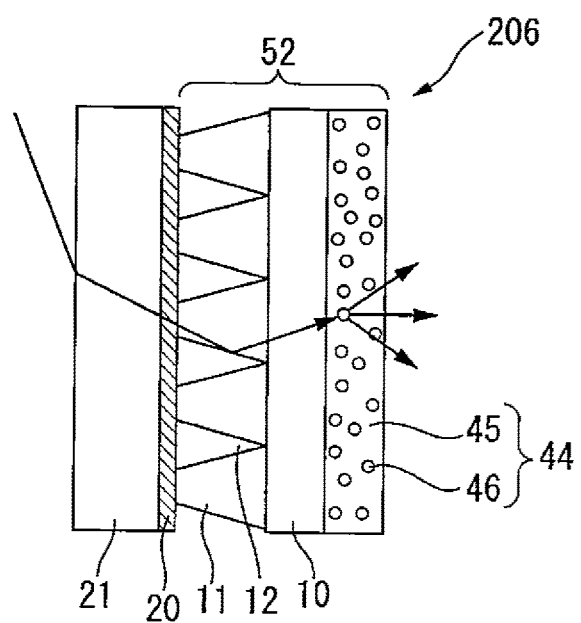
FIG. 39 is a sectional view of a window glass according to an eighteenth embodiment.

FIG. 39 is a sectional view of a window glass 206 according to an eighteenth embodiment.

Further, the same reference signs are assigned to the components according to the present embodiment, which are common to the first embodiment, and detailed description thereof is omitted.

A window glass 206 includes the glass substrate 21 and a lighting film 52 attached to the one surface of the glass substrate 21. The basic configuration of the lighting film 52 is the same as that of the first embodiment. The present embodiment is different from the first embodiment in that a light scattering film 44 is provided on a side opposite to the side of the base member 10 on which the protrusion 11 is formed. In the case of the present embodiment, the light scattering film 44 is a film in which scattering particles 46 are dispersed inside a transparent film 45. The lighting film 52 is attached to the one surface of the glass substrate 21 on the inside of the room with the side opposite to the side of the base member 10, on which the protrusion 11 is formed, toward the outer side.

The light reflected from the side surface of the protrusion 11 is scattered by the scattering particles 46 of the light scattering film 44 and illuminates a wide range inside the room. Diffusivity or a strong diffusion orientation of the light scattering film 44 is changed, and thereby it is possible to variously change a position or an orientation which is illuminated. In this case, the transparency when observing the external view is lowered but the same lighting as from a ground glass is obtained.

Nineteenth Embodiment

Figure 40:
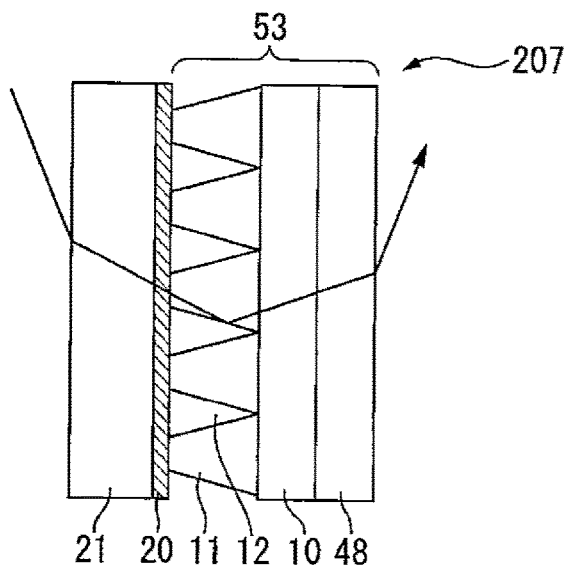
FIG. 40 is a sectional view of a window glass according to a nineteenth embodiment.

FIG. 40 is a sectional view of a window glass 207 according to a nineteenth embodiment.

Further, the same reference signs are assigned to the components according to the present embodiment, which are common to the first embodiment, and detailed description thereof is omitted.

A window glass 207 includes the glass substrate 21 and a lighting film 53 attached to the one surface of the glass substrate 21. The basic configuration of the lighting film 53 is the same as that of the first embodiment. The present embodiment is different from the first embodiment in that an insulating film 48 having the optical transparency is provided on a side opposite to the side of the base member 10 on which the protrusion 11 is formed. In the case of the present embodiment, as the insulating film 48, any known insulating film available in the market as the insulating film for the window glass can be used. The lighting film 53 is attached to the one surface of the glass substrate 21 on the inside of the room with the side opposite to the side of the base member 10, on which the protrusion 11 is formed, toward the outer side.

In the case of the present embodiment, since a surface of the lighting film 53 on the protrusion 11 side adheres to the glass substrate 21, the air of the gap portion 12 is interposed between the glass substrate 21 and the base member 10. Since an air layer has properties with which heat outside the room is unlikely to be transmitted to the inside of the room, the lighting film itself has thermal insulation properties.

Hence, the window glass 207, to which the insulating film 48 adheres to the one surface of the base member 10, has the thermal insulation properties equal to or higher than the thermal insulation properties of the insulating film 48.

As above, the window glass 207 of the present embodiment becomes the window glass having both the lighting and the thermal insulation properties.

Twentieth Embodiment

Figure 41:
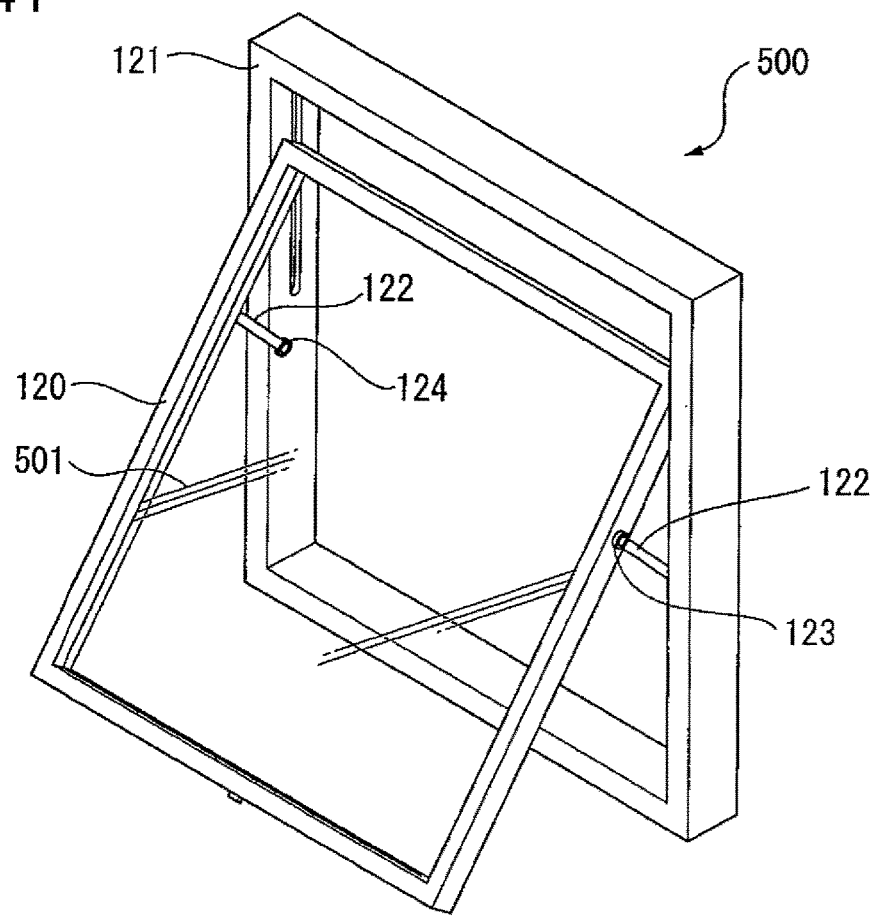
FIG. 41 is a sectional view of a window according to a twentieth embodiment.

FIG. 41 is a sectional view of a window 500 according to a twentieth embodiment.

Further, the same reference signs are assigned to the components according to the present embodiment, which are common to the first embodiment, and detailed description thereof is omitted.

An awning window 500 includes a window glass 501 and a rod-shaped support bracket 122 with which the window glass 501 is connected to a window frame 121. The window glass 501 can be used for the window glass of the embodiments described above. One-side end 123 of the support bracket 122 is rotatably connected to a window-glass frame 120 of the window glass 501 and the other-side end 124 of the support bracket 122 is rotatably connected to the window frame 121.

The window glass 501 is caused to tilt with the one-side end 123 of the support bracket 122 as a support point, and thereby it is possible to regulate the tilting (direction of light emitted from the lighting film) of the lighting film disposed in the window glass 501. Hence, a dweller appropriately controls the tilting depending on a size of a room, orientation of a window, time, or a season, and thereby an illumination state in a room can be maintained as a good condition in all times.

As above, examples of the preferred embodiments according to the present invention will be described with reference to the accompanying drawings; however, it is needless to say that the present invention is not limited to the example. The shapes or a combination or the like of the respective components in Examples described above, is an example and various modifications can be performed based on the design requirements or the like in a range without departing from the gist of the present invention.

Examples

Figure 42:
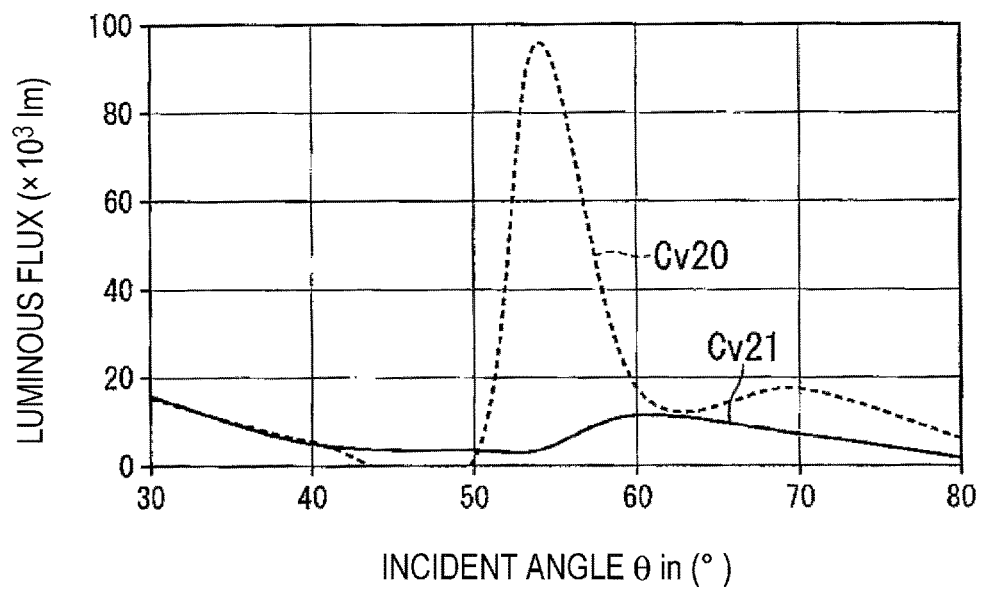
FIG. 42 is a graph showing Example.

FIG. 42 is a graph showing Example.

In FIG. 42, the effects of the lighting film 1 according to the first embodiment as Example are described, compared to the lighting film 1001 according to a comparative example. In FIG. 42, the horizontal axis represents the incident angle θin(°) and the vertical axis represents luminous flux (×10³ lm). In addition, a curve Cv20 indicates luminous flux of light traveling toward the glare region AR of the light entering the lighting film 1001 according to the comparative example from the upper side and a curve Cv21 indicates luminous flux of the light traveling toward the glare region AR of the light entering the lighting film 1 according to Example from the upper side.

Comparative Example

The lighting film 1001 according to the comparative example is formed under a condition in which the width w of the protrusion 11 is 30 μm, the interval s between the protrusions 11 is 5 μm, the height h of the protrusion 11 is 40 μm, the angles α1 of the protrusion 11 is 70°, the angle α2 of the protrusion 11 is 80°, and a refractive index of the protrusion 11 and a refractive index of the base member 10 are 1.49, respectively.

Example

The lighting film 1 according to Example is formed under a condition in which the width w of the protrusion 11 is 30 μm, the interval s between the protrusions 11 is 0 μm, the height h of the protrusion 11 is 40 μm, the angles αd of the protrusion 11 is 70°, the angle α2 of the protrusion 11 is 80°, and a refractive index of the protrusion 11 and a refractive index of the base member 10 are 1.49, respectively.

As shown in FIG. 42, in the comparative example, the luminous flux of the light traveling toward the glare region AR is maintained to have a value equal to or less than 20×10³ lm until the incident angle θin becomes 50°. However, the luminous flux is rapidly increased when the incident angle θin exceeds 50° and the luminous flux has the maximum value when the incident angle θin is 54°. Also, the luminous flux is rapidly decreased when the incident angle θin exceeds 54° and the luminous flux is less than 20×10³ lm when the incident angle θin exceeds 60°.

In comparison, in Example, the luminous flux of the light traveling toward the glare region AR is maintained to have a value equal to or less than 20×10³ lm until the incident angle θin is from 30° to 80°. In addition, at the incident angle θin of 54° at which the luminous flux has the maximum value in the comparative example, the luminous flux is less than 5×10³ lm.

As above, according to Example, it is possible to regulate the light incident from the lighting film from the upper side not to travel toward the glare region AR, compared to the comparative example, and it is understood that it is possible to regulate the glare which a person inside the room feels.

(1) A lighting film includes: a base member having optical transparency; a plurality of protrusions having optical transparency, which are formed to be adjacent to each other on one surface of the base member; and a gap portion formed between the protrusions. An area of an end surface of the protrusion on a base member side is greater than an area of an end surface of the protrusion on a side opposite to the base member, and a ratio s/w of an interval s of two adjacent protrusions among the plurality of protrusions to a width w of the protrusion is equal to or less than 0.1.

(2) A lighting film includes: a base member having optical transparency; a plurality of protrusions having optical transparency, which are formed to be adjacent to each other on one surface of the base member; a gap portion formed between the protrusions; and a light absorbing body provided in a region between the protrusions on the one surface of the base member.

(3) A lighting film includes: a base member having optical transparency; a plurality of protrusions having optical transparency, which are formed to be adjacent to each other on one surface of the base member; a gap portion formed between the protrusions; and a second protrusion provided in a region between the protrusions on the one surface of the base member. The second protrusion has an inclined surface inclined with respect to the one surface of the base member and a height of the second protrusion is smaller than a height of the protrusion.

(4) In the lighting film according to any one of (1) to (3) described above, an area of an end surface of the protrusion on the base member side is greater than an area of an end surface of the protrusion on the side opposite to the base member.

(5) In the lighting film according to (4) described above, the plurality of protrusions includes a plurality of protrusions having a side surface with an inclination angle that is changed in a continuous or stepwise manner from the base member side to the side opposite to the base member.

(6) In the lighting film according to (4) or (5) described above, the plurality of protrusions include a plurality of protrusions having side surfaces with inclination angles different from each other.

(7) In the lighting film according to any one of (4) to (6) described above, the protrusion extends in a straight line shape or in a curved line shape and two side surfaces of the protrusion in a cross section orthogonal to an extending direction of the protrusion have an inclination angle that is changed in a continuous or stepwise manner from the base member side to the side opposite to the base member.

(8) A lighting film includes: a base member having optical transparency; a plurality of protrusions having optical transparency, which are formed to be adjacent to each other on one surface of the base member; and a gap portion formed between the protrusions. The plurality of protrusions include a plurality of protrusions having a side surface with an inclination angle that is changed in a continuous or stepwise manner from a base member side to a side opposite to the base member.

(9) A lighting film includes: a base member having optical transparency; a plurality of protrusions having optical transparency, which are formed to be adjacent to each other on one surface of the base member; and a gap portion formed between the protrusions. The plurality of protrusions include a plurality of protrusions having side surfaces with inclination angles different from each other.

(10) In the lighting film according to any one of (4) to (7) described above, among the plurality of protrusions, a part of two adjacent protrusions are in contact with each other.

(11) A window glass includes: a glass substrate; a plurality of protrusions having optical transparency, which are formed to be adjacent to each other on one surface of the glass substrate; and a gap portion formed between the protrusions. An area of an end surface of the protrusion on the glass substrate side is greater than an area of an end surface of the protrusion on a side opposite to the glass substrate A ratio s/w of an interval s of two adjacent protrusions among the plurality of protrusions to a width w of the protrusion is equal to or less than 0.1.

(12) A window glass includes: a glass substrate; a plurality of protrusions having optical transparency, which are formed to be adjacent to each other on one surface of the glass substrate; a gap portion formed between the protrusions; and a light absorbing body provided in a region between the protrusions on the one surface of the glass substrate.

(13) A window glass includes: a glass substrate; a plurality of protrusions having optical transparency, which are formed to be adjacent to each other on one surface of the glass substrate; a gap portion formed between the protrusions; and a second protrusion provided in a region between the protrusions on the one surface of the glass substrate. The second protrusion has an inclined surface inclined with respect to the one surface of the glass substrate and a height of the second protrusion is smaller than a height of the protrusion.

(14) In the window glass according to any one of (11) to (13) described above, an area of an end surface of the protrusion on the glass substrate side is greater than an area of an end surface of the protrusion on a side opposite to the glass substrate.

(15) In the window glass according to (14) described above, the plurality of protrusions include a plurality of protrusions having a side surface with an inclination angle that is changed in a continuous or stepwise manner from the glass substrate side to the side opposite to the glass substrate.

(16) In the window glass according to (14) or (15) described above, the plurality of protrusions include a plurality of protrusions having side surfaces with inclination angles different from each other.

(17) In the window glass according to any one of (14) to (16) described above, the protrusion extends in a straight line shape or in a curved line shape and two side surfaces of the protrusion in a cross section orthogonal to an extending direction of the protrusion have an inclination angle that is changed in a continuous or stepwise manner from the glass substrate side to the side opposite to the glass substrate.

(18) A window glass includes: a glass substrate; a plurality of protrusions having optical transparency, which are formed to be adjacent to each other on one surface of the glass substrate; and a gap portion formed between the protrusions. The plurality of protrusions include a plurality of protrusions having a side surface with an inclination angle that is changed in a continuous or stepwise manner from a glass substrate side to a side opposite to the glass substrate.

(19) A window glass includes: a glass substrate; a plurality of protrusions having optical transparency, which are formed to be adjacent to each other on one surface of the glass substrate; and a gap portion formed between the protrusions. The plurality of protrusions include a plurality of protrusions having side surfaces with inclination angles different from each other.

(20) In the window glass according to any one of (14) to (17) described above, among the plurality of protrusions, a part of two adjacent protrusions are in contact with each other.

(21) A roll screen includes: a lighting film; a winding mechanism that winds the lighting film around a shaft center; and an accommodation section that accommodates the shaft center and the winding mechanism. The lighting film includes a base member having optical transparency, a plurality of protrusions having optical transparency, which are formed to be adjacent to each other on one surface of the base member, and a gap portion formed between the protrusions. An area of an end surface of the protrusion on a base member side is greater than an area of an end surface of the protrusion on a side opposite to the base member, and a ratio s/w of an interval s of two adjacent protrusions among the plurality of protrusions to a width w of the protrusion is equal to or less than 0.1.

(22) A roll screen includes: a lighting film; a winding mechanism that winds the lighting film around a shaft center; and an accommodation section that accommodates the shaft center and the winding mechanism. The lighting film includes a base member having optical transparency, a plurality of protrusions having optical transparency, which are formed to be adjacent to each other on one surface of the base member, a gap portion formed between the protrusions; and a light absorbing body provided in a region between the protrusions on the one surface of the base member.

(23) A roll screen includes: a lighting film; a winding mechanism that winds the lighting film around a shaft center; and an accommodation section that accommodates the shaft center and the winding mechanism. The lighting film includes a base member having optical transparency, a plurality of protrusions having optical transparency, which are formed to be adjacent to each other on one surface of the base member, a gap portion formed between the protrusions; and a second protrusion provided in a region between the protrusions on the one surface of the base member. The second protrusion has an inclined surface inclined with respect to the one surface of the base member and a height of the second protrusion is smaller than a height of the protrusion.

(24) In the roll screen according to any one of (21) to (23) described above, an area of an end surface of the protrusion on the base member side is greater than an area of an end surface of the protrusion on the side opposite to the base member.

(25) In the roll screen according to (24) described above, the plurality of protrusions include a plurality of protrusions having a side surface with an inclination angle that is changed in a continuous or stepwise manner from the base member side to the side opposite to the base member.

(26) In the roll screen according to (24) or (25) described above, the plurality of protrusions include a plurality of protrusions having side surfaces with inclination angles different from each other.

(27) In the roll screen according to any one of (24) to (26) described above, the protrusion extends in a straight line shape or in a curved line shape and two side surfaces of the protrusion in a cross section orthogonal to an extending direction of the protrusion have an inclination angle that is changed in a continuous or stepwise manner from the base member side to the side opposite to the base member.

(28) A roll screen includes: a lighting film; a winding mechanism that winds the lighting film around a shaft center; and an accommodation section that accommodates the shaft center and the winding mechanism. The lighting film includes a base member having optical transparency, a plurality of protrusions having optical transparency, which are formed to be adjacent to each other on one surface of the base member, and a gap portion formed between the protrusions. The plurality of protrusions include a plurality of protrusions having a side surface with an inclination angle that is changed in a continuous or stepwise manner from a base member side to a side opposite to the base member.

(29) A roll screen includes: a lighting film; a winding mechanism that winds the lighting film around a shaft center; and an accommodation section that accommodates the shaft center and the winding mechanism. The lighting film includes a base member having optical transparency, a plurality of protrusions having optical transparency, which are formed to be adjacent to each other on one surface of the base member, and a gap portion formed between the protrusions. The plurality of protrusions include a plurality of protrusions having side surfaces with inclination angles different from each other.

(30) In the roll screen according to any one of (24) to (27) described above, among the plurality of protrusions, a part of two adjacent protrusions are in contact with each other.

(31) A lighting louver includes: a plurality of lighting films which are tiltably supported with a predetermined interval therebetween. The lighting film includes a base member having optical transparency, a plurality of protrusions having optical transparency, which are formed to be adjacent to each other on one surface of the base member, and a gap portion formed between the protrusions. An area of an end surface of the protrusion on a base member side is greater than an area of an end surface of the protrusion on a side opposite to the base member, and a ratio s/w of an interval s of two adjacent protrusions among the plurality of protrusions to a width w of the protrusion is equal to or less than 0.1.

(32) A lighting louver includes: a plurality of lighting films which are tiltably supported with a predetermined interval therebetween. The lighting film includes a base member having optical transparency, a plurality of protrusions having optical transparency, which are formed to be adjacent to each other on one surface of the base member, a gap portion formed between the protrusions, and a light absorbing body provided in a region between the protrusions on the one surface of the base member.

(33) A lighting louver includes: a plurality of lighting films which are tiltably supported with a predetermined interval therebetween. The lighting film includes a base member having optical transparency, a plurality of protrusions having optical transparency, which are formed to be adjacent to each other on one surface of the base member, a gap portion formed between the protrusions, and a second protrusion provided in a region between the protrusions on the one surface of the base member. The second protrusion has an inclined surface inclined with respect to the one surface of the base member and a height of the second protrusion is smaller than a height of the protrusion.

(34) In the lighting louver according to any one of (31) to (33) described above, an area of an end surface of the protrusion on the base member side is greater than an area of an end surface of the protrusion on the side opposite to the base member.

(35) In the lighting louver according to (34), the plurality of protrusions include a plurality of protrusions having a side surface with an inclination angle that is changed in a continuous or stepwise manner from the base member side to the side opposite to the base member.

(36) In the lighting louver according to (34) or (35) described above, the plurality of protrusions include a plurality of protrusions having side surfaces with inclination angles different from each other.

(37) In the lighting louver according to any one of (34) to (36) described above, the protrusion extends in a straight line shape or in a curved line shape and two side surfaces of the protrusion in a cross section orthogonal to an extending direction of the protrusion have an inclination angle that is changed in a continuous or stepwise manner from the base member side to the side opposite to the base member.

(38) A lighting louver includes: a plurality of lighting films which are tiltably supported with a predetermined interval therebetween. The lighting film includes a base member having optical transparency, a plurality of protrusions having optical transparency, which are formed to be adjacent to each other on one surface of the base member, and a gap portion formed between the protrusions. The plurality of protrusions include a plurality of protrusions having a side surface with an inclination angle that is changed in a continuous or stepwise manner from a base member side to a side opposite to the base member.

(39) A lighting louver includes: a plurality of lighting films which are tiltably supported with a predetermined interval therebetween. The lighting film includes a base member having optical transparency, a plurality of protrusions having optical transparency, which are formed to be adjacent to each other on one surface of the base member, and a gap portion formed between the protrusions. The plurality of protrusions include a plurality of protrusions having side surfaces with inclination angles different from each other.

(40) In the lighting louver according to any one of (34) to (37) described above, among the plurality of protrusions, a part of two adjacent protrusions are in contact with each other.

INDUSTRIAL APPLICABILITY

The present invention can be applied to a lighting film, a window glass, a roll screen, and a lighting louver.

REFERENCE SIGNS LIST 1 to 7, 1A, 50 TO 54, 100 TO 102, 401 LIGHTING FILM
10, 39 BASE MEMBER
11, 61, 71, 72, 73 PROTRUSION
11a LIGHT INCIDENT END SURFACE (END SURFACE)
11b LIGHT EMISSION END SURFACE (END SURFACE)
11c1, 11c2 SIDE SURFACE
12 GAP PORTION
14 LIGHT ABSORBING BODY
15 TO 17 SECOND PROTRUSION
15b, 16b SIDE SURFACE (INCLINED SURFACE)
17a SIDE SURFACE (INCLINED SURFACE)
21 GLASS SUBSTRATE
18 PROTRUSION
19 VOID PORTION
27 WINDING MECHANISM
27a SHAFT CENTER
200 to 207, 501 WINDOW GLASS
300 ROLL SCREEN
400 LIGHTING LOUVER
h, h1 HEIGHT OF PROTRUSION
h2 HEIGHT OF SECOND PROTRUSION

The invention claimed is:

1. A lighting film comprising:
a base member having optical transparency;
a plurality of first protrusions having optical transparency, that are defined to be adjacent to each other on one surface of the base member;
a gap portion between the plurality of first protrusions; and
a second protrusion provided in a region between the plurality of first protrusions on the one surface of the base member, wherein
the second protrusion includes an inclined surface inclined with respect to the one surface of the base member and a height of the second protrusion is smaller than a height of each of the plurality of first protrusions,
an area of an end surface of the each of the plurality of first protrusions on a base member side is greater than an area of an end surface of the each of the plurality of first protrusions on a side opposite to the base member, and
a ratio s/w of an interval s of two adjacent first protrusions among the plurality of first protrusions to a width w of the each of the plurality of first protrusions is less than 0.225.

2. The lighting film according to claim 1, wherein an area of an end surface of the each of the plurality of first protrusions on the base member side is greater than an area of an end surface of the each of the plurality of first protrusions on the side opposite to the base member.

3. The lighting film according to claim 2, wherein the plurality of first protrusions include a plurality of third protrusions including a side surface with an inclination angle that is changed in a continuous or stepwise manner from the base member side to the side opposite to the base member.

4. The lighting film according to claim 1, wherein the plurality of first protrusions include a plurality of third protrusions including side surfaces with inclination angles different from each other.

5. The lighting film according to claim 1, wherein the each of the plurality of first protrusions extends in a straight line shape or in a curved line shape and two side surfaces of the each of the plurality of first protrusions in a cross section orthogonal to an extending direction of the plurality of first protrusions have an inclination angle that is changed in a continuous or stepwise manner from the base member side to the side opposite to the base member.

6. The lighting film according to claim 1, wherein
a first shape of a first cross section of the each of the plurality of first protrusions is a trapezoidal shape, the first cross section being orthogonal to the one surface of the base member,
a bottom side of the trapezoidal shape contacts the base member,
one side of the trapezoidal shape is longer than another side of the trapezoidal shape, and
the second protrusion is defined on the one surface of the base member to be apart from the plurality of first protrusions.

7. The lighting film according to claim 1, wherein
a first shape of a first cross section of the each of the plurality of first protrusions is a trapezoidal shape, the first cross section being orthogonal to the one surface of the base member,
a bottom side of the trapezoidal shape contacts the base member,
one side of the trapezoidal shape is longer than another side of the trapezoidal shape,
a second shape of a second cross section of the second protrusion is a triangular shape, the second cross section being orthogonal to the one surface of the base member,
a first side of the triangular shape contacts the base member, and
a second side of the triangular shape is longer than a third side of the triangular shape.

8. The lighting film according to claim 7, wherein the third side of the triangular shape is closer to the another side of the trapezoidal shape than the one side of the trapezoidal shape.

9. The lighting film according to claim 1, wherein the ratio is equal to or less than 0.1.

10. The lighting film according to claim 1, wherein a first refractive index of the second protrusion is higher than a second refractive index of the base member.

11. A roll screen comprising:
a lighting film;
a winding mechanism that winds the lighting film around a shaft center; and
an accommodation section that accommodates the shaft center and the winding mechanism,
wherein the lighting film includes:
   a base member having optical transparency,
   a plurality of first protrusions having optical transparency, that are defined to be adjacent to each other on one surface of the base member,
   a gap portion between the plurality of first protrusions, and
   a second protrusion provided in a region between the plurality of first protrusions on the one surface of the base member, wherein
the second protrusion includes an inclined surface inclined with respect to the one surface of the base member and a height of the second protrusion is smaller than a height of the protrusion,
an area of an end surface of each of the plurality of first protrusions on a base member side is greater than an area of an end surface of the each of the plurality of first protrusions on a side opposite to the base member, and
a ratio s/w of an interval s of two adjacent first protrusions among the plurality of first protrusions to a width w of the each of the plurality of first protrusions is less than 0.225.

12. The roll screen according to claim 11, wherein an area of an end surface of the each of the plurality of first protrusions on the base member side is greater than an area of an end surface of the each of the plurality of first protrusions on the side opposite to the base member.

13. The roll screen according to claim 11, wherein the plurality of first protrusions include a plurality third of protrusions including a side surface with an inclination angle that is changed in a continuous or stepwise manner from the base member side to the side opposite to the base member.

14. The roll screen according to claim 11, wherein the plurality of first protrusions include a plurality of third protrusions including side surfaces with inclination angles different from each other.

15. The roll screen according to claim 11, wherein the each of the plurality of first protrusions extends in a straight line shape or in a curved line shape and two side surfaces of the each of the plurality of first protrusions in a cross section orthogonal to an extending direction of the plurality of first protrusions have an inclination angle that is changed in a continuous or stepwise manner from the base member side to the side opposite to the base member.

16. A lighting louver comprising:
a plurality of lighting films which are tiltably supported with a predetermined interval therebetween,
wherein the lighting film includes:
   a base member having optical transparency,
   a plurality of first protrusions having optical transparency, that are defined to be adjacent to each other on one surface of the base member,
   a gap portion between the plurality of first protrusions, and
   a second protrusion provided in a region between the plurality of first protrusions on the one surface of the base member, wherein
the second protrusion includes an inclined surface inclined with respect to the one surface of the base member and a height of the second protrusion is smaller than a height of each of the plurality of first protrusions,
an area of an end surface of the each of the plurality of first protrusions on a base member side is greater than an area of an end surface of the each of the plurality of first protrusions on a side opposite to the base member, and
a ratio s/w of an interval s of two adjacent first protrusions among the plurality of first protrusions to a width w of the each of the first protrusions is less than 0.225.

17. The lighting louver according to claim 16, wherein an area of an end surface of the each of the plurality of first protrusions on the base member side is greater than an area of an end surface of the each of the plurality of first protrusions on the side opposite to the base member.

18. The lighting louver according to claim 16, wherein the plurality of first protrusions include a plurality third of protrusions including a side surface with an inclination angle that is changed in a continuous or stepwise manner from the base member side to the side opposite to the base member.

19. The lighting louver according to claim 16, wherein the plurality of first protrusions include a plurality of first protrusions including side surfaces with inclination angles different from each other.

20. The lighting louver according to claim 16, wherein the each of the plurality of first protrusions extends in a straight line shape or in a curved line shape and two side surfaces of the each of the plurality of first protrusions in a cross section orthogonal to an extending direction of the each of the plurality of first protrusions have an inclination angle that is changed in a continuous or stepwise manner from the base member side to the side opposite to the base member.

* * * * *